(12) United States Patent
Wang et al.

(10) Patent No.: US 11,221,745 B2
(45) Date of Patent: Jan. 11, 2022

(54) METHOD FOR DISPLAYING CONTENTS ON BASIS OF SMART DESKTOP AND SMART TERMINAL

(71) Applicant: SAMSUNG ELECTRONICS CO., LTD., Suwon-si (KR)

(72) Inventors: Fulong Wang, Beijing (CN); Rui Wu, Beijing (CN); Yingying Jiang, Beijing (CN); Zhenbo Luo, Beijing (CN); Li Zhang, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 65 days.

(21) Appl. No.: 16/067,491

(22) PCT Filed: Jan. 2, 2017

(86) PCT No.: PCT/KR2017/000013
§ 371 (c)(1),
(2) Date: Jun. 29, 2018

(87) PCT Pub. No.: WO2017/116216
PCT Pub. Date: Jul. 6, 2017

(65) Prior Publication Data
US 2019/0026011 A1    Jan. 24, 2019

(30) Foreign Application Priority Data
Dec. 31, 2015    (CN) .......................... 201511030274.6

(51) Int. Cl.
*G06F 3/0484* (2013.01)
*G06F 3/0488* (2013.01)
(Continued)

(52) U.S. Cl.
CPC ........ *G06F 3/04845* (2013.01); *G06F 3/0482* (2013.01); *G06F 3/0483* (2013.01);
(Continued)

(58) Field of Classification Search
CPC .. G06F 3/04845; G06F 3/0482; G06F 3/0483; G06F 3/0484; G06F 3/04883
See application file for complete search history.

(56) References Cited

U.S. PATENT DOCUMENTS 8,631,341 B2    1/2014 Sauve et al.
8,686,958 B2    4/2014 Rutledge et al.
(Continued)

FOREIGN PATENT DOCUMENTS

CN         1655115 A     8/2005
CN         101526992 A   9/2009
(Continued)

OTHER PUBLICATIONS

Communication dated May 23, 2019 issued by the State Intellectual Property Office of P.R. China in counterpart Chinese Application No. 201511030274.6.
(Continued)

*Primary Examiner* — Sherrod L Keaton
(74) *Attorney, Agent, or Firm* — Sughrue Mion, PLLC

(57) ABSTRACT

A content displaying method according to an embodiment includes: displaying windows allocated to users on a touch panel; displaying pieces of content input from the users on the windows; and displaying thumbnails on the windows, wherein the displaying of the thumbnails includes displaying pieces of content displayed on all windows in the thumbnails.

13 Claims, 33 Drawing Sheets

(51) Int. Cl.
  *G06F 3/0482* (2013.01)
  *G06F 3/0483* (2013.01)
(52) U.S. Cl.
  CPC .......... *G06F 3/0484* (2013.01); *G06F 3/0488* (2013.01); *G06F 3/04883* (2013.01)

(56) References Cited

U.S. PATENT DOCUMENTS

| | | | |
|---|---|---|---|
| 8,957,913 | B2 | 2/2015 | Yoshino |
| 9,514,333 | B1* | 12/2016 | Patel .................. H04L 63/0428 |
| 10,139,990 | B2 | 11/2018 | Lee et al. |
| 10,282,081 | B2 | 5/2019 | Park |
| 2005/0183023 | A1* | 8/2005 | Maruyama ............ G06F 3/1423 715/759 |
| 2005/0183035 | A1* | 8/2005 | Ringel .................. G06F 3/0481 715/811 |
| 2006/0085743 | A1* | 4/2006 | Baudisch .............. G06F 40/106 715/273 |
| 2006/0230356 | A1 | 10/2006 | Sauve et al. |
| 2007/0143690 | A1* | 6/2007 | Nakajima ................ G09G 5/14 715/750 |
| 2007/0213116 | A1* | 9/2007 | Crawford ............ G07F 17/3293 463/16 |
| 2008/0155413 | A1 | 6/2008 | Ubillos |
| 2010/0207888 | A1* | 8/2010 | Camiel ................ G06F 1/1616 345/168 |
| 2010/0241979 | A1* | 9/2010 | Apted ................... G06F 3/0481 715/765 |
| 2011/0163971 | A1 | 7/2011 | Wagner et al. |
| 2012/0076414 | A1* | 3/2012 | Xu ...................... G06F 16/9038 382/176 |
| 2013/0073980 | A1 | 3/2013 | Amendolagine et al. |
| 2013/0083072 | A1 | 4/2013 | Yoshino |
| 2013/0191782 | A1 | 7/2013 | Sugita et al. |
| 2013/0194238 | A1 | 8/2013 | Sakai |
| 2014/0096082 | A1 | 4/2014 | Zhen et al. |
| 2014/0109012 | A1 | 4/2014 | Choudhary et al. |
| 2014/0181753 | A1 | 6/2014 | Kamii et al. |
| 2014/0245137 | A1 | 8/2014 | Kim et al. |
| 2014/0281998 | A1 | 9/2014 | Hwangbo et al. |
| 2014/0298246 | A1 | 10/2014 | Wang et al. |
| 2014/0344750 | A1 | 11/2014 | Takahashi et al. |
| 2015/0199089 | A1 | 7/2015 | Lee et al. |
| 2015/0338945 | A1 | 11/2015 | Masuda et al. |

FOREIGN PATENT DOCUMENTS

| | | |
|---|---|---|
| CN | 102707874 A | 10/2012 |
| CN | 102929520 A | 2/2013 |
| CN | 103207668 A | 7/2013 |
| CN | 103399959 A | 11/2013 |
| CN | 103593138 A | 2/2014 |
| CN | 104777997 A | 7/2015 |
| EP | 3 159 781 A1 | 4/2017 |
| JP | 5-197507 A | 8/1993 |
| KR | 10-2011-0032004 A | 3/2011 |
| KR | 10-2014-0049324 A | 4/2014 |
| KR | 10-2014-0058860 A | 5/2014 |
| KR | 10-2015-0084302 A | 7/2015 |
| WO | 2015/194341 A1 | 12/2015 |

OTHER PUBLICATIONS

Communication dated Apr. 7, 2017 by the International Searching Authority in counterpart International Patent Application No. PCT/KR2017/000013. (PCT/ISA/210).
Communication dated Nov. 7, 2018, issued by the European Patent Office in counterpart European Application No. 17733938.9.
Communication dated Apr. 13, 2020 issued by the State Intellectual Property Office of P.R. China in counterpart Chinese Application No. 201511030274.6.
Communication dated Jul. 31, 2020, issued by the European Patent Office in counterpart European Application No. 17 733 938.9.
Communication dated Oct. 12, 2020 by the China National Intellectual Property Administration (CNIPA) of P.R. China in corresponding Chinese Application No. 201511030274.6.
Communication dated Mar. 9, 2021 by the European Patent Office in corresponding European Application No. 17 733 938.9.
Communication dated Apr. 17, 2021 issued by the Indian Patent Office in counterpart Indian Application Partial English No. 201837028427.

* cited by examiner a) ORIGINAL b) THUMBNAIL

FIG. 23

1. Success loves preparation.
   If the perfect opportunity
   presented itself today, would you be ready?
   It's better to be ready and not have
   an opportunity, then to have an
   opportunity and not be ready.

2. You have to work hard. However,
   when your put in the time,
   it makes success all the more sweet.
   When you come from "behind" and
   do the impossible, ti makes success
   as sweet as a honeycomb.

3. If you don't believe in your abilities,
   don't be surprised if no one else does either.
   Your negative thoughts about yourself
   send a signal throughout the
   that others pick up on and respond.

The Steps to Success
Lina Johnson
Firstly, you must prepare yourself.
Preparation means a good start.
   Without it, you'll never have the
   ability when chances come.
Secondly, *you have to work hard* 
Thirdly, you have to believe in yourself 

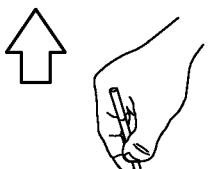
Lina

Hyemin Park

1. *You must prepare yourself*
2. *You have to work hard*
3. *You must believe yourself*

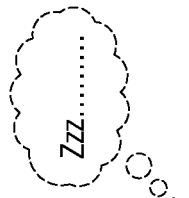
Fulong Wang

METHOD FOR DISPLAYING CONTENTS ON BASIS OF SMART DESKTOP AND SMART TERMINAL

TECHNICAL FIELD

The present disclosure relates to smart terminal technology, and more particularly, to a content displaying method based on a smart desktop and a smart desktop terminal.

BACKGROUND ART

With developments in technology, smart desktop terminals have become part of people's daily life and work. A multi-party conference using smart desktop terminals may be a familiar working scenario. During such a conference, it is common practice to write on smart desktops displayed by the smart desktop terminals, e.g., taking notes, writing a solution, or drawing a picture.

However, when a plurality of users use a smart desktop terminal together, a method of displaying content on a smart desktop becomes an important issue.

DESCRIPTION OF EMBODIMENTS

Technical Problem

Provided is a content interacting method based on a smart desktop.

Solution to Problem

A content displaying method according to an embodiment includes displaying windows allocated to users on a touch panel, displaying pieces of content input from the users on the windows, and displaying thumbnails on the windows, wherein the displaying of the thumbnails includes displaying pieces of content displayed on all windows in the thumbnails.

BRIEF DESCRIPTION OF DRAWINGS

FIG. 23 is a schematic diagram illustrating a third embodiment of providing a prompt, according to Embodiment 10 of the present disclosure.

BEST MODE

Figure 1:
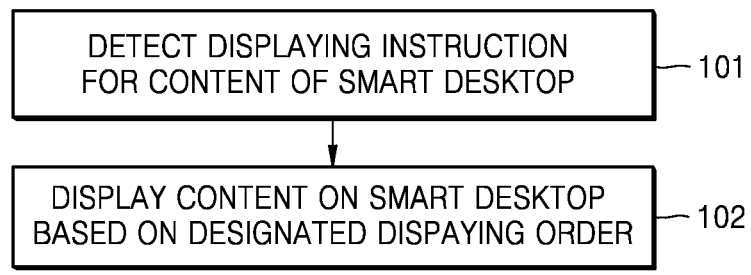
FIG. 1 is a flowchart illustrating a content displaying method based on a smart desktop, according to some embodiments of the present disclosure.

A content displaying method according to an embodiment includes: displaying windows allocated to users on a touch panel, displaying pieces of content input from the users on the windows, and displaying thumbnails on the windows, wherein the displaying of the thumbnails includes displaying pieces of content displayed on all windows in the thumbnails.

MODE OF DISCLOSURE

Hereinafter, the present disclosure will be described in detail with reference to the accompanying drawings in order to enable one of ordinary skill in the art to easily embody and practice the present disclosure. However, the present disclosure is not limited to examples disclosed below, but may be implemented in various forms. Also, parts in the drawings unrelated to the detailed description are omitted to ensure clarity of the present disclosure. Like reference numerals in the drawings denote like elements.

The terms used in the present disclosure are those general terms currently widely used in the art in consideration of functions in the present disclosure, but the terms may vary according to the intention of one of ordinary skill in the art, precedents, or new technology in the art. Accordingly, the terms used herein should not be interpreted only based on names of the terms but should be interpreted based on meanings of the terms and the whole context of the present disclosure.

It will be understood that, although the terms 'first', 'second', etc. may be used herein to describe various elements, these elements should not be limited by these terms. These terms are only used to distinguish one element from another Also, the terms used herein are merely used to describe exemplary embodiments, and are not intended to limit the present disclosure. An expression used in the singular encompasses the expression of the plural, unless it has a clearly different meaning in the context. Throughout the specification, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may further include other elements, not excluding the other elements The use of the terms "a", "an", and "the" and similar referents in the context of describing the disclosure (especially in the context of the following claims) is to be construed to cover both the singular and the plural. Also, the steps of all methods described herein may be performed in any suitable order unless otherwise indicated herein or otherwise clearly contradicted by context. The present disclosure is not limited to the described order of the steps.

The phrase "in some embodiments" or "in an embodiment" shown in various parts of the specification does not necessarily indicate the same embodiment.

Some embodiments of the present disclosure may be described in terms of functional block components and various processing steps. Some or all of such functional blocks may be realized by any number of hardware and/or software components configured to perform specified functions. For example, functional blocks of the present disclosure may employ one or more microprocessors, or various circuit components which carry out predetermined functions. For example, the functional blocks of the present disclosure may be implemented with any programming or scripting language. The functional blocks may be implemented in algorithms that are executed on one or more processors. Furthermore, the present disclosure could employ any number of conventional techniques for electronics configuration, signal processing, and/or data processing. The words "mechanism", "element", "means", and "configuration" may be used broadly and are not limited to mechanical or physical embodiments.

Furthermore, the connecting lines or connectors shown in the various figures are intended to represent exemplary functional relationships and/or physical or logical couplings between various elements. It should be noted that many alternative or additional functional relationships, physical connections, or logical connections may be present in a practical device.

The present disclosure will now be described more fully with reference to the accompanying drawings.

FIG. 1 is a flowchart illustrating a content displaying method based on a smart desktop according to some embodiments of the present disclosure.

As shown in FIG. 1, the method includes the following.

In step 101, a displaying instruction for content of a smart desktop is detected.

In step 102, the content is displayed on the smart desktop based on a designated displaying manner.

In some embodiments, the designated displaying manner includes at least one of:

displaying manner (a): displaying the content in a thumbnail based on a relative position of the content on the smart desktop; and displaying manner (b): displaying the content and/or a summarization of the content based on a user attribute and/or a text attribute associated with the content.

The smart desktop in the embodiments of the present disclosure may be implemented by an independent device or a plurality of interconnected associated devices.

If the smart desktop includes a plurality of interconnected associated devices, the displaying of the content in the thumbnail based on the relative position of the content on the smart desktop (a) may include: detecting a relative position of each associated device, and displaying the content of each associated device in the thumbnail based on the relative position of the associated device.

The detecting of the relative position of each associated device may include at least one of the following.

(1) Determining the relative position of each associated device based on a network signal detecting result of each associated device.

For example, the relative position of each associated device may be determined based on a combined detecting result of one or more of a wireless communication signal, an infrared communication signal, a Bluetooth communication signal, and a wireless local area network signal of the associated device.

(2) Determining the relative position of each associated device based on a relative position setting value.

For example, each associated device may set a relative position setting value and exchange the relative position setting value with other associated devices. Therefore, a position topology of the associated devices may be determined based on each relative position setting value. As such, the relative position of each associated device may be determined.

The above description provides a general embodiment for detecting the relative position of each associated device. One of ordinary skill in the art would know that the above description is merely an example and is not used for restricting the protection scope of the present disclosure.

In some embodiments, the displaying of the content in the thumbnail based on the relative position of the content on the smart desktop in the displaying manner (a) may include at least one of the following.

(1) Determining a viewing direction of a user and adjusting a displaying direction of the content in the thumbnail according to the viewing direction of the user.

In particular, the determining of the viewing direction of the user may include: determining the viewing direction of the user according to a handwriting characteristic of handwritten content of the user; and/or, determining the viewing direction of the user according to a collected user image.

(2) Compressing a redundant area in the thumbnail.

In some embodiments, the compressing of the redundant area in the thumbnail may include:

dividing the content into one or more content blocks according to at least one of a semantic correlation, a position correlation, a time sequence correlation, and a user correlation; and expanding one or more content blocks to remove the redundant area from among the content blocks.

(3) Adjusting a font of the content in the thumbnail.

In particular, a font of each content block in the thumbnail may be adjusted to a suitable font, such that the content block is exactly filled up with the content as far as possible and the user is able to see the content as clearly as possible. The font of each content block may be adjusted. The adjusting scale of the font of each content block may be different or the same.

(4) Displaying the summarization of the content in the thumbnail.

(5) Hiding private information in the content, etc.

For example, private information in the content or in the summarization of the content may be determined based on a user-defined manner or a text analyzing manner. The hiding may include: not displaying the private information or replacing the private information by a private identifier, etc.

In some embodiments, the displaying of the content in the thumbnail according to the relative position of the content on the smart desktop in the displaying manner (a) may further include at least one of the following.

(1) Detecting an operation for selecting content in the thumbnail, and providing an enlarged display for the selected content in the thumbnail and/or an adjacent area of the thumbnail.

Through providing the enlarged display for the selected content, the user may easily view the selected content.

(2) Prompting the user in the thumbnail when detecting an update of the content of the smart desktop, and updating the content in the thumbnail according to a user instruction.

Through prompting the user of the update of the content in the thumbnail, the user is able to know the update of the content of the smart desktop in time. Further, the content may be updated in the thumbnail based on an instruction initiatively triggered by the user.

(3) Updating the content in the thumbnail when detecting an update of the content of the smart desktop.

When it is detected that there is an update for the content of the smart desktop, it is also possible to initiatively update the content of the smart desktop without prompting the user or a user instruction.

(4) Receiving a content editing instruction and editing the content in the thumbnail based on the content editing instruction.

In some embodiments, the displaying of the content and/or the summarization of the content based on the user attribute and/or text attribute associated with the content in the displaying manner (b) may include: hiding the private information in the content and/or the summarization of the content. In some embodiments, the method may further include at least one of the following.

(1) Receiving a content viewing instruction, and displaying content associated with the summarization based on the content viewing instruction.

(2) Receiving a summarization length changing instruction, and changing a length of the summarization based on the summarization length changing instruction.

(3) Receiving a searching instruction, and searching in the content and/or the summarization of the content based on the searching instruction.

In some embodiments, the content includes content to be shared. The designated displaying manner in step 102 includes:

determining a user receiving the content to be shared and/or a displaying position of the content to be shared; and displaying the content on the smart desktop based on the determined user and/or displaying position. In view of the above, through designating the user receiving the content to be shared and/or the displaying position of the content to be shared, the content to be shared may be displayed to the user receiving the content, or may be displayed in any displaying position.

In some embodiments, the content to be shared may be determined via the following manner:

designating existing content as the content to be shared; or, designating content which is written in real time as the content to be shared.

In some embodiments, the method may further include: adjusting the displaying direction of the content to be shared according to a viewing direction of the user receiving the content to be shared.

Herein, the determining of the viewing direction of the user may include: determining the viewing direction of the user based on a handwriting characteristic of handwritten content of the user; or determining the viewing direction of the user based on a collected user image (e.g., a detected user sitting image), etc.

In some embodiments, the content includes content to be shared. The designated displaying manner in step 102 may include: setting a sharing region on the smart desktop; receiving a content sharing determining instruction; and in response to the content sharing determining instruction, copying the content to be shared to the sharing region. In view of the above, according to the embodiments of the present disclosure, the content shared by the user may be copied to the designated sharing region. As such, other users may conveniently obtain the shared content.

In some embodiments, the method may further include at least one of the following.

(1) Receiving a sharing region rotating instruction, and in response to the sharing region rotating instruction, rotating the sharing region.

A user desiring to obtain the shared content may not be near a displaying position of the shared content. At this time, through initiatively rotating the sharing region, the user desiring to obtain the shared content may be close to the shared content conveniently.

(2) Receiving a sharing region rotation stop instruction, and in response to the sharing region rotation stop instruction, stopping the rotation of the sharing region.

When the content to be shared is rotated to nearby the user desiring to obtain the content, the user may stop the rotation of the sharing region by triggering the sharing region rotation stop instruction.

(3) Receiving a sharing region content obtaining instruction, and in response to the sharing region content obtaining instruction, copying corresponding content in the sharing region.

If the content to be shared is stopped nearby the user desiring to obtain the content, the user may copy the content to be shared to his displaying area in the sharing region, so as to obtain the content shared by other users.

In some embodiments, the content includes: existing content which has a position conflict with content currently being written.

The detecting of the displaying instruction for the content of the smart desktop in step 101 includes: detecting the existing content which has the position conflict with the content currently being written, and triggering the displaying instruction for the existing content when detecting the existing content.

The designated displaying manner in step 102 includes: temporarily hiding the existing content.

According to the embodiments of the present disclosure, through hiding the existing content having the position conflict, it is possible to continue the current handwriting.

In some embodiments, the method further includes:

after an input of the content currently being written on the desktop is finished, determining a display resuming manner based on the semantic correlation between the existing content and the current currently being written; wherein the display resuming manner includes at least one of: resuming the display after moving a position of the existing content and/or the content currently being written; and resuming the display by rearranging a layout of the existing content and/or the content currently being written.

In some embodiments, the content includes: content covered by an occluding object on the smart desktop.

The detecting of the displaying instruction for the content of the smart desktop in step 101 includes: detecting the occluding object on the smart desktop, and, when the content of the smart desktop is covered by the occluding object, triggering the displaying instruction for the covered content.

The designated displaying manner in step 102 includes: rearranging a layout of the covered content.

In some embodiments, the rearranging of the layout of the covered content includes: rearranging the layout of the covered content according to at least one of: a character continuity, a text line continuity, a paragraph continuity, a semantic correlation, an image continuity, and a correlation between an image and text of the covered content.

In view of the above, the present disclosure provides a solution for the conflict between the newly input content and the existing content and for the covered content, so as to solve the conflict between the newly input content and the existing content and ensure a normal display of the covered content.

In some embodiments, the method further includes:

determining prompt information for the content currently being written based on the existing written content and displaying the prompt information.

In view of this, according to the embodiments of the present disclosure, prompt information may be displayed, which may intelligently prompt the user of content or a summarization that is not written by the user but has been written by other users and intelligently correct the content having been written by the user through analyzing the content written by all users, which improves the writing experience of the user, increases the efficiency for accomplishing the same task by multiple users, and avoids repeated conceiving and writing by the multiple users.

In some embodiments, the determining of the prompt information for the content currently being written according to the existing written content includes at least one of:

(1) retrieving a keyword from the content currently being written, and determining the prompt information for the content currently being written according to a keyword retrieved from the existing written content if a similarity degree between the keyword retrieved from the content currently being written and the keyword retrieved from the existing written content is higher than a threshold, (2) retrieving a keyword from the content currently being written, obtaining a context keyword corresponding to the keyword retrieved from the content currently being written according to a keyword and a context keyword retrieved from the existing written content, and determining the prompt information for the content currently being written according to the obtained context keyword, (3) retrieving a context keyword from the content currently being written, obtaining a keyword corresponding to the context keyword retrieved from the content currently being written according to a keyword and a context keyword retrieved from the existing written content, and determining the prompt information for the content currently being written according to the obtained keyword, and (4) retrieving a summarization for the existing written content from the existing written content, retrieving a summarization for the content currently being written from the content currently being written, comparing the summarization for the existing written content with the summarization for the content currently being written, and determining the prompt information for the content currently being written according to a compared result.

In some embodiments, the content includes time reminding information.

The detecting of the displaying instruction for the content of the smart desktop in step 101 includes: detecting a reminding time set by the user, and triggering the displaying instruction for the content when the reminding time set by the user arrives.

The designated displaying manner in step 102 includes: if each user using the smart desktop sets the same the reminding time, when the reminding time arrives, playing the time reminding information via at least one of: a voice, an icon, and text; or if each user using the smart desktop sets a different reminding time, when the reminding time arrives, playing the time reminding information via at least one of: an icon and text.

In view of the above, the embodiments of the present disclosure realize parallelized scheduling of time reminding resources of the smart desktop for different users, and thus a resource utilization rate is increased.

In conclusion, for multiple user-invoking requests for the same resource of the smart desktop, the present disclosure provides a solution which is able to solve a conflict between the multiple user invoking requests and ensure normal and reasonable invoking of the smart desktop.

In some embodiments, the method may further include:

starting recording after receiving a recording start instruction from the user;

stopping recording after receiving recording stop instructions from all users; and generating a recording file for each user according to the recording start instruction and recording stop instruction of each user.

Therefore, the embodiments of the present disclosure also realize parallelized invoking of recording resources of the smart desktop for multiple users, and thus increase a resource utilization rate.

In some embodiments, the method may further include:

receiving written content, generating a user characteristic based on a handwriting characteristic of the written content and a writing assistant characteristic, and saving the user characteristic; and receiving content written by a user to be authenticated, generating a user characteristic to be authenticated based on a handwriting characteristic of the content written by the user to be authenticated and a writing assistant characteristic, and determining that authentication succeeds if the user characteristic to be authenticated matches the saved user characteristic.

In view of the above, the present disclosure realizes user authentication based on a new user authentication method. The user does not need to write content used for authentication in advance. Instead, the authentication may be performed on the user during a free writing procedure.

In some embodiments, the method may further include:

establishing a connection relationship between the smart desktop and an associated device, and exchanging content of the smart desktop and/or content of the associated device between the smart desktop and the associated device based on the connection relationship.

In some embodiments, the exchanging of the content of the smart desktop with the associated device may include the following:

(1) Determining content to be distributed in the content of the smart desktop, and determining from among associated devices the associated device that is to receive the content to be distributed; and in response to a content distribution instruction, transmitting the content to be distributed to the associated device that is to receive the content to be distributed.

For example, an application scenario may include: in class, a teacher uses a smart whiteboard and students use the associated devices. A detailed behavior may include: the teacher distributes tasks to the students.

(2) Obtaining editing information for the content provided by the designated associated device, and transmitting the editing information to the designated associated device.

For example, an application scenario may include: in class, the teacher uses the smart whiteboard and the students use the associated devices. A detailed behavior may include: the teacher inspects and grades the students' homework.

(3) Determining content to be shared on the smart desktop and transmitting the content to be shared to the designated associated device.

For example, an application scenario may include: in class, the teacher uses the smart whiteboard and the students use the associated devices. The detailed behavior may include: the teacher shares teaching content.

(4) Receiving editing information of the associated device for the content shared by the smart desktop, and displaying the received editing information.

For example, an application scenario may include: in class, the teacher uses the smart whiteboard and the students use the associated devices. The detailed behavior may include: the teacher receives the students' notes.

(5) Determining an area of the smart desktop covered by the associated device, and transmitting content in the area of the smart desktop to the associated device.

For example, an application scenario may include: a plurality of persons are around the smart desktop and each one holds an associated device such as a cell phone. The detailed behavior may include: putting the associated device such as the cell phone on content of the smart desktop that is to be saved. At this time, the smart desktop senses an area covered by the associated device and then transmits the content in the area to an application in the associated device such as the cell phone for storage via manners such as near-field communication (NFC) or wireless fidelity (Wi-Fi).

(6) Transmitting designated content on the smart desktop to the designated associated device.

For example, an application scenario may include: a plurality of users are around the smart desktop and each one hold an associated device such as a cell phone. The detailed action may include: a user performs a specific action (e.g., clicking a content transmitting button). After detecting the user's action, the smart desktop transmits designated content on the smart desktop to the designated associated device.

(7) Receiving the content transmitted by the associated device, determining the area covered by the associated device, and displaying the received content in the determined area.

For example, an application scenario may include: a plurality of users are around the smart desktop and each one holds an associated device such as a cell phone. The detailed action may include: a user puts the associated device such as the cell phone on an area of the smart desktop where he expects to display content of the cell phone. At this time, the smart desktop senses that the area is covered by the associated device. The content may be transmitted via manners such as NFC or Wi-Fi and displayed in the area.

In some embodiments, the smart desktop may include associated devices having a connection relationship.

The displaying of the content on the smart desktop based on the designated displaying manner in step 102 includes:

obtaining content of the associated device according to the connection relationship, and displaying the obtained content based on the designated displaying manner.

In the prior art, an authentication method based on content written by a user mainly includes: a user writes preset signature content in advance. A device records and saves a handwriting characteristic (e.g., a writing characteristic) of the signature content. When it is required to authenticate the user, the user writes the same signature content again. The device matches the handwriting characteristic of the content currently being written and the saved handwriting characteristic so as to determine the identity of the user. However, in this authentication method, the user has to register handwritten content in advance and has to write fixed signature content during authentication. The user may not be able to write freely and this may bring trouble to the user.

According to an embodiment, the present disclosure further provides a user authentication method. Based on the user authentication method, a user does not need to register handwritten content in advance and user authentication may be performed during a free writing procedure of the user.

Figure 2:
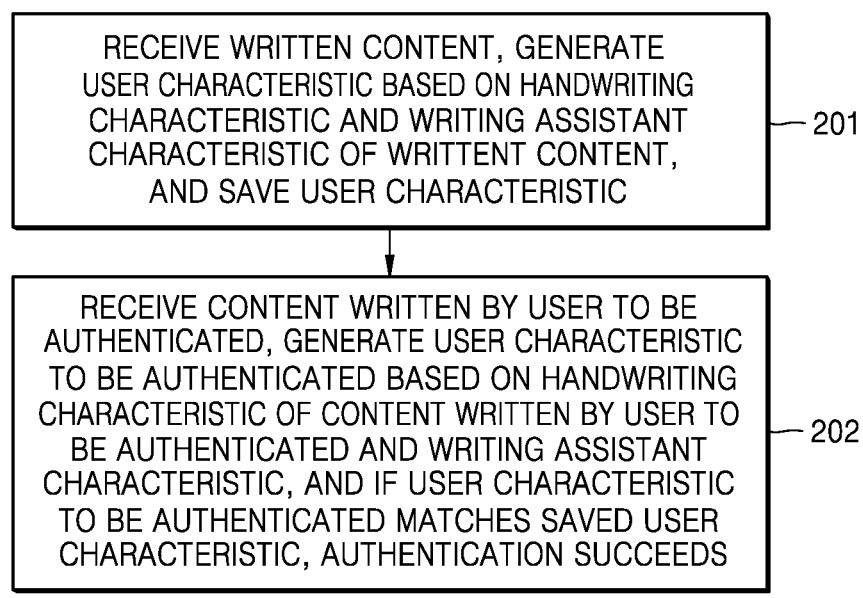
FIG. 2 is a flowchart illustrating a user authentication method according to some embodiments of the present disclosure.

FIG. 2 is a flowchart illustrating a user authentication method according to some embodiments of the present disclosure.

As shown in FIG. 2, the method includes the following.

In step 201, written content is received, a user characteristic is generated based on a handwriting characteristic of the written content and a writing assistant characteristic, and the user characteristic is saved.

Herein, a device does not require a user to write preset signature content and allows the user to write freely. At this time, the device does not know the identity of the user. While receiving the written content input by the user in real time, the device records the handwriting characteristic (such as a pressure, a speed, an acceleration, a stroke characteristic, etc.) of the written content and also records the writing assistant characteristic (such as position coordinates, time information, a writing direction, and a text line direction for the writing, etc.). Then, the device may generate the user characteristic of the current user through a characteristic retrieving algorithm and saves the user characteristic in the device.

In step 202, content written by a user to be authenticated is received, a user characteristic to be authenticated is generated based on a handwriting characteristic of the content written by the user to be authenticated and a writing assistant characteristic, and if the user characteristic to be authenticated matches the saved user characteristic, authentication succeeds.

During continuous writing of the user to be authenticated, the user characteristic to be authenticated is generated based on the handwriting characteristic (e.g., a pressure, a speed, an acceleration, a stroke characteristic, etc.) of the content written by the user to be authenticated and the writing assistant characteristic (e.g., position coordinates, time information, a writing direction, a text line direction for the writing, etc.). The user characteristic to be authenticated is compared with the user characteristic saved in the device. During the matching, the device may determine the identity of the user based on various aspects such as a handwriting characteristic, writing position coordinates, a time continuity, a writing direction, a text line direction, a writing area, and written content.

If the user characteristic to be authenticated matches the saved user characteristic, the authentication of the user identity succeeds. Otherwise, if the user characteristic to be authenticated does not match any saved user characteristic, the user characteristic to be authenticated is saved and a new user identifier is created for the current user.

According to an embodiment, the present disclosure further provides a content displaying method for a smart desktop including an associated device.

Figure 3:
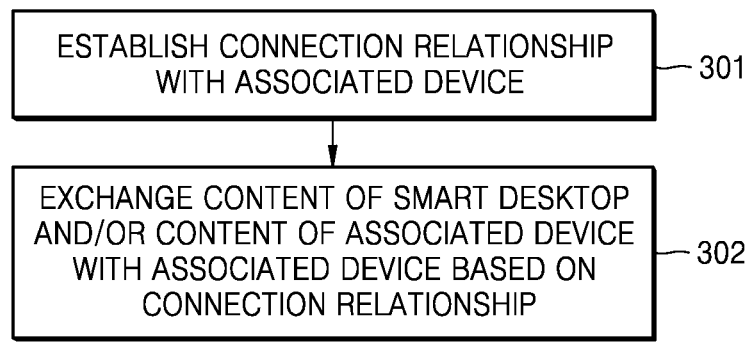
FIG. 3 is a flowchart illustrating a content displaying method for a smart desktop including an associated device, according to some embodiments of the present disclosure.

FIG. 3 is a flowchart illustrating a content displaying method for a smart desktop including an associated device according to some embodiments of the present disclosure.

As shown in FIG. 3, the method includes the following.

In step 301, a connection relationship with an associated device is established.

In step 302, content of a smart desktop and/or content of the associated device are exchanged with the associated device based on the connection relationship.

In particular, the exchanging of the content of the smart desktop and/or the content of the associated device may include at least one of the following:

(1) Determining content to be distributed in the content of the smart desktop, and determining from among associated devices the associated device which is to receive the content to be distributed; and in response to a content distribution instruction, transmitting the content to be distributed to the associated device that is to receive the content to be distributed.

(2) Obtaining editing information for the content provided by the designated associated device, and transmitting the editing information to the designated associated device.

(3) Determining content to be shared on the smart desktop and transmitting the content to be shared to the designated associated device; and receiving editing information of the associated device for the content shared by the smart desktop, and displaying the received editing information.

(4) Determining an area of the smart desktop covered by the associated device, and transmitting content in the area of the smart desktop to the associated device.

(5) Transmitting designated content on the smart desktop to the designated associated device.

(6) Receiving the content transmitted by the associated device, determining the area covered by the associated device, and displaying the received content in the determined area.

Hereinafter, the above solution of the present disclosure is described in detail with reference to the accompanying embodiments.

Figure 4:
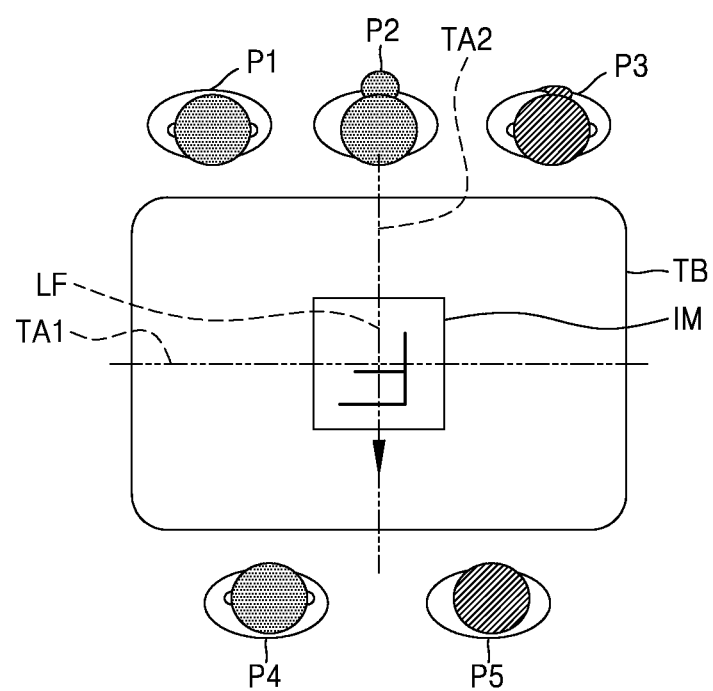
FIG. 4 is a schematic diagram illustrating a multi-party conference according to some embodiments of the present disclosure.

FIG. 4 is a schematic diagram illustrating a multi-party conference. As shown in FIG. 4, multiple users sit around a smart desktop and start the meeting. Each user may write content on the smart desktop in an area close to him following his writing habit.

In the prior art, viewing requirements of users in different directions may not be met. For example, when multiple users use a smart desktop to write content, it is inconvenient to view the content written by other users due to their different sitting positions and different directions. For example, the users sitting face to face have opposite viewing directions. Thus, it is difficult for them to view content written by the other user.

Embodiment 1

Hereinafter, a solution is described in detail: a displaying instruction for content of a smart desktop is detected; and the content is displayed on the smart desktop based on a designated displaying manner. The designated displaying manner may include: displaying the content in a thumbnail based on a relative position of the content on the smart desktop.

As shown in FIG. 4, it is often necessary to write content, e.g., taking notes, writing a solution, drawing a picture, etc. When multiple users write content by using a smart desktop, it is inconvenient to view the content written by other users due to their different sitting positions and different directions.

Scenario: a user A is hosting a brain storm. Other users have written their thoughts on respective positions of the smart desktop. The user A wants to view solutions of all users.

Solution: a thumbnail based on a relative position of content

Based on the present disclosure, a thumbnail may be provided according to an operation of the user A. The providing manner may include at least one of the following:

(1) Voice Operation

The user A provides a voice, e.g., saying "I want to see a thumbnail". At this time, the smart desktop displays the thumbnail in a blank area in front of the user A. If an area in front of the user A is filled up, content in front of the user A in an area with the same size as the thumbnail may be hidden to display the thumbnail.

(2) Physical Button Operation

The user A may call out the thumbnail by pressing a certain button on the smart desktop.

(3) Touch Screen Operation

The user A may call out the thumbnail by touching a screen, e.g., double clicking the screen. At this time, the smart desktop displays the thumbnail on a position where the user touches the screen. If there is content on this position, the content in an area with the same size as the thumbnail may be temporarily hidden to display the thumbnail.

(4) Gesture Operation

The user A provides a gesture action, e.g., swiping a hand. At this time, the smart desktop captures the gesture action of the user A via a camera and displays the thumbnail in a blank area in front of the user A. If an area in front of the user A is filled up, content in front of the user A in an area with the same size as the thumbnail may be hidden to display the thumbnail.

(5) External Controller Operation

The user operates an external controller, e.g., pressing a button of a stylus pen. At this time, the smart desktop displays the thumbnail on a position pointed by the stylus pen. If there is content on this position, content in an area with the same size as the thumbnail may be temporarily hidden to display the thumbnail.

Figure 5:
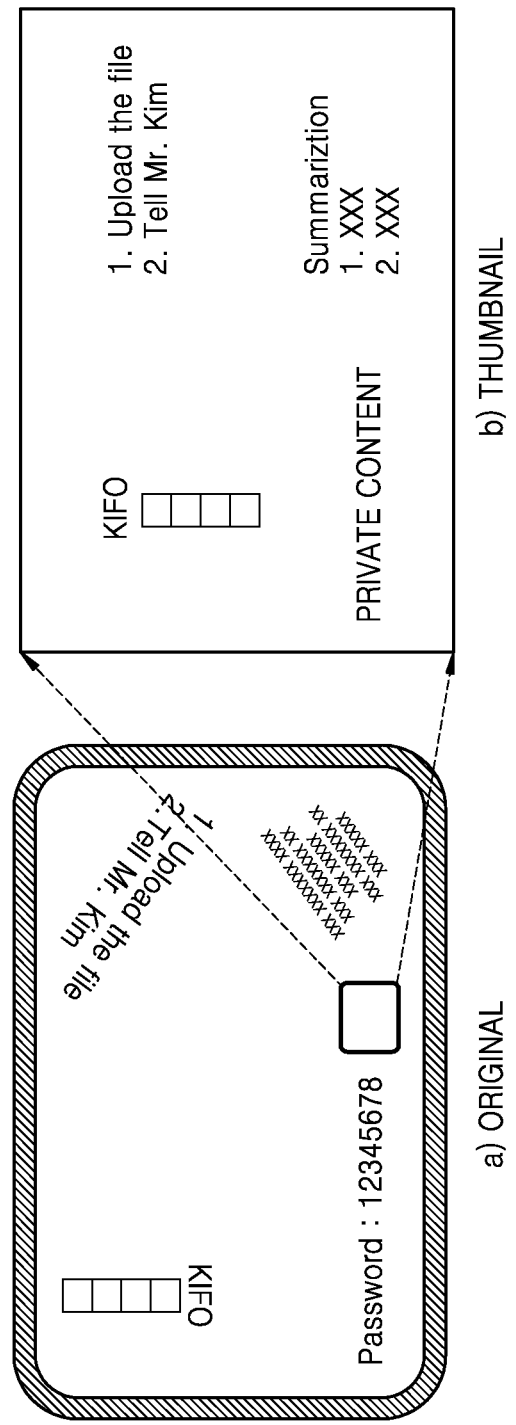
FIG. 5 is schematic diagram illustrating a display of a thumbnail according to Embodiment 1 of the present disclosure.

FIG. 5 is a schematic diagram illustrating a display of a thumbnail according to Embodiment 1 of the present disclosure. The left part of FIG. 5 illustrates an actual display of the smart desktop, wherein different users have different writing positions and directions. If a user wants to view written content of other users, a thumbnail may be called out as shown in the right part of FIG. 5.

The user may have various configurations for his thumbnail. The configurations may include the following.

(1) Determine Whether Non-Handwritten Content is Displayed in the Thumbnail

As a viewer, when the user A confirms to display merely handwritten content, merely handwritten content of users of the smart desktop (all users or users other than the viewer) is displayed in the thumbnail, whereas non-handwritten content such as text, an image, slides, and a video is not displayed.

(2) Determine Whether Content of the User Himself is Displayed in the Thumbnail

As a viewer, when the user A confirms to display merely content of himself, the content of the user A (the viewer) is displayed in the thumbnail. If the user A confirms not to display the content of himself, the content of the user A is not displayed in the thumbnail.

(3) Determine whether pieces of content of different users are differentiated by colors According to an embodiment, it is possible to recognize different users according to their handwriting, so as to obtain content written by the different users.

When the user A confirms to differentiate pieces of content of the different users by colors, the pieces of content written by the different users may be differentiated by different colors in the thumbnail on the smart desktop, i.e., the pieces of content written by the different users have different handwriting colors. For example, a user B has written in the top-left corner and bottom-left corner of the smart desktop. At this time, a system recognizes that pieces of content in the two areas are both written by the user B. When the user A views the thumbnail, the pieces of content in the two areas are displayed in the same color which is different from colors of content written by other users. Even when the user B has written in two areas by using different colors, pieces of content in the two areas are presented in the same color in the thumbnail called out by the user A.

If the user A confirms to display all pieces of content in their original colors, the pieces of content in the thumbnail of the smart desktop remain in original written colors. For example, the user B writes in both the top-left corner and bottom-left corner of the smart desktop, wherein content in the top-left corner is written in black and content in the bottom-left corner is written in blue. At this time, in the thumbnail viewed by the user A, the content in the top-left corner is still displayed in black and the content in the bottom-left corner is still displayed in blue.

According to an embodiment, user information (e.g., a user name, a user bust image, etc.) may be displayed in the thumbnail of a region adjacent to content written by each user.

According to an embodiment, user information (e.g., a user name, a user head image, etc.) may be displayed in the thumbnail adjacent to content written by each user. Also, when the user A selects content in the thumbnail (e.g., in a closed region), user information corresponding to the content selected by the user A may be displayed.

(4) Select a Size and a Position for the Thumbnail

When it is confirmed to automatically determine a size and a position of the thumbnail, an initial size of the thumbnail is a standard size set in the system and a displaying position is determined automatically. The smart desktop preferably displays the thumbnail in a blank area in a displaying area corresponding to the user. If the blank area in the corresponding displaying area is slightly smaller than the standard size of the thumbnail set in the system (e.g., a difference between a size of the blank area in the corresponding displaying area and the standard size set for the thumbnail in the system is smaller than a preset area threshold), the size of the thumbnail may be slightly reduced to fit for the blank area in the corresponding displaying area. However, if the blank area in the corresponding displaying area is far smaller than the standard size set for the thumbnail in the system (e.g., the difference between the size of the blank area in the corresponding displaying area and the standard size set for the thumbnail in the system is not smaller than the preset area threshold), the user has to proceed to the following next level options:

i. Covering Mode (Covering Existing Content)

If the user does not need to view content written by himself while viewing the thumbnail, this option may be selected. At this time, the smart desktop displays the thumbnail in the corresponding displaying area of the user and temporarily hides content covered by the thumbnail.

ii. Inserting Mode (Inserting into Content)

If the user needs to view the content written by himself while viewing the thumbnail, this option may be selected. At this time, the smart desktop inserts the thumbnail at the end of the corresponding displaying area of the user. Subsequently, the content handwritten by the user is displayed around the thumbnail. If a displaying space is not enough for the handwritten content of the user, a solution such as changing a layout and dividing into multiple pages may be utilized.

If it is confirmed to manually determine the size and position of the thumbnail, the user determines the size and position of the thumbnail via a touch screen gesture. For example, the touch desktop detects that the user touches the screen on at least two positions at the same time. The smart desktop determines the position and size according to the detected touching positions of the user. For example, when the user touches the bottom-left of the screen with the left index finger and the top-right of the screen with the right index finger at the same time, the position pressed by the left index finger will be the bottom-left corner of the thumbnail and the position pressed by the right index finger will be the top-right corner of the thumbnail. At this time, if there is content on the position determined by the user, it is possible to proceed to the following next level options:

i. Covering Mode (Cover Existing Content); ii. Inserting Mode (Insert into the Content)

(5) Select a Desired Area for Generating the Thumbnail

In a thumbnail frame, a reduced-size screenshot of the current screen is displayed. The 100% whole screen is selected in default. At this time, the user may select an area for forming the thumbnail by dragging the screenshot or the thumbnail frame. If a border of the area selected by the user cuts complete content, the border may be automatically expanded to include the complete content. When the user is interested in merely some content in the screen, the user may select such an area via this manner. The system will generate the thumbnail for the area selected by the user.

According to an embodiment, a configuration interface may be provided after the user calls out the thumbnail. The user may set as described above on the configuration interface. The smart desktop displays the corresponding thumbnail according to the user's setting. Optionally, the user may also preset a displaying manner of the thumbnail in advance. After the user calls out the thumbnail, the smart desktop displays the corresponding thumbnail according to the displaying manner preset by the user.

In addition, when the thumbnail is displayed, the user may adjust the displaying manner of the thumbnail in real time. The smart desktop may dynamically adjust the displayed thumbnail. For example, the user sets in advance not to display content written by himself in the thumbnail. Therefore, the thumbnail initially presented by the smart desktop does not include the content written by the user. If the user sets to display the content written by himself via a preset operating manner (e.g., a voice, a screen gesture, etc.) while viewing the thumbnail, the smart desktop dynamically adjusts the thumbnail in real time to present the content written by the user in the thumbnail.

According to an embodiment, pieces of content to be displayed in the thumbnail may be displayed in the thumbnail according to relative positions of the pieces of content on the smart desktop. In other words, a position relationship between the pieces of content in the thumbnail is kept consistent with that on the smart desktop.

After the setting is finished, the system displays the thumbnail in the thumbnail frame. The displaying of the content in the thumbnail includes the following.

(1) Block Division

The system may determine which pieces of content are highly correlated (e.g., a paragraph may not be segmented) and takes such pieces of content as one block based on the following several correlations:

(a) Content correlation: it is determined whether a part of content has a close semantic relationship with another part of content based on techniques such as handwriting recognition, semantic analysis, symbol detection, and text summarization. For example, a symbol mark or revised content for a paragraph is highly correlated with content of this paragraph.

(b) Position correlation: it is determined whether two parts of handwritten content are highly correlated based on a position relationship of the two parts. For example, two paragraphs with similar positions and aligned on left and right sides are determined to be highly correlated.

(c) Time sequence correlation: a time sequence of written content is detected. For example, content which is written continuously has a high time sequence correlation.

(d) User correlation: a handwriting characteristic and a font size of content are detected. If two parts are written by the same user, a user correlation is high.

The smart desktop may divide the content on the smart desktop into one or more content blocks based on at least one of the above correlations, wherein the correlations are considered according to a following priority order: a content correlation, a position correlation, a time sequence correlation, and a user correlation.

After the block division, the divided blocks may be rearranged, including block expansion and content adjustment.

(2) Block Expansion

After the content blocks are determined, each content block represents meaningful and indivisible independent content. The system may determine boundaries of all blocks. A remaining part on the screen is a blank area including no content. Since the blank area is a redundant area in the thumbnail and is meaningless, the redundant area between the content blocks may be removed by expanding one or more content blocks, so as to improve the viewing effect of the thumbnail and save screen resources. The block expansion manner includes: (a) Detecting block information entropy: for each block, information entropy of the block is determined based on factors such as a block size, an average font size, the number of characters, an image size, a graph content density, etc. The larger the information entropy, the more the content and the denser the content. For example, if a large area includes merely several very large characters, the information entropy is relatively small. (b) Determining an expansion rate: an expansion rate (may be a negative value, i.e., the block contracts) of each block is determined according to the information entropy of the block. At this time, the boundaries of all blocks will expand at the respective expansion rate, e.g., expanding outward 5 mm per second. (c) Expansion stop condition: when boundaries of two blocks encounter each other during the expansion, the expansion of the two blocks stops, which does not affect the expansion of other blocks, until the expansion of all blocks stops. For a contracting block, the contraction is stopped when the block contracts to a threshold set by the system (relevant to factors such as a content font size).

Figure 6:
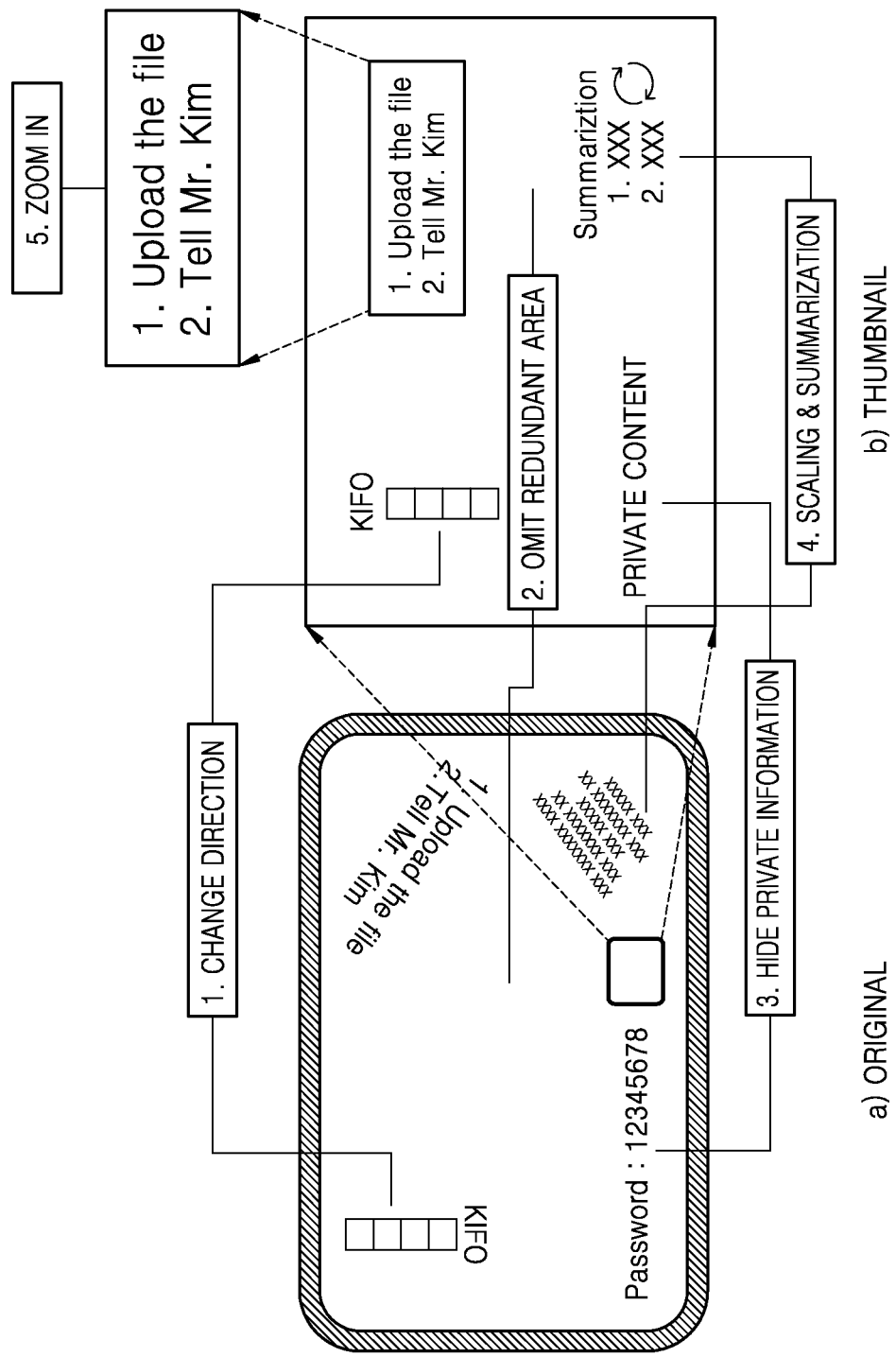
FIG. 6 is a schematic diagram illustrating a display of the thumbnail according to Embodiment 1 of the present disclosure.

FIG. 6 is a schematic diagram illustrating a display of the thumbnail according to Embodiment 1 of the present disclosure. As shown in FIG. 6, a "② compressed blank area" illustrates a result of block expansion.

The block expansion provided by the present disclosure is an optional step. The objective of the block expansion is to compress the blank area. Besides the above solution for realizing the block expansion, the smart desktop may also compress the blank area via other manners, e.g., the user selects designated content and instructs via an operation (e.g., a multi-finger expansion operation) the smart desktop to provide an expanded display. After detecting the above operation, the smart desktop provides an expanded display for the content designated by the user, and ends the expansion operation after detecting that the user instructs to end the operation.

(3) Content Adjustment

After the boundary of each block is determined, the content may be adjusted as follows: (1) direction adjustment: the smart desktop determines a viewing direction of the viewer, and adjusts a displaying direction of the content in the thumbnail according to the viewing direction of the viewer, e.g., adjusting a displaying direction of content of each block in the thumbnail to be consistent with the viewing direction of the viewer, such that the viewer may view content written by other users conveniently; wherein the viewing direction of the viewer may be determined via an image of the viewer collected by a camera, e.g., directly determining the viewing direction via the image of the viewer, or obtaining a sitting posture of the viewer via the image of the viewer and obtaining the viewing direction based on the sitting posture of the viewer. The viewing direction may also be determined via a handwriting characteristic of the viewer, or may be designated by the viewer. As shown in FIG. 6, a "① content direction change" illustrates a result after direction adjustment.

(2) Font adjustment: the smart desktop adjusts a font of the content of each block in the thumbnail to a proper font to let the content exactly fill out the block and the user may see the handwritten content as clear as possible. The smart desktop performs the font adjustment on each block. The font adjustment scale of each block may be different. Therefore, it is also referred to as non-proportional scaling. As shown in FIG. 6, "③ non-proportional scaling" illustrates a result after font adjustment.

(3) Summarization display: the smart desktop may automatically generate a summarization based on the content in the thumbnail. For example, if a font size of a particular block is smaller than a threshold (relevant to a size of the thumbnail and a distance between the user and the thumbnail, the threshold represents a font size that the user may just see clearly), the smart desktop displays the content of the block in the form of a summarization. It is also possible to control the generation of the summarization by the user. For example, the user may adjust the content in real time during a viewing procedure of the thumbnail, e.g., setting that a particular part of the content is displayed in the form of a summarization via an operation such as a voice or a screen gesture. After detecting the user's operation, the smart desktop generates a summarization for the part of the content selected by the user and presents the summarization of the part of the content in the thumbnail. The user may also view the complete content corresponding to the summarization.

In addition, the thumbnail may further have the following functions:

1. Privacy Setting

The user may set a part of his content as private content via manners such as selecting a closed region by a gesture and hope that such private content is invisible for other users. In addition, the user may select to which users that he does not want to expose the private content. At this time, when the smart desktop detects that the selected user opens the thumbnail, the private content of the user is not presented in the block, i.e., the smart desktop hides the private content of the user in the thumbnail.

The hiding of the private information in the thumbnail includes: not displaying the private information, or replacing the private information by a private identifier.

In particular, the private identifier, e.g., "private content", may be displayed in an area corresponding to the private information in the thumbnail. Or, it is possible to display no information and compress the corresponding area to display other content, so as to save a displaying space effectively.

As shown in FIG. 6, "④ hide private content" illustrates a result after privacy setting.

In addition, according to an embodiment, the smart desktop may automatically detect whether the content of the user is private content. For example, if content such as figures in a personal account, a user name, or a password is detected, it is determined that the corresponding content may be private content.

2. Enlarged Viewing

When the user A wants to view detailed original content of a part (e.g., a summarization) in the thumbnail, the user A may select the block via manners such as clicking the touch screen. At this time, the smart desktop detects the user's operation selecting the content, and displays the selected content in an enlarged manner in the thumbnail and/or in an area around the thumbnail, i.e. the content of the selected block is displayed in the thumbnail or around the thumbnail along with a font and a layout of the original content. If there is much content, viewing manners such as left-right and up-down scrolling may be provided. As shown in FIG. 6, "⑤ zoom in" illustrates a result of enlarged viewing.

3. Content Update (1) When the user A views the thumbnail, if another user modifies or complements the content, the smart desktop prompts the user in the thumbnail when detecting that the content is updated. For example, if determining that the other user's modification is temporarily finished via a manner such as a time sequence (e.g., the writing has been stopped for a while), the smart desktop displays an update prompt in the block of the content on the thumbnail of the user A in the form of an icon or gradient background color. The user A may provide a content instruction by clicking the touch screen on the content of the thumbnail, and the smart desktop updates this part of content in the thumbnail according to the user's instruction.

(2) The smart desktop may detect in real time whether there is a change in the content. When detecting that there is an update in the content, the smart desktop may directly update this part of content in the thumbnail and display the updated content. This manner may also be referred to as an instant thumbnail updating manner. This procedure may lead to a change of a block size. As shown in FIG. 6, "⑥ update prompt" illustrates a result of content update.

In the above procedure, when the content is displayed in the thumbnail, block division may be performed according to a user correlation, i.e., blocks may be divided according to content written by users, which requires the smart desktop knows which content is written by which user. Therefore, it is necessary to authenticate the user of written content.

A user authentication solution according to an embodiment includes: when the user starts to write, the smart desktop allows the user to write freely. At this time, the system does not know identity information of the user. The smart desktop receives the written content input by the user in real time. At the same time, the smart desktop records a handwriting characteristic of the written content such as a pressure, a speed, an acceleration, a stroke characteristic, etc., and records a writing assistant characteristic such as position coordinates, time information, a writing direction, and a text line direction for the writing.

According to the handwriting characteristic and the writing assistant characteristic of the written content, a user characteristic of the current user may be generated via a characteristic retrieving algorithm and is automatically saved in the smart desktop. When a user writes continuously, the smart desktop receives content written by the user to be authenticated, and generates a user characteristic to be authenticated based on a handwriting characteristic and a writing assistant characteristic of the content written by the user to be authenticated, i.e., the user characteristic will be updated in real time.

At this time, the smart desktop matches the user characteristic to be authenticated and the saved user characteristic, and determines the user's identity based on various aspects such as a handwriting characteristic, writing position coordinates, a time continuity, a writing direction, a text line direction, a writing area, and written content semantic information. If the user characteristic to be authenticated matches the saved user characteristic, the authentication of the user identity succeeds. Otherwise, a new account (a user identifier) is created for the current user. The position coordinates, time information, writing direction, text line direction, and written content semantic information for the writing are also saved.

After the user authentication succeeds, the content written by the user may be saved along with the corresponding user identifier of the user. Subsequently, it is possible to know which content on the smart desktop is written by which user according to the saved user identifier and the corresponding written content.

In some embodiments, the smart desktop may be implemented by an independent device, or may be implemented by a plurality of interconnected associated devices.

If the smart desktop includes interconnected associated devices, each user may use an associated device (e.g., each user uses a tablet computer). Each user may view content written by other users on other associated devices by calling out a thumbnail on his associated device. The associated devices of the users may be connected via a wireless (Wi-Fi, infrared, Bluetooth, etc.) or wired manner. After the associated device used by the user (the viewer) calling out the thumbnail detects a thumbnail calling operation of the user, the associated device obtains content displayed by other associated devices, detects relationship positions of the associated devices, takes relative positions of the associated devices as relative positions of the content on the smart desktop, and takes content written by each user on each associated device as content written by each user on the same associated device at the same time. The associated device used by the viewer displays the content of each associated device in the thumbnail according to the relationship positions of the associated devices.

The associated device used by the viewer may detect the relative position of each associated device via at least one of the following manners.

(1) Determining the Relative Position of Each Associated Device Based on a Network Signal Detection Result of Each Associated Device.

For example, each associated device transmits a detection result of its wireless communication signal (e.g., 2G, 3G, 4G, etc.) to the associated device used by the viewer. The associated device determines a position relationship between the associated device and other associated devices according to the detection result of its wireless communication signal and a detection result transmitted by the other associated devices, so as to obtain the relative position of each associated device.

In addition, the associated device used by the viewer may also determine the relative position of each associated device according to a combined detection result of more or more kinds of signals between the associated device and the other associated devices, such as an infrared communication signal, a Bluetooth communication signal, or a wireless local area network.

(2) Determining the Relative Position of Each Associated Device Based on a Relative Position Setting Value Provided by Each Associated Device.

When the user initially uses the smart desktop or when one or more users request to call out the thumbnail, the smart desktop displays a relative position configuration interface on the associated device used by each user. The configuration interface may include a diagram for the smart desktop consisting of the associated devices. The user may select a position where he is currently located on the diagram of the smart desktop. Each associated device obtains a relative position setting value according to a selection operation of the user. The associated devices may exchange their relative position setting values with each other. The associated device used by the viewer determines a position topology of each associated device according to the relative position setting values of the associated devices, so as to determine the relative position of each associated device.

When displaying the thumbnail, the thumbnail may occupy the whole screen of the viewer. The screen may be divided into several parts and each part displays the summarization of the content of each user. Other functions are similar to those of the thumbnail on the smart desktop.

According to an embodiment, the user is able to view content written by other users in the thumbnail. In addition, the user is able to edit the content written by the other users. The smart desktop receives a content editing instruction triggered by the user, and edits content in the thumbnail according to the content editing instruction, wherein the editing may include inserting, deleting, etc.

For content insertion: the user views the content written by the other users in the thumbnail, and selects a position for writing content via a manner such as long pressing. At this time, a cursor prompt may be provided at this position, representing that the user wants to insert content at this position. The user writes the content to be inserted at this position.

For content deletion: the user views the content written by the other users in the thumbnail and selects content to be deleted via a manner such as drawing a line on the screen. At this time, an identifier such as a strikethrough line may be provided on the selected content, representing that the content is to be deleted.

In addition, the user may select content to be modified via a manner such as selecting a closed region on the touch screen. At this time, an identifier such as a dotted rectangle may be provided for the selected content, representing that the content is to be modified. The user inputs modified content. The smart desktop deletes original content and replaces it with the modified content.

According to an embodiment, the editing to the content may be synchronized with the displaying area corresponding to the user to which the content belongs in real time. For example, the user A writes content "basketball is an interesting sport". The user B modifies via the thumbnail the above content written by the user A to "basketball is an interesting sport, and is very fit for office workers". During an editing procedure of the user B, the smart desktop provides a synchronized editing for the content in the displaying area of the user A. The user A is able to see the editing procedure of the user B. During the editing, a user identifier (a head image, etc.) of the user B may be displayed in the displaying area of the user A, such that the user A knows which user is editing the content.

Also, according to an embodiment, the edited content may be in a font of the editing user, or a font of the user whose content is being edited. The user may also set whether to allow other users to edit his content, or allow or forbid which user to edit his content. In addition, if another user edits the content of the user, the user may select whether to accept the editing.

Embodiment 2

Hereinafter, the following solution will be described in detail: a displaying instruction for content of a smart desktop is detected; and the content is displayed on the smart desktop based on a designated displaying manner. The designated displaying manner may include: displaying a summarization of the content based on a text attribute associated with the content.

Scenario: the user A arrives during the meeting and wants to view recorded content of other users associated with a subject that he is interested in.

Solution: a summarization based on a text attribute associated with the content, also referred to as a subject summarization.

The subject summarization may be provided according to an operation of the user A via at least one of the following manners:

(1) Voice Operation

The user A calls out the subject summarization via a voice manner, e.g., saying "I want to see the subject summarization". At this time, the smart desktop displays a subject summarization frame in an area including no content in front of the user. If the area in front of the user is filled up, content in an area right in front of the user with the same size as the subject summarization frame is hidden to display the subject summarization frame.

(2) Physical Button Operation

The user calls out the subject summarization frame by pressing a button on the smart desktop.

(3) Touch Screen Operation

The user calls out the subject summarization frame by touching a screen, e.g., double clicking the screen. At this time, the smart desktop displays the subject summarization frame on a position where the user touches the screen. If there is content on this position, the content in an area with the same size as the subject summarization frame is hidden to display the subject summarization frame.

(4) Gesture Operation

The user calls out the subject summarization frame via a gesture action, e.g., waving a hand. At this time, the smart desktop captures the gesture action of the user via a camera and displays the subject summarization frame in an area with no content in front of the user. If the area in front of the user is filled up, content in an area right in front of the user with the same size as the subject summarization frame is hidden to display the subject summarization frame.

(5) External Controller Operation

The user calls out the subject summarization frame by operating an external controller, e.g., pressing a button on a stylus pen. At this time, the smart desktop displays the subject summarization frame on a position pointed by the stylus pen. If there is content on this position, content in an area with the same size as the subject summarization frame is hidden to display the subject summarization frame.

After a user operation is detected, a configuration interface may be displayed. The user is able to set the subject summarization in the configuration interface, including the following.

1. Determine Whether the Subject Summarization Includes a Summarization of Non-Handwritten Content If it is determined that merely a summarization of handwritten content is displayed, merely the summarization of the handwritten content on the smart desktop is displayed in the subject summarization, whereas a summarization of non-handwritten content such as text, an image, slides, and a video is not displayed.

If it is determined that both the summarization of the handwritten content and the summarization of the non-handwritten content are displayed, not only the summarization of the handwritten content on the smart desktop but also the summarization of the non-handwritten content such as text, an image, slides, and a video are displayed in the subject summarization.

If it is determined that merely the summarization of the non-handwritten content is displayed, merely the summarization of the non-handwritten content such as text, an image, slides, and a video is displayed in the subject summarization.

2. Determine Whether Content of the User Himself is Displayed in the Subject Summarization If it is determined to display the content of himself, the content of the user A (the viewer) is displayed in the subject summarization.

If it is determined not to display the content of himself, the content of the user A (the viewer) is not displayed in the subject summarization.

3. Select a Size and a Position for the Subject Summarization

If a size and a position of the subject summarization are determined automatically, an initial size of the subject summarization frame is a standard size set in a system and a displaying position is determined automatically. The smart desktop preferably displays the subject summarization frame in a blank area in a displaying area corresponding to the user. If a size of the blank area in the corresponding displaying area is slightly smaller than the standard size for the subject summarization frame set in the system (e.g., a difference between the size of the blank area in the corresponding displaying area and the standard size for the subject summarization frame set in the system is smaller than a preset area threshold), the size of the subject summarization frame is slightly reduced to fit for the blank area in the corresponding displaying area. However, if the size of the blank area in the corresponding displaying area is far smaller than the standard size for the subject summarization frame set in the system (e.g., the difference between the size of the blank area in the corresponding displaying area and the standard size for the subject summarization frame set in the system is not smaller than the preset area threshold), the user needs to proceed to the following next level options:

i. Covering Mode (Covering Existing Content)

If the user does not need to view the content written by himself while viewing the subject summarization, this option may be selected. At this time, the smart desktop displays the subject summarization frame in the corresponding displaying area of the user and temporarily hides content covered by the subject summarization frame.

ii. Inserting Mode (Inserting into Content)

If the user needs to view the content written by himself while viewing the subject summarization, this option may be selected. At this time, the smart desktop inserts the subject summarization frame at the end of the corresponding displaying area of the user. Subsequently, the handwritten content input by the user is displayed around the subject summarization frame. If a displaying space is not enough for the handwritten content of the user, a solution such as changing a layout and dividing into multiple pages may be utilized.

If it is confirmed to manually determine the size and position of the subject summarization frame, the user may determine the size and position of the subject summarization frame via a touch screen gesture.

For example, the touch desktop detects that the user touches the screen on at least two positions at the same time. The smart desktop determines the position and size of the subject summarization frame according to the detected touching positions of the user.

For example, when the user touches the bottom-left of the screen with the left index finger and the top-right of the screen with the right index finger at the same time, the position pressed by the left index finger will be the bottom-left corner of the subject summarization frame and the position pressed by the right index finger will be the top-right corner of the subject summarization frame. At this time, if there is content on the position determined by the user, it is possible to proceed to the following next level options:

i. Covering Mode (Cover Existing Content); ii. Inserting Mode (Insert into the Content)

4. Determine Whether to Display a Head Image of the User

If it is determined to display a head image of the user, a head image captured by the camera in real time or a preset head image may be displayed in a user column in the subject summarization, wherein in the subject summarization, the user column may be set aside of the content of each user for displaying relevant information of the user. The viewer may differentiate summarizations of different users.

5. Determine Whether to Display a User Name

If it is determined to display a user name, the user name will be displayed in the user column in the subject summarization. If neither the user head image nor the user name is displayed, it indicates that the viewer does not care which user has written which content. At this time, the summarizations of different users in each subject are not differentiated and are displayed in parallel. The user may not see which content belongs to which user before checking detailed content of the summarizations.

6. Select a Displaying Manner for the Subject Summarization

A displaying manner of the summarization may include a multi-level catalog manner. The levels may be from general to specific, e.g., in an order of: a subject, a user, and a summarization. From the subject to the user, it is indicated content of which user includes content about the subject; and from the user to the summarization, it is indicated which user has content related to which subject and is displayed in the form of a summarization. In particular, the multi-level catalog displaying manner may be set as follows:

(a) Horizontal Display

A left most column shows the subject, a second column shows the user which is identified as belonging to the subject via, e.g., tree-like connection, a bracket, same color, etc. A third column shows the summarization which is identified as belonging to the user. If one user has multiple summarizations, each one is displayed in one line in a left alignment manner.

(b) Vertical Display

An up most row shows the subject, and a second row shows the user which is identified as belonging to the subject via tree-like connection, a bracket, same color, etc. A third row shows the summarization which is identified as belonging to the user. If one user has multiple summarizations, each one is displayed in new one line in a left alignment manner.

(c) Whether to Display a Table

When the user selects to display a table, the subject summarization is represented in the form of a table. When the user selects not to display a table, a table frame is hidden, and there is no table line between the summarization and catalog.

According to an embodiment, the above configuration interface may be displayed after the user calls out the subject summarization. The user sets on the configuration interface. The smart desktop displays the corresponding subject summarization according to the user's setting. Or, the user may set the displaying manner of the subject summarization in advance. After the user calls out the subject summarization, the smart desktop displays the corresponding subject summarization according to the preset manner.

In addition, when the subject summarization is displayed, the user may adjust the displaying manner of the subject summarization in real time. The smart desktop dynamically adjusts the displayed subject summarization. For example, the user sets in advance not to display content written by himself in the subject summarization. Therefore, the subject summarization initially presented by the smart desktop does not include the content written by the user himself. If the user sets to display the content written by himself in the subject summarization via a preset operation (e.g., a voice, a screen gesture, etc.) when viewing the subject summarization, the smart desktop dynamically adjusts the subject summarization in real time to present the content written by the user in the subject summarization.

After the setting is finished, the subject summarization is displayed in the subject summarization frame. An implementation procedure may include the following.

(1) Differentiating Users

When the user writes content, the smart desktop authenticates the user writing the content according to the user authentication solution described in Embodiment 1. In particular, the smart desktop determines whether the user writing the content is a new user according to an attribute of the user currently writing and a user attribute of previously written content. If the user is a new user, a new account (a user identifier) is created in a database, and position coordinates, time information, a writing direction, a text line direction, semantic information of the written content, and a window opened by the user are recorded. If the user is not a new user, the user is recognized.

(2) Retrieving a Summarization

A text summarization is retrieved for written content of each user. The written content of the user may include multiple subjects. At this time, one or more summarizations may be retrieved for each subject. A length of the summarization does not exceed a length threshold selected by the user during the setting.

(3) Classifying a Subject

All summarizations of all users are classified according to techniques such as semantic analysis. A user label is reserved for each summarization. For example, a summarization retrieved from content of the user A is "basketball has a long history", a summarization retrieved from content of the user B is "basketball rules details", and a summarization retrieved from content of a user C is "Chinese football will catch up the world". At this time, the content of the user A and the user B are classified into one subject: basketball. But the content of the user C will not be classified into the subject.

(4) Displaying a Summarization

At this time, the subject and the corresponding summarization are displayed in the subject summarization frame in a form set by the user (horizontal or vertical display).

In addition, the subject summarization may have the following functions:

1. Viewing of detailed content: a content viewing instruction may be received from the user, and content relevant to the summarization may be displayed based on the content viewing instruction, such that the user is able to view detailed content of the summarization.

(a) Selection of One or Multiple Summarizations

The user may select one summarization by clicking the summarization on the touch screen, or may select multiple summarizations by sliding over an area of the touch screen by hand.

(b) Displaying Manner for the Detailed Content

Original content corresponding to the selected summarization is displayed in a window automatically generated behind (if the summarizations are horizontally displayed) or below (if the summarizations are vertically displayed) the summarization column. An edge length of the window is kept to be consistent with a length of a row (for horizontally displayed summarizations) or a column (for vertically displayed summarizations).

At this time, the user may select a window he wants to view and may expand the window by clicking on the touch screen. The window is expanded to a viewing suitable size fitting for the subject summarization frame. The user may change a position and a size of the window via manners such as dragging.

At this time, content covered by the expanded window is hidden automatically. The original content corresponding to the summarization is displayed in the window. If there is too much content, the content is automatically divided into multiple pages for display.

A default font of the content is an original handwritten font of the user. The viewer may change it to a printed font via a gesture. The font size of the content is a viewing suitable size fitting for the window.

If the user selects multiple summarizations and wants to check detailed content of another summarization after viewing detailed content of one summarization, the user may roll up the window by, e.g., clicking the expanded window on the touch screen, and then clicking another interested summarization to expand its window for checking the detailed content.

If the user wants to simultaneously view pieces of detailed content of several summarizations, the user may drag the expanded window to an adjacent position according to a requirement, instead of rolling up the expanded window and then clicking to expand another interested summarization. If the expanded windows overlap each other, a later expanded window may overlap a previously expanded window.

(c) Searching According to a Keyword of the Summarization

After the detailed content window of the subject summarization is expanded, the user may select a word in the summarization by, e.g., clicking the touch screen. The word is then highlighted with a bold font or a background highlight color. At the same time, words or phrases relevant to this word in the detailed content are also highlighted.

(2) Synchronous Update

When the user views the subject summarization, if another user modifies or supplements the content, the smart desktop prompts the user on the subject summarization when detecting that the content on the smart desktop is updated. For example, the smart desktop may determine that the other user's modification is temporarily finished via a manner such as a time sequence (e.g., the writing has been stopped for a while), and the smart desktop displays an update prompt on the content of the subject summarization in the form of an icon or a gradually changed background color. The user may provide a content updating instruction by, e.g., single clicking the touch screen on the content of the subject summarization. The smart desktop updates this part of content in the subject summarization based on the user instruction.

The smart desktop may detect in real time whether there is a change in the content. If detecting that there is a change in the content of the smart desktop, the smart desktop may directly update this part of content in the subject summarization and display the updated content. This manner is also referred to as an instant updating manner. The user is able to see an instant updating procedure of all content.

(3) Content Restriction Change (a) Subject Broadening or Restriction

The user may broaden a subject via, e.g., a swipe to the left on the subject, or may restrict the subject via, e.g., a swipe to the right. A scope of the subject is determined based on a predefined structure diagram or based on an existing Wordnet technique.

For example, a summarization retrieved from content of the user A is "basketball has a long history"; a summarization retrieved from content of the user B is "basketball rules details"; a summarization retrieved from content of the user C is "Chinese football will catch up with the world", and a summarization retrieved from content of a user D is "world athletics championships officially ended". At this time, the content of the users A and B will be classified into one subject: basketball, whereas the content of the users C and D will not be classified into this subject. If the user regards that the subject—basketball is too small and wants to broaden it, the user may provide a swipe to the left on the "basketball". At this time, the subject changes from "basketball" to "ball games", and the content related to football of the user C will be classified into this subject. If the user provides a swipe to the left again to broaden the subject, the subject may change from "ball games" to "sports". At this time, all of the four summarizations of the users A, B, C, and D are classified in this subject.

(b) Summarization Length Change

If receiving a summarization length change instruction of the user, the smart desktop changes a length of the summarization according to the summarization length change instruction.

The user may instruct to shorten the length of the summarization via a manner such as swiping to the left on the summarization, or may instruct to prolong the summarization via a manner such as swiping to the right on the summarization.

During the swiping, a ruler may be displayed to indicate a current maximum summarization length and an adjusted maximum summarization length. The maximum length of the summarization may be defined in advance in a text summarization technique. For different maximum lengths, the content of the summarization may vary.

For example, a summarization retrieved from content of the user A is "China won the championship". At this time, the user may swipe to the right on the summarization until the ruler shows 15 (at most 15 words). Then, the summarization will become "Chinese team won the world table tennis championships".

(4) Searching a Subject (a) Calling Out a Searching Box

The user may call out a searching box in the subject summarization frame by, e.g., double clicking any position in the subject summarization frame.

(b) Inputting a Subject

The user inputs a required subject in the searching box through, e.g., a handwriting input and a keyboard input, etc.

After the user confirms to search, the smart desktop detects a searching instruction including the subject input by the user and performs searching in the summarizations based on the searching instruction.

(c) Displaying a Subject Summarization i. Hiding Original Content

If the searched subject includes too much content and the subject summarization frame does not have an enough blank area, original content in the subject summarization frame may be hidden to display the searched subject and the corresponding summarization.

ii. Subsequent Displaying

If the searched subject includes less content and the subject summarization frame has an enough blank area, the searched subject and the corresponding summarization may be displayed following the existing subject.

(5) Privacy Setting

The user may set a part of his content as private content via manners such as selecting a closed region by a gesture and hope that such private content is invisible for other users. In addition, the user may select to which users that he does not want to expose the private content. At this time, when the smart desktop detects that the selected user opens the subject summarization, the private content of the user is not presented in the summarization, i.e., the smart desktop hides the private content of the user in the subject summarization.

The hiding of the private information in the subject summarization includes: not displaying the private information, or replacing the private information by a private identifier.

In addition, according to an embodiment, the smart desktop may automatically detect whether the content of the user is private content, i.e., if content such as figures in a personal account, a user name, or a password is detected, it is determined that the corresponding content may be private content.

Figure 7:
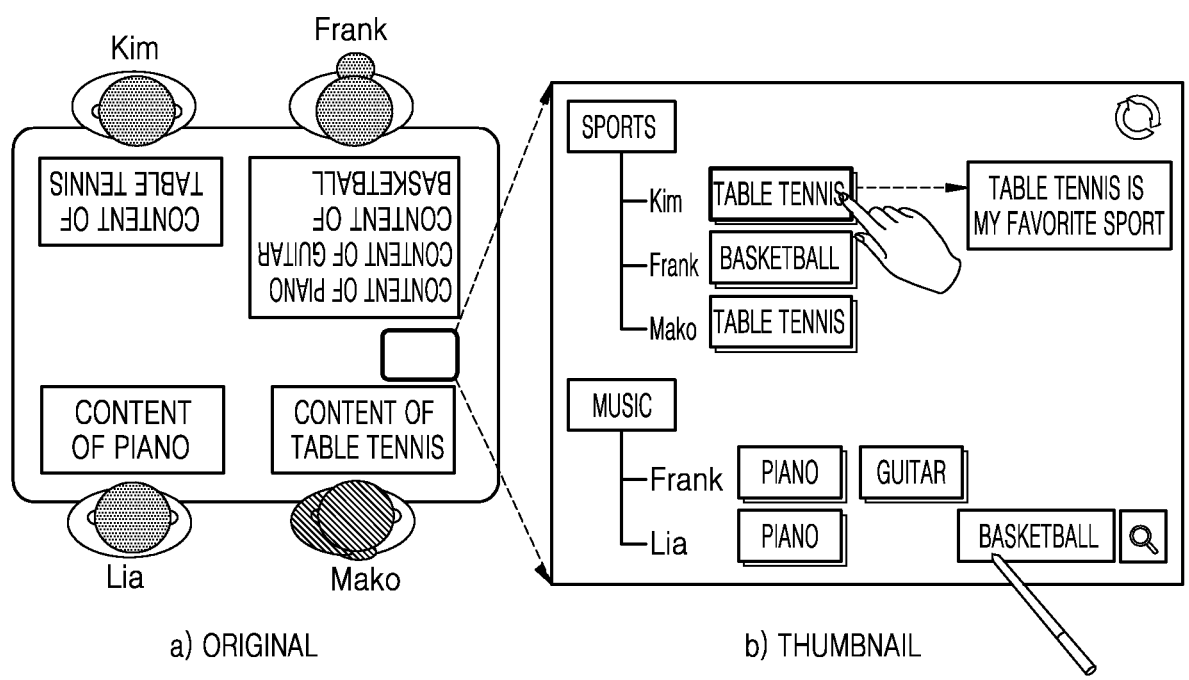
FIG. 7 is a schematic diagram illustrating a display of a subject summarization, according to Embodiment 2 of the present disclosure.

FIG. 7 is a schematic diagram illustrating a display of the subject summarization according to Embodiment 2 of the present disclosure.

As shown in FIG. 7, the left side shows an actual screen display of the smart desktop, wherein a user Kim writes content about a table tennis, a user Frank writes content about a basketball, a guitar, and a piano, a user Lia writes content about a piano, and a user Mako writes content about a table tennis.

When the user Mako views a subject summarization (the right part in FIG. 7), the system automatically displays by the subjects: sports and music, and the content written by different users are differentiated in respective subject. For example, in the subject of sports, pieces of content are arranged according to: the table tennis written by Kim, the basketball written by Frank, and the table tennis written by Mako. The pieces of content are represented by a summarization. The user may select the summarization to view detailed content. Since there may be various manners to determine the subject, if the user does not find an interesting subject, he may input an interesting subject (e.g., a basketball as shown in FIG. 7). Content relevant to this subject may be presented by users.

In some embodiments, the smart desktop may be implemented by an independent device, or may be implemented by a plurality of associated devices having a connection relationship.

If the smart desktop includes associated devices having a connection relationship, each user may use an associated device (e.g., each user uses a tablet computer). Each user may view content written by other users on other associated devices by calling out a subject summarization on his associated device. The associated devices of the users may be connected via a wireless (Wi-Fi, infrared, Bluetooth, etc.) or wired manner. After detecting an operation for calling out the subject summarization, the associated device used by the viewer obtains content displayed on other associated devices. After obtaining the content displayed on the other associated devices, the associated device of the viewer may bring up and display the subject summarization via the above described manner for bringing up the subject summarization by the smart desktop.

When the subject summarization is displayed, the subject summarization may occupy the whole screen of the associated device of the viewer. Other functions are similar to those of the subject summarization on the smart desktop.

Embodiment 3

Hereinafter, the following solution will be described in detail: a displaying instruction for content of a smart desktop is detected; and the content is displayed on the smart desktop based on a designated displaying manner. The designated displaying manner may include: displaying a summarization of the content based on a user attribute associated with the content.

Scenario: the user A is far away from the user B and the user A wants to explain his handwritten content to the user B.

Solution: a summarization based on a user attribute associated with the content, also referred to as a user summarization.

The user summarization may be called out according to an operation of the user A via at least one of the following manners:

(1) Voice Operation

The user A calls out the user summarization via a voice manner, e.g., saying "I want to see the user summarization". At this time, the smart desktop displays a user summarization frame in an area including no content in front of the user. If the area in front of the user is filled up, content in an area right in front of the user with the same size as the user summarization frame is hidden to display the user summarization frame.

(2) Physical Button Operation

The user calls out the user summarization frame by pressing a button on the smart desktop.

(3) Touch Screen Operation

The user calls out the user summarization frame by touching a screen, e.g., double clicking the screen. At this time, the smart desktop displays the user summarization frame on a position where the user touches the screen. If there is content on this position, the content in an area with the same size as the user summarization frame is hidden to display the user summarization frame.

(4) Gesture Operation

The user calls out the user summarization frame via a gesture action, e.g., waving a hand. At this time, the smart desktop captures the gesture action of the user via a camera and displays the user summarization frame in an area with no content in front of the user. If the area in front of the user is filled up, content in an area right in front of the user with the same size as the user summarization frame is hidden to display the user summarization frame.

(5) External Controller Operation

The user calls out the user summarization frame by operating an external controller, e.g., pressing a button on a stylus pen. At this time, the smart desktop displays the user summarization frame on a position pointed by the stylus pen. If there is content on this position, content in an area with the same size as the user summarization frame is hidden to display the user summarization frame.

After a user operation is detected, a configuration interface may be displayed. The user is able to set the user summarization in the configuration interface, including the following.

1. Determine Whether the User Summarization Includes a Summarization of Non-Handwritten Content If it is determined that merely a summarization of handwritten content is displayed, merely the summarization of the handwritten content on the smart desktop is displayed in the user summarization, whereas a summarization of non-handwritten content such as text, an image, slides, and a video is not displayed.

If it is determined that both the summarization of the handwritten content and the summarization of the non-handwritten content are displayed, not only the summarization of the handwritten content on the smart desktop but also the summarization of the non-handwritten content such as text, an image, slides, and a video are displayed in the user summarization.

If it is determined that merely the summarization of the non-handwritten content is displayed, merely the summarization of the non-handwritten content such as text, an image, slides, and a video is displayed in the user summarization.

2. Determine Whether Content of the User Himself is Displayed in the User Summarization If it is determined to display the content of himself, the content of the user A (the viewer) is displayed in the user summarization.

If it is determined not to display the content of himself, the content of the user A (the viewer) is not displayed in the user summarization.

3. Select a Size and a Position for the User Summarization

If a size and a position of the user summarization are determined automatically, an initial size of the user summarization frame is a standard size set in a system and a displaying position is determined automatically. The smart desktop preferably displays the user summarization frame in a blank area in a displaying area corresponding to the user. If a size of the blank area in the corresponding displaying area is slightly smaller than the standard size for the user summarization frame set in the system (e.g., a difference between the size of the blank area in the corresponding displaying area and the standard size for the user summarization frame set in the system is smaller than a preset area threshold), the size of the user summarization frame is slightly reduced to fit for the blank area in the corresponding displaying area. However, if the size of the blank area in the corresponding displaying area is far smaller than the standard size for the user summarization frame set in the system (e.g., the difference between the size of the blank area in the corresponding displaying area and the standard size for the user summarization frame set in the system is not smaller than the preset area threshold), the user needs to proceed to the following next level options:

i. Covering Mode (Covering Existing Content)

If the user does not need to view the content written by himself while viewing the user summarization, this option may be selected. At this time, the smart desktop displays the user summarization frame in the corresponding displaying area of the user and temporarily hides content covered by the user summarization frame.

ii. Inserting Mode (Inserting into Content)

If the user needs to view the content written by himself while viewing the user summarization, this option may be selected. At this time, the smart desktop inserts the user summarization frame at the end of the corresponding displaying area of the user. Subsequently, the handwritten content input by the user is displayed around the user summarization frame. If a displaying space is not enough for the handwritten content of the user, a solution such as changing a layout and dividing into multiple pages may be utilized.

If it is confirmed to manually determine the size and position of the user summarization frame, the user may determine the size and position of the user summarization frame via a touch screen gesture. For example, the touch desktop detects that the user touches the screen on at least two positions at the same time. The smart desktop determines the position and size of the subject summarization frame according to the detected touching positions of the user. For example, when the user touches the bottom-left of the screen with the left index finger and the top-right of the screen with the right index finger at the same time, the position pressed by the left index finger will be the bottom-left corner of the user summarization frame and the position pressed by the right index finger will be the top-right corner of the user summarization frame. At this time, if there is content on the position determined by the user, it is possible to proceed to the following next level options:

i. Covering Mode (Cover Existing Content); ii. Inserting Mode (Insert into the Content)

4. Determine Whether to Display a Head Image of the User

If it is determined to display a head image of the user, a head image captured by the camera in real time or a preset head image may be displayed in a user column in the user summarization, wherein in the user summarization, the user column may be set aside of the content of each user for displaying relevant information of the user. The viewer may differentiate summarizations of different users.

5. Select a Displaying Manner for the Subject Summarization

A displaying manner of the summarization may include a multi-level catalog manner. The levels may be from general to specific, e.g., in an order of: a user, a subject, and a summarization. From the user to the subject, it is indicated content of which user includes content about which subject; and from the subject to the summarization, it indicates the summarization of the content of the user under the subject. In particular, the multi-level catalog displaying manner may be set as follows:

(a) Horizontal Display

A left most column shows the user, and a second column shows the subject which is identified as belonging to the user via, e.g., tree-like connection, a bracket, same color, etc. A third column shows one or more summarizations belonging to the subject.

(b) Vertical Display

An up most row shows the user, and a second row shows the subject which is identified as belonging to the user via, e.g., tree-like connection, a bracket, same color, etc. A third row shows one or more summarizations belonging to the subject.

(c) Whether to Display a Table

When the user selects to display a table, the user summarization is represented in the form of a table. When the user selects not to display a table, the table frame is hidden, and there is no table line between the summarization and catalog.

According to an embodiment, the above configuration interface may be displayed after the user calls out the user summarization. The user sets on the configuration interface. The smart desktop displays the corresponding user summarization according to the user's setting. Or, the user may set the displaying manner of the user summarization in advance. After the user calls out the user summarization, the smart desktop displays the corresponding user summarization according to the preset manner.

In addition, when the user summarization is displayed, the user may adjust the displaying manner of the user summarization in real time. The smart desktop dynamically adjusts the displayed user summarization. For example, the user sets in advance not to display content written by himself in the user summarization. Therefore, the user summarization initially presented by the smart desktop does not include the content written by the user himself. If the user sets to display the content written by himself in the user summarization via a preset operation (e.g., a voice, a screen gesture, etc.) when viewing the user summarization, the smart desktop dynamically adjusts the user summarization in real time to present the content written by the user in the user summarization.

After the setting is finished, the user summarization is displayed in the user summarization frame. An implementation procedure may include the following.

(1) Differentiating Users

When the user writes content, the smart desktop authenticates the user writing the content according to the user authentication solution described in Embodiment 1, which is not repeated herein.

(2) Retrieving a Summarization

A text summarization is retrieved for written content of each user. The written content of the user may include multiple subjects. At this time, one or more summarizations may be retrieved for each subject. A length of the summarization does not exceed a length threshold selected by the user during the setting.

(3) Classifying a Subject

All summarizations of all users are classified according to techniques such as semantic analysis.

(4) Displaying a Summarization

At this time, the subject and the corresponding summarization are displayed in the subject summarization frame in a form set by the user (horizontal or vertical display).

In addition, the subject summarization may have the following functions:

1. Viewing of detailed content: a content viewing instruction may be received from the user, and content relevant to the summarization may be displayed based on the content viewing instruction, such that the user is able to view detailed content of the summarization.

(a) Selection of One or Multiple Summarizations

The user may select one summarization by clicking the summarization on the touch screen, or may select multiple summarizations by sliding over an area of the touch screen by hand.

(b) Displaying Manner for the Detailed Content

Original content corresponding to the selected summarization is displayed in a window automatically generated behind (if the summarizations are horizontally displayed) or below (if the summarizations are vertically displayed) the summarization column. An edge length of the window is kept to be consistent with a length of a row (for horizontally displayed summarizations) or a column (for vertically displayed summarizations). At this time, the user may select a window he wants to view and may expand the window by clicking on the touch screen. The window is expanded to a viewing suitable size fitting for the subject summarization frame. The user may change a position and a size of the window via manners such as dragging. At this time, content covered by the expanded window is hidden automatically. The original content corresponding to the summarization is displayed in the window. If there is too much content, the content is automatically divided into multiple pages for display. A default font of the content is an original handwritten font of the user. The viewer may change it to a printed font via a gesture. The font size of the content is a viewing suitable size fitting for the window. If the user selects multiple summarizations and wants to check detailed content of another summarization after viewing detailed content of one summarization, the user may roll up the window by, e.g., clicking the expanded window on the touch screen, and then clicking another interested summarization to expand its window for checking the detailed content. If the user wants to simultaneously view pieces of detailed content of several summarizations, the user may drag the expanded window to an adjacent position according to a requirement, instead of rolling up the expanded window and then clicking to expand another interested summarization. If the expanded windows overlap each other, a later expanded window may overlap a previously expanded window.

(c) Searching According to a Keyword of the Summarization

After the detailed content window of the subject summarization is expanded, the user may select a word in the summarization by, e.g., clicking the touch screen. The word is then highlighted with a bold font or a background highlight color. At the same time, words or phrases relevant to this word in the detailed content are also highlighted.

(2) Synchronous Update

When the user views the subject summarization, if another user modifies or supplements the content, the smart desktop prompts the user on the subject summarization when detecting that the content on the smart desktop is updated. For example, the smart desktop may determine that the other user's modification is temporarily finished via a manner such as a time sequence (e.g., the writing has been stopped for a while), and the smart desktop displays an update prompt on the content of the subject summarization in the form of an icon or a gradually changed background color. The user may provide a content updating instruction by, e.g., single clicking the touch screen on the content of the subject summarization. The smart desktop updates this part of content in the subject summarization based on the user instruction.

The smart desktop may detect in real time whether there is a change in the content. If detecting that there is a change in the content of the smart desktop, the smart desktop may directly update this part of content in the subject summarization and display the updated content. This manner is also referred to as an instant updating manner. The user is able to see an instant updating procedure of all content.

(3) Content Restriction Change (a) Subject Broadening or Restriction

The user may broaden a subject via, e.g., a swipe to the left on the subject, or may restrict the subject via, e.g., a swipe to the right. A scope of the subject is determined based on a predefined structure diagram or based on an existing Wordnet technique. For example, a summarization retrieved from content of the user A is "basketball has a long history"; a summarization retrieved from content of the user B is "basketball rules details"; a summarization retrieved from content of the user C is "Chinese football will catch up with the world", and a summarization retrieved from content of the user D is "world athletics championships officially ended". At this time, the content of the users A and B will be classified into one subject: basketball, whereas the content of the users C and D will not be classified into this subject. If the user regards that the subject-basketball is too small and wants to broaden it, the user may provide a swipe to the left on the "basketball". At this time, the subject changes from "basketball" to "ball games", and the content related to football of the user C will be classified into this subject. If the user provides a swipe to the left again to broaden the subject, the subject may change from "ball games" to "sports". At this time, all of the four summarizations of the users A, B, C, and D are classified in this subject.

(b) Summarization Length Change

If receiving a summarization length change instruction of the user, the smart desktop changes a length of the summarization according to the summarization length change instruction.

The user may instruct to shorten the length of the summarization via a manner such as swiping to the left on the summarization, or may instruct to prolong the summarization via a manner such as swiping to the right on the summarization. During the swiping, a ruler may be displayed to indicate a current maximum summarization length and an adjusted maximum summarization length. The maximum length of the summarization may be defined in advance in a text summarization technique. For different maximum lengths, the content of the summarization may vary. For example, a summarization retrieved from content of the user A is "China won the championship". At this time, the user may swipe to the right on the summarization until the ruler shows 15 (at most 15 words). Then, the summarization will become "Chinese team won the world table tennis championships".

(4) Searching a Subject (a) Calling Out a Searching Box

The user may call out a searching box in the subject summarization frame via, e.g., double clicking any position in the subject summarization frame.

(b) Inputting a Subject

The user inputs a required subject in the searching box through, e.g., a handwriting input and a keyboard input, etc.

After the user confirms to search, the smart desktop detects a searching instruction including the subject input by the user and performs searching in the summarizations based on the searching instruction.

(c) Displaying a Subject Summarization i. Hiding Original Content

If the searched subject includes too much content and the subject summarization frame does not have an enough blank area, original content in the subject summarization frame may be hidden to display the searched subject and the corresponding summarization.

ii. Subsequent Displaying

If the searched subject includes less content and the subject summarization frame has an enough blank area, the searched subject and the corresponding summarization may be displayed following the existing subject.

(5) Privacy Setting

The user may set a part of his content as private content via manners such as selecting a closed region by a gesture and hope that such private content is invisible for other users. In addition, the user may select to which users that he does not want to expose the private content. At this time, when the smart desktop detects that the selected user opens the subject summarization, the private content of the user is not presented in the summarization, i.e., the smart desktop hides the private content of the user in the subject summarization.

The hiding of the private information in the subject summarization includes: not displaying the private information, or replacing the private information by a private identifier.

In addition, according to an embodiment, the smart desktop may automatically detect whether the content of the user is private content, i.e., if content such as figures in a personal account, a user name, or a password is detected, it is determined that the corresponding content may be private content.

Figure 8:
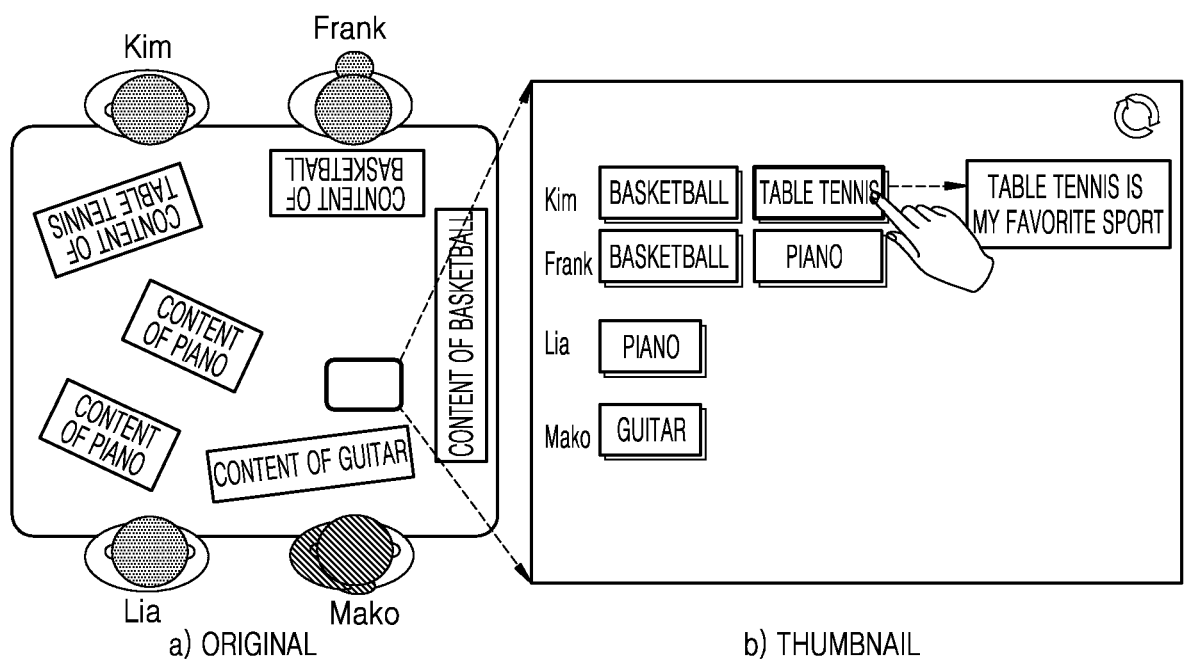
FIG. 8 is a schematic diagram illustrating a display of a user summarization, according to Embodiment 3 of the present disclosure.

FIG. 8 is a schematic diagram illustrating a display of the subject summarization according to Embodiment 2 of the present disclosure.

As shown in FIG. 8, the left side shows an actual screen display of the smart desktop. A user may write content on different positions due to a change of his position. As shown in FIG. 8, the user Kim writes two parts of content, wherein one is about a basketball and is on one side of the screen (an initial position of him) and the other is about a table tennis and is on a current position of him. Pieces of content written by different users may be differentiated by different colors. At this time, if the user Mako wants to view content written by a certain user, he may call out a user summarization (the right part in FIG. 8). In the user summarization, all pieces of content written by users are shown in the form of a subject summarization. For example, if the user Mako wants to view content written by Kim, he may clearly see in the user summarization that Kim has written content in subjects: basketball and table tennis. At this time, he may select one subject and view detailed content.

In some embodiments, the smart desktop may be implemented by an independent device, or may be implemented by a plurality of associated devices having a connection relationship.

If the smart desktop includes associated devices having a connection relationship, each user may use an associated device (e.g., each user uses a tablet computer). Each user may view content written by other users on other associated devices by calling out the subject summarization on his associated device. The associated devices of the users may be connected via a wireless (Wi-Fi, infrared, Bluetooth, etc.) or wired manner. After detecting an operation for calling out the subject summarization, the associated device used by the viewer obtains content displayed on other associated devices. After obtaining the content displayed on the other associated devices, the associated device of the viewer may bring up and display the user summarization via the above described manner for bringing up the user summarization by the smart desktop.

When the user summarization is displayed, the user summarization may occupy the whole screen of the associated device of the viewer. Other functions are similar to those of the user summarization on the smart desktop.

According to an embodiment, the user is able to view content written by other users on a summarization (user summarization or subject summarization). In addition, it is also possible to edit the content written by the other users. The smart desktop receives a content editing instruction triggered by the user, and edits content in a thumbnail based on the content editing instruction, wherein the editing may include inserting, deleting, etc.

For content insertion: the user views the content written by the other users in the summarization, and selects a position for writing content via a manner such as long pressing. At this time, a cursor prompt may be provided at this position, representing that the user wants to insert content at this position. The user writes the content to be inserted at this position.

For content deletion: the user views the content written by the other users in the summarization and selects content to be deleted via a manner such as drawing a line on the screen. At this time, an identifier such as a strikethrough line may be provided on the selected content, representing that the content is to be deleted.

In addition, the user may select content to be modified via a manner such as selecting a closed region on the touch screen. At this time, an identifier such as a dotted rectangle may be provided for the selected content, representing that the content is to be modified. The user inputs modified content. The smart desktop deletes original content and replaces it with the modified content.

According to an embodiment, the editing to the content may be synchronized with a displaying area corresponding to the user to which the content belongs in real time. For example, the user A writes content "basketball is an interesting sport". The user B modifies via the thumbnail the above content written by the user A to "basketball is an interesting sport, and is very fit for office workers". During an editing procedure of the user B, the smart desktop provides a synchronized editing for the content in the displaying area of the user A. The user A is able to see the editing procedure of the user B. During the editing, a user identifier (a head image, etc.) of the user B may be displayed in the displaying area of the user A, such that the user A knows which user is editing the content.

Also, according to an embodiment, the edited content may be in a font of the editing user, or a font of the user whose content is being edited. The user may also set whether to allow other users to edit his content, or allow or forbid which user to edit his content. In addition, if another user edits the content of the user, the user may select whether to accept the editing.

Embodiment 4

When multiple users write by using a smart desktop, since each user sits at a different position and has a different direction, it is inconvenient for the user to share his written content with other users or write on the position in front of other users.

In view of this, according to an embodiment, a displaying instruction for content of the smart desktop is detected, and the content is displayed on the smart desktop based on a designated displaying manner. The content includes content to be shared. The designated displaying manner includes: determining a user receiving the content to be shared; and displaying the content on the smart desktop based on the determined user.

Scenario: the user A wants to share content written by him with the user B.

Solution: sharing with a designated user.

A user (sharing user) who shares content with others may designate a user (receiving user) receiving the content to be shared in advance and then designate the content to be shared, or may designate the content to be shared and then designate the user receiving the content to be shared.

Designation of the user: according to an embodiment, if detecting a user's particular operation (e.g., pressing a sharing button, etc.), for confirming sharing, the smart desktop displays user identifiers (head images, user names, etc.) of other users in a current displaying area. The user may select a user receiving content to be shared according to the user identifiers. For example, the user may select a user by long pressing a real time head image or a name of the user. At this time, the head image or name of the user is highlighted, indicating that it has been selected and the content is to be shared with the user. In addition, according to an embodiment, a user with which the content is to be shared may be designated based on a user summarization or a thumbnail indicating a relative position.

Designation of content: the user may designate existing content as the content to be shared, or may be designate content written in real time as the content to be shared. The user opens an input box and inputs the content to be shared.

(a) Designating Existing Content

The sharing user may select the content to be shared in his existing content by, e.g., selecting a closed region on the touch screen. If the user selects to share the content with a particular receiving user, the content is automatically inserted following current displayed content of the receiving user. A font size may be consistent with that of the current displayed content of the receiving user. A font type may be converted into that of the sharing user or the receiving user via techniques such as handwriting recognition and handwriting combination.

Optionally, a layout of the shared content may be automatically arranged according to a displaying area corresponding to the receiving user on the smart desktop. For example, if there is much content to be shared which may not be completely displayed in a blank area of the corresponding displaying area of the receiving user on the smart desktop, the font type of the content may be adjusted or the content may be displayed in multiple pages.

(b) Designating Real Time Written Content

The sharing user calls out a writing box by, e.g., long pressing a position in the corresponding displaying area of the smart desktop. A size of the writing box may be set by a system in advance or set by the user, or may be automatically adjusted according to the current blank area. During a writing procedure of the sharing user, the size of the writing box may be automatically expanded and original content on the screen covered by the writing box may be hidden. At this time, the receiving user synchronously displays the writing procedure of the sharing user in the corresponding displaying area of the smart desktop. A font size may be consistent with that of currently displayed content of the receiving user. A font type may be the same as that of the sharing user or the receiving user.

The smart desktop may automatically arrange a layout of the content to be shared according to the displaying area of the receiving user. For example, if there is too much content to be shared which may not be completely displayed in the blank area of the corresponding displaying area of the receiving user on the smart desktop, the font type of the content may be adjusted or the content may be displayed in multiple pages.

The sharing user may indicate that he has finished writing by, e.g., double clicking the writing box. At this time, the sharing user is prompted to save the content in the writing box. If the sharing user selects to save the content, the content in the writing box is automatically added to the blank area in the corresponding displaying area of the sharing user on the smart desktop or added to the end of the existing content. Then, the writing box of the sharing user is closed. At the same time, a prompt is displayed in the corresponding displaying area of the receiving user on the smart desktop, prompting the receiving user to select whether to accept the added or modified content. If the receiving user accepts, the sharing content is automatically added to the original content or modifications are made to the original content, and the layout is rearranged. If the content added after the layout rearrangement may not be displayed due to an insufficient blank area, multiple pages may be provided for the content, or a layout of other blocks may be adjusted to generate a blank area for displaying the added content.

According to an embodiment, the smart desktop adjusts a displaying direction of the content to be shared according to a viewing direction of the user receiving the shared content (receiving user).

Figure 9:
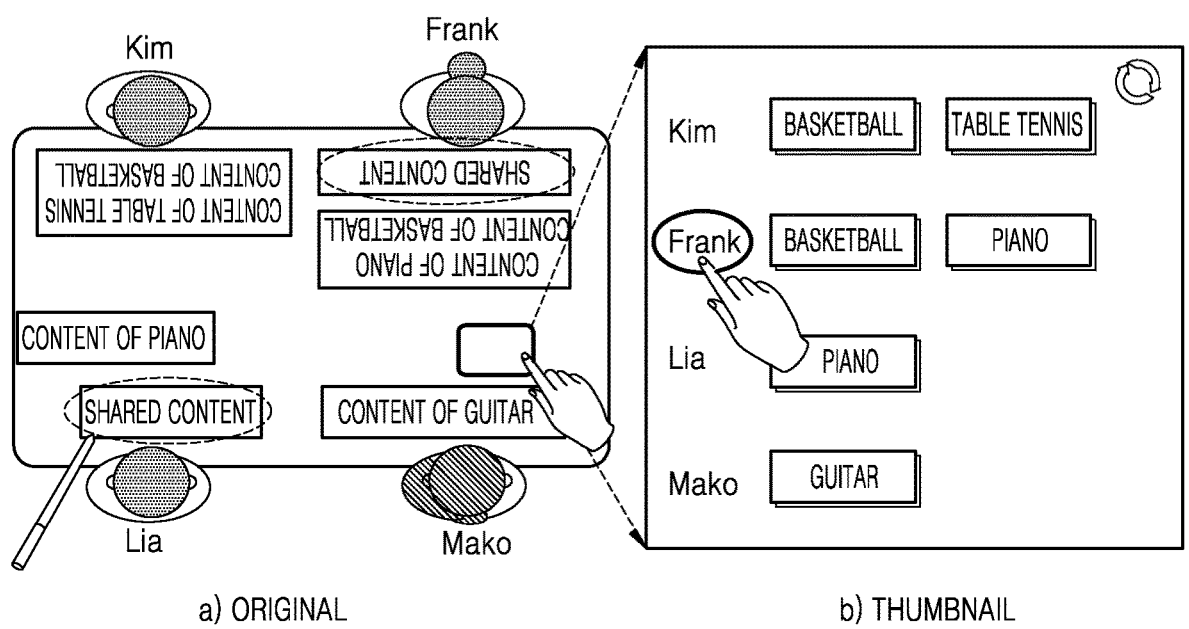
FIG. 9 is a schematic diagram illustrating sharing with a designated user, according to Embodiment 4 of the present disclosure.

FIG. 9 is a schematic diagram illustrating sharing with a designated user according to Embodiment 4 of the present disclosure.

As shown in FIG. 9, the left part illustrates an actual screen display of the smart desktop. The user Kim writes content about a table tennis, the user Frank writes content about a basketball, a guitar, and a piano, the user Lia writes content about a piano, and the user Mako writes content about a table tennis. When the user Kim checks a subject summarization (as shown in the right part of FIG. 9), the system automatically displays by the subjects: sports and music, and pieces of content written by different users are differentiated in respective subject. For example, in the subject of sports, the pieces of content are displayed in an order of: the table tennis written by Kim, the basketball written by Frank, and the table tennis written by Mako, wherein the content is represented by a summarization. The user may check detailed content by selecting the summarization. The user Kim may select the content about the table tennis as the content to be shared and select the user Frank as a user with which the content is to be shared, so as to share the content about the table tennis of Kim with the user Frank.

In addition, according to an embodiment, the sharing user may designate multiple users receiving the shared content (receiving users). Thus, the shared content will be displayed in displaying areas of the designated multiple receiving users simultaneously.

Embodiment 5

According to an embodiment, a displaying instruction for content on a smart desktop is detected; and the content is displayed on the smart desktop based on a designated displaying manner. The content includes content to be shared. The designated displaying manner includes: determining a displaying position of the content to be shared, and displaying the content on the smart desktop based on the determined displaying position.

Scenario: the user A wants to share his content with the users B and C, and the users B and C are sitting on adjacent seats.

Solution: sharing based on designated positions.

A user sharing content (sharing user) may firstly designate a displaying position for displaying the content to be shared and then designate the content to be shared, or may firstly designate the content to be shared and then designate the displaying position for displaying the content to be shared. According to an embodiment, the displaying position for displaying the content to be shared may be designated via a thumbnail indicating a relative position.

Designation of a position: the sharing user may select a blank position (e.g., a position in the middle of two content blocks) in the thumbnail indicating the relative position by clicking on a touch screen, indicating that the user wants to share content at this position.

Designation of content: the sharing user may designate existing content as the content to be shared, or designate content written in real time as the content to be shared. For example, the user may open a writing box and input the content to be shared. A method of designating content is similar to that described with reference to FIG. 4 and is not repeated herein.

According to an embodiment, the smart desktop may detect a position of a receiving user via a camera and adjust the displaying position of the content to be shared to a central position of a viewing angle of one or more users.

Figure 10:
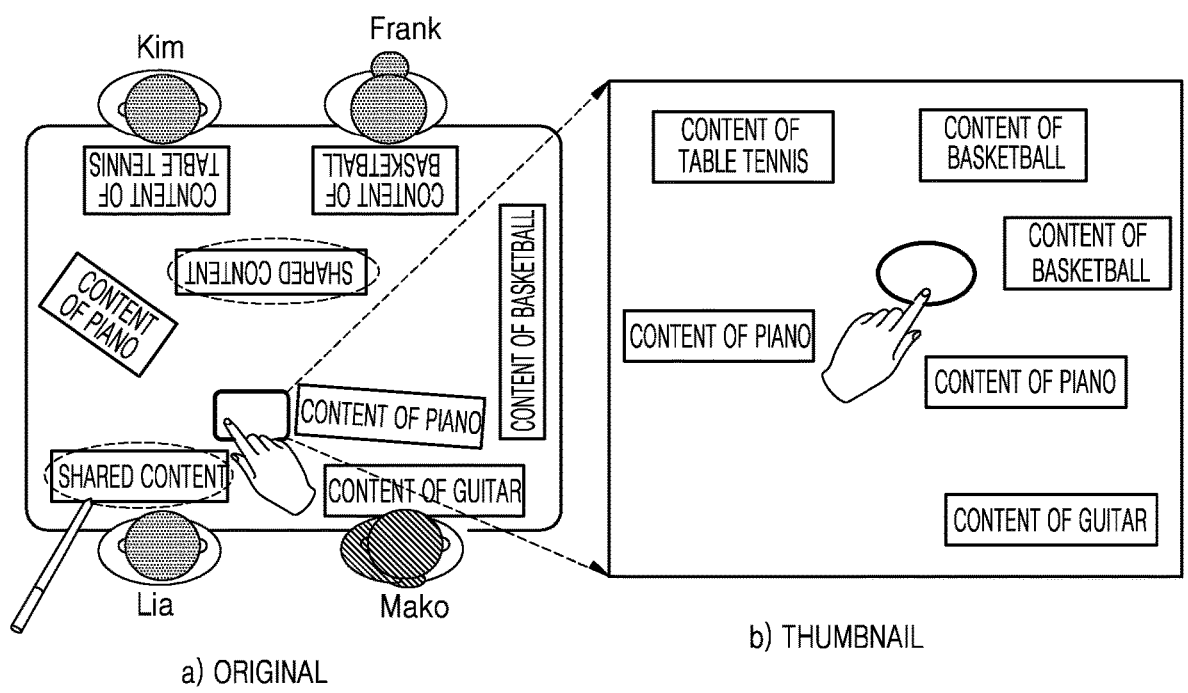
FIG. 10 is a schematic diagram illustrating sharing based on a designated position, according to Embodiment 5 of the present disclosure.

FIG. 10 is a schematic diagram illustrating sharing based on a designated position according to Embodiment 5 of the present disclosure.

As shown in FIG. 10, the left part illustrates an actual screen display of the smart desktop. The user Kim writes content about a table tennis, the user Frank writes content about a basketball, the user Lia writes content about a piano, and the user Mako writes content about a piano and a guitar. The user Lia selects a blank area close to the user Frank and the user Kim in a thumbnail indicating a relevant position by clicking the touch screen (indicating that the user Lia wants to share content on this blank area). The smart desktop shares the content shared by Lia (e.g., content written by Lia in real time) in the blank area. Therefore, the users Frank and Kim may conveniently view the shared content.

In addition, according to an embodiment, the sharing user may designate multiple displaying positions for displaying the content to be shared. As such, the content to be shared is displayed on the multiple displaying positions designated by the sharing user.

Embodiment 6

According to an embodiment, when sharing content, a sharing region may be set on a smart desktop. After receiving a content sharing determining instruction, the smart desktop copies content to be shared to the sharing region in response to the content sharing determining instruction. Other users may view the shared content conveniently in the sharing region.

Hereinafter, the following solution is described in detail: a displaying instruction for content of the smart desktop is detected; and the content is displayed on the smart desktop based on a designated displaying manner. The content includes content to be shared. The designated displaying manner includes: setting a sharing region on the smart desktop, and copying the content to be shared to the sharing region in response to a content sharing determining instruction.

Scenario: multiple users are discussing a problem and need to share, view and obtain their respective content.

Solution: sharing region

An operation for triggering to display a sharing region is set in advance. For example, if palms of users are placed on a screen, it indicates that the users want to open the sharing region. At this time, the smart desktop displays the sharing region on the screen when detecting the above operation of the users. A position, a size, and a shape of the sharing region are described as follows.

(1) Position and Shape

The center of the sharing region may be the center of the whole screen. The shape may be set by the user, may be relevant to a screen shape of the smart desktop (e.g., a round sharing region for a round smart desktop), or may be set to be elliptical in default.

(2) Size

The size of the sharing region may be preset by a system. The edge of the sharing region is reachable for all users. At this time, if some pieces of displayed content are covered by the sharing region, blocks of the pieces of displayed content are automatically adjusted to a blank area of the corresponding user on the smart desktop. If the blank area of the user is not big enough, the content may be put in multiple pages to reduce the size, so as to place the content in the blank area. If the user has no blank area in the displaying area on the smart desktop, the content is moved to the end of another block of the user and is displayed in another page. The user may view different pages in the area through a screen slide.

A color of the sharing region may be different from other areas on the smart desktop, so as to be conveniently recognized by users.

About Sharing of the Content

Figure 11:
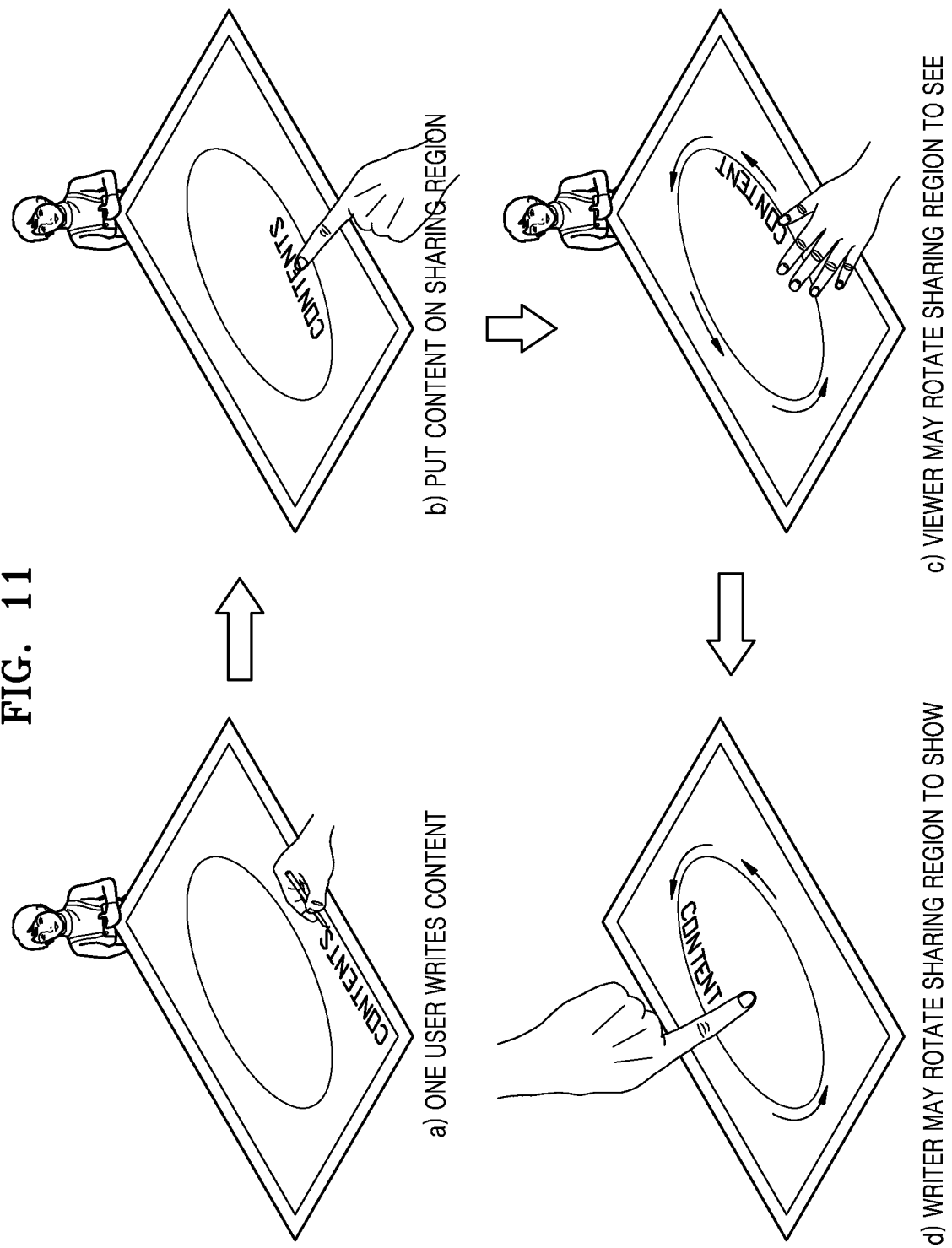
FIG. 11 is a schematic diagram illustrating a sharing region according to Embodiment 6 of the present disclosure.

FIG. 11 is a schematic diagram illustrating a sharing region according to Embodiment 6 of the present disclosure. As shown in (a) of FIG. 11, a user sharing content (sharing user or sharer) selects content to be shared (e.g., by selecting a closed region), or the user sharing the content (the sharing user or the sharer) writes the content to be shared in real time. As shown in (b) of FIG. 11, the sharing user (the sharer) drags the content to be shared to a sharing region via an operation (such as an upward swipe), indicating that the content is to be displayed in the sharing region. The smart desktop copies the content to be shared to the sharing region, wherein a direction of the content to be shared is aligned with the edge of the sharing region. The sharing user (sharer) may hide the content to be shard to a designated user. At this time, if the content to be shared is switched to the front of the user for whom the content is set to be hidden, the content to be shared is automatically hidden.

About Viewing of the Shared Content:

As shown in (c) of FIG. 11, the sharing region may rotate by its center. When the user's hand touches the edge of the sharing region, the sharing region enters into a rotating mode. A plate rotates with the sliding of the user's hand and a rotating speed is consistent with a sliding speed. At this time, only this user may rotate the sharing region. When the sharing user (sharer) rotates the sharing region, the content in the sharing region rotates with the rotation of the sharing region and keeps its original relative position. At this time, the user is able to search for his desired content. If the hand of the sharing user (sharer) has left the sharing region for a certain period of time, the plate enters into a static state again.

About obtaining of the shared content:

As shown in (d) of FIG. 11, a user expecting to obtain the shared content (viewer) may rotate the sharing region through manners such as dragging on the touch screen, obtain some content in the sharing region, and display the content in his displaying area.

(1) The user expects to obtain the shared content whose displaying position is not close. At this time, the user expecting to obtain the shared content may initiatively rotate the sharing region, so as to be close to the shared content. In response to a sharing region rotation instruction, the smart desktop rotates the sharing region.

(2) When the shared content rotates to nearby the user expecting to obtain the shared content, the rotation of the sharing region may be stopped by a sharing region rotation stop instruction triggered by the user.

(3) When the shared content is stopped nearby the user expecting to obtain the shared content, the user may copy the shared content from the sharing region to his displaying area, so as to obtain the content shared by another user.

About Anonymous Sharing:

After putting the shared content into the sharing region, the sharing user may display the shared content and a user identifier (a head image, a signature, etc.) corresponding to the content in the sharing region. In addition, according to an embodiment, the user may also perform anonymous sharing. The user may set via a preset operation (e.g., click an anonymous sharing button) so that, after the shared content is put into the sharing region, merely the shared content is displayed in the sharing region and the corresponding user identifier is not displayed. In addition, font conversion may be provided for the content to be shared, e.g., a handwriting font of the sharing user may be converted into a printed type.

Embodiment 7

When a user writes text or a formula or draw a picture by using a smart desktop, a writing space may be insufficient for the user since there are pieces of existing content on the smart desktop.

In view of this, according to an embodiment, existing content which has a position conflict with an input position of content currently being written is detected, a displaying instruction for the existing content is triggered when detecting the existing content, and the existing content is temporarily hidden.

Hereinafter, the following solution is described in detail: a displaying instruction for content of the smart desktop is detected; and the content is displayed on the smart desktop based on a designated displaying manner. The content includes: existing content which has a position conflict with an input position of content currently being written. The detecting of the displaying instruction for the content of the smart desktop includes: detecting the existing content which has the position conflict with the input position of the content currently being written, and triggering a displaying instruction for the existing content when detecting the existing content. The designated displaying manner includes: temporarily hiding the existing content.

Scenario: content A exists on the smart desktop. A user inputs content B on the left side of the existing content A. When inputting the content B, an inputting space is insufficient for the content B due to the existence of the content A.

Figure 12:
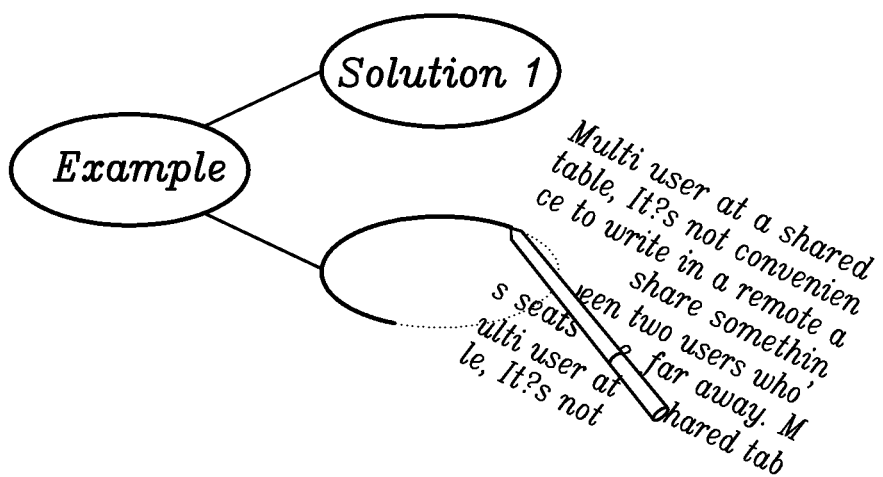
FIG. 12 is a schematic diagram illustrating a writing conflict according to Embodiment 7 of the present disclosure.

FIG. 12 is a schematic diagram illustrating a writing conflict according to Embodiment 7 of the present disclosure.

In order to overcome a writing conflict, the present disclosure includes the following:

(a) Implementing a Function Corresponding to a Writing Conflict

1. Implemented with the start of the smart desktop; 2. implemented by a user via an option configuration provided on a touch screen; 3. Implemented by the user via a voice instruction; 4. Implemented by the user via a handwritten instruction; 5. implemented automatically when there is an input operation; and 6. implemented by the user via an external device such as a stylus pen.

(b) Detecting a Writing Conflict and Hiding Conflicting Content in Real Time.

The present disclosure provides a position detection hiding mode and a conflict prediction hiding mode. The user may set via manners such as a voice instruction, a handwritten instruction, a desktop screen touch, and an external device. The position detection hiding mode and the conflict prediction hiding mode are respectively described as follows.

Position detection hiding mode: when the user inputs text or a formula or draws a picture, a system detects whether there is a conflict between a position of current writing of the user (i.e., an input position of content currently input by the user) and existing content on the desktop. If there is a conflict, in order to enable continuous writing of the current writing, locally hiding is provided for the existing content having the conflict on the position of the current writing. Thus, the user is able to keep on inputting.

Conflict prediction hiding mode: when the user inputs text or a formula or draws a picture, the system predicts a space required by the user for the current input according to following content recently input by the user: a handwriting characteristic, text content and structure (a character, a word, a sentence and a paragraph), formula content and format, and a picture shape and size, and detects whether there is a conflict between the required space and a position of the existing content, i.e., predicting whether the existing content has a position conflict on the input position with the content currently being written. If there is a conflict, the system provides locally hiding for the existing content having the conflict according to the predicted required space on the predicted position where the conflict may exist, so that the user may keep on inputting.

Figure 13:
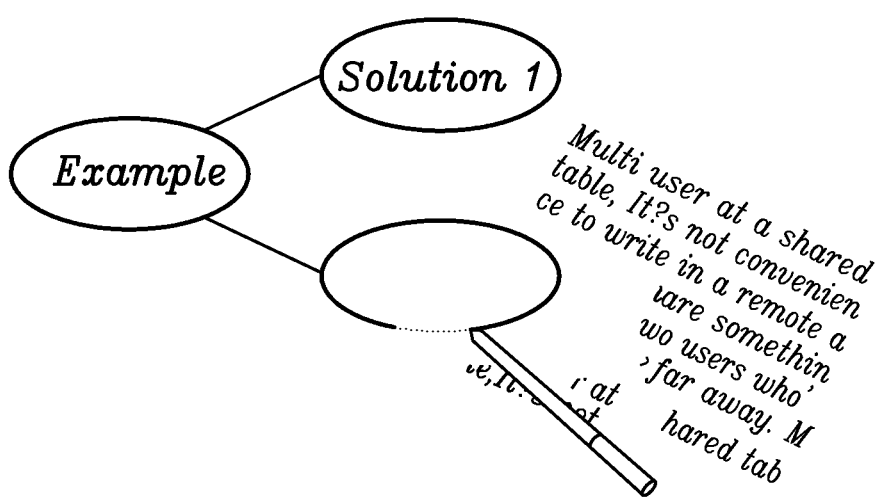
FIG. 13 is a schematic diagram illustrating a first embodiment of a display after writing conflict processing, according to Embodiment 7 of the present disclosure.

FIG. 13 is a schematic diagram illustrating a first embodiment of a display after writing conflict processing according to Embodiment 7 of the present disclosure. As shown in FIG. 13, a writing conflict may be solved by hiding some existing pieces of content.

(c) Displaying Adjustment of the Conflicting Content after Input

When detecting that the input of the content currently being written is finished, the smart desktop may determine a display resuming manner based on a semantic correlation between the existing content and the content currently being written.

The display resuming manner includes: resuming a display after moving a position of the existing content and/or the content currently being written, i.e., a whole content moving mode; or resuming a display after layout rearrangement of the existing content and/or the content currently being written, i.e., a local content layout rearrangement mode.

Figure 14:
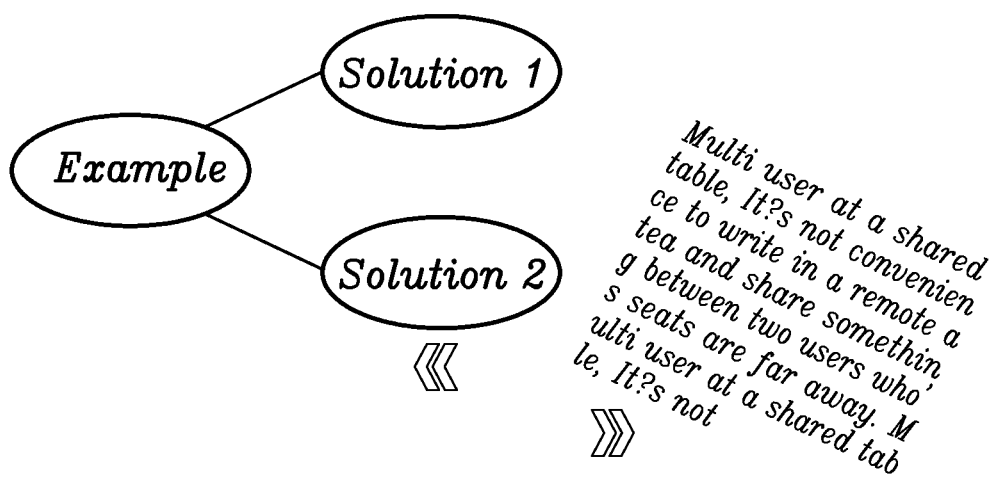
FIG. 14 is a schematic diagram illustrating a second embodiment of a display after writing conflict processing, according to Embodiment 7 of the present disclosure.

The user may set via manners such as a voice instruction, a handwritten instruction, a desktop screen touch, and an external controller. The whole content moving mode and the local content layout rearrangement mode are described as follows:

Whole Content Moving Mode:

FIG. 14 is a schematic diagram illustrating a second embodiment of a display after writing conflict processing according to Embodiment 7 of the present disclosure. As shown in FIG. 14, the system detects in real time whether there is a position conflict with existing content during an input of new content. After the input of the new content is finished, if the system detects that there is a conflict during the input, the system respectively determines complete areas for the new content and the existing content based on a handwriting characteristic, text content and structure (a character, a word, a sentence, and a paragraph), formula content and format, a picture shape and size, an input time, etc. After the complete areas of them are determined, in order to remove the conflict and resume a display of the existing content that is hidden, the system provides an adjustment for relative positions of the content of the two complete areas. The existing content having the conflict may be moved to resume the display of the existing content. Or, the new content having the conflict may be moved to resume the display of the existing content. Or, both the new content and the existing content having the conflict may be moved, so as to resume the display of the existing content.

Figure 15:
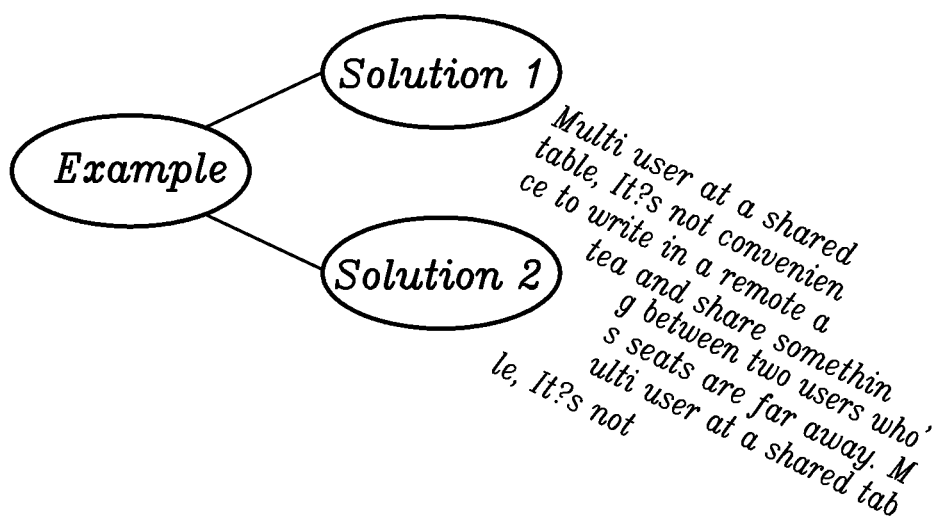
FIG. 15 is a schematic diagram illustrating a third embodiment of a display after writing conflict processing, according to Embodiment 7 of the present disclosure.

Local Content Layout Rearrangement Mode:

FIG. 15 is a schematic diagram illustrating a third embodiment of a display after writing conflict processing according to Embodiment 7 of the present disclosure. As shown in FIG. 15, the system detects in real time during writing new content whether the new content has a position conflict with existing content and records a conflict position. After an input of the new content is finished, in order to remove the conflict and resume a display of the conflicting content that is hidden, the system performs a local layout rearrangement for the newly input content and/or the existing content on the conflict position. A layout of the existing content having the conflict may be rearranged on the conflict position, the display of the existing content may be resumed and a layout of the newly input content may be rearranged, or the layouts of both the newly input content and the existing content may be rearranged.

A layout of a complete picture, a formula, and text may be rearranged according to their priorities, so as to ensure that a shape of the picture is not changed and a continuity of the formula is not affected during the rearrangement. It is preferable to rearrange the layout of the text, then the formula, and last the picture. For example, if the newly input content is a picture and the existing content having the conflict is text content, it may be preferable to rearrange a layout of the text content, so as to ensure that a shape of the picture is not changed.

In addition, according to an embodiment, after the input is finished, the display of the content having the conflict may be adjusted:

1) if the content currently written by the user is relevant to the conflicting existing content, the display may be adjusted according to a surrounding displaying manner as shown in FIG. 15;

2) if the content currently written by the user is irrelevant to the conflicting existing content, the display may be adjusted according to a surrounding displaying manner as shown in FIG. 14;

3) if the content currently being written and the conflicting existing content are written by the same user, the display may be adjusted according to the surrounding displaying manner as shown in FIG. 14; and 4) if the content currently being written and the conflicting existing content are not written by the same user, the display may be adjusted according to the surrounding displaying manner as shown in FIG. 15.

(d) Limiting the Writing Conflict Relevant Function:

1. Limited with the close of the smart desktop; 2. Limited by the user via a provided touch screen option configuration; 3. limited by the user via a voice instruction; 4. Limited by the user via a handwritten instruction; 5. automatically limited when there is no operation; and 6. Limited by the user via an external associated device such as a stylus pen.

Embodiment 8

During the usage of a smart desktop, an external object such as a cup, a bag, a cellphone, a notebook, an elbow, etc. may cover characters or other content on a screen, which is inconvenient for a user.

In view of the above, according to an embodiment, an occluding object on the smart desktop is detected; if content of the smart desktop is covered by the occluding object, a displaying instruction for the covered content is triggered; and a layout of the covered content is rearranged.

Hereinafter, the following solution is described in detail: a displaying instruction for content of the smart desktop is detected; and the content on the smart desktop is displayed based on a designated displaying manner. The content includes: content being covered by an occluding object on the smart desktop. The detecting of the displaying instruction for the content of the smart desktop includes: detecting the occluding object on the smart desktop, and when the content of the smart desktop is covered by the occluding object, triggering the displaying instruction for the content. The designated displaying manner includes: rearranging a layout of the covered content.

Figure 16:
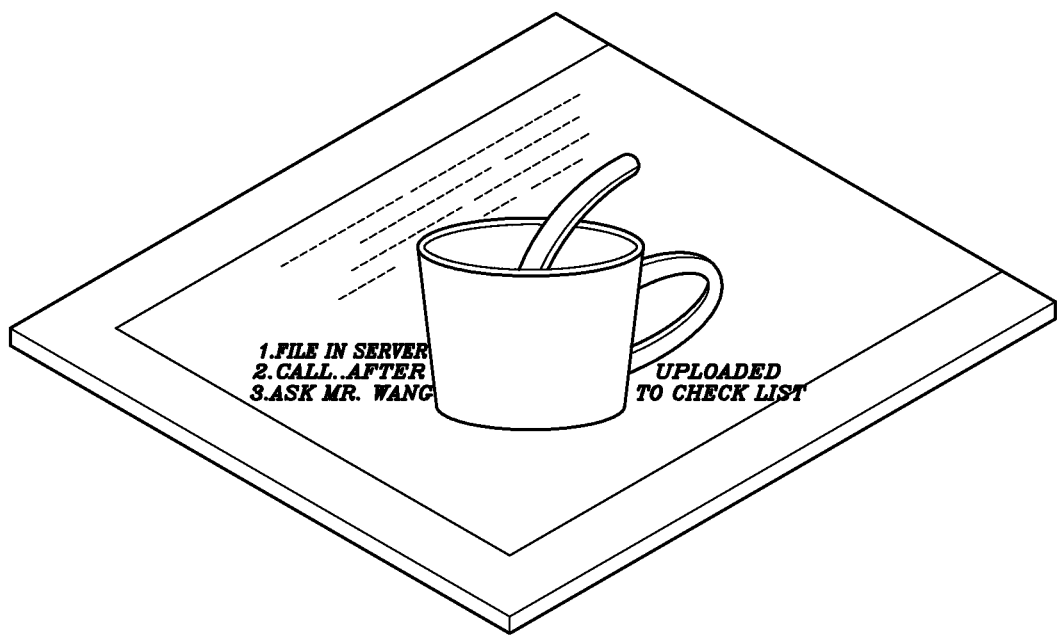
FIG. 16 is a schematic diagram illustrating occlusion according to Embodiment 8 of the present disclosure.

Scenario: the user A puts a cup on the smart desktop. Content displayed on the smart desktop is covered by the cup. FIG. 16 is a schematic diagram illustrating Embodiment 8 of the present disclosure.

In order to overcome the occlusion, the present disclosure includes the following:

1. Automatic Occlusion Adjusting Mode

The user starts an automatic occlusion adjusting mode via, e.g., a) a voice instruction; the user A may emit a voice instruction such as a "start the automatic occlusion adjusting mode". At this time, the automatic occlusion adjusting mode is switched on; b) a physical button operation: the user may switch on the automatic occlusion adjusting mode by pressing a particular button on the smart desktop; c) a touch screen operation: the user may switch on the automatic occlusion adjusting mode by touching the screen, e.g., triple clicking on the screen; d) a gesture operation: the user provides a gesture action, e.g., waving his hand three times. At this time, a camera may capture the gesture action of the user and the automatic occlusion adjusting mode may be switched on; e) an operation using an external controller: the user may operate an external controller, e.g., pressing a button on a stylus pen, to switch on the automatic occlusion adjusting mode; and f) a handwriting operation: the user may input a fixed mode instruction via handwriting, e.g., writing "switch on the automatic occlusion adjusting mode" to switch on the automatic occlusion adjusting mode.

After entering into the automatic occlusion adjusting mode, occlusion processing includes the following.

(a) Layout analysis and content recognition are provided for the content presented on the screen via a sensor, detection and recognition are provided for the occluding object on the desktop, and an occluded plane, occluded content, and a section (e.g., a paragraph) where the occluded content is located are determined.

A result of the layout analysis includes, but is not limited to: i. a character and a word; ii. a text line; iii. a paragraph; iv. text content with coherent meaning; v. an image; and vi. text and an image with coherent meaning.

The detection and recognition of the occluding object includes, but is not limited to: i. a type and a shape of the occluding object; ii. a degree of transparency of the occluding object; and iii. a shape of the occluded plane.

In some embodiments, a layout of an occluded object is rearranged, including: rearranging a layout of the occluded content based on at least one of: a character continuity of the occluded content, a text line continuity of the occluded content, a paragraph continuity of the occluded content, a semantic continuity of the occluded content, an image continuity of the occluded content, and a correlation between text and an image of the occluded object. In particular, detailed content to be adjusted is determined first, and then a layout of the content to be adjusted is rearranged.

(b) According to the above result, the detailed content to be adjusted is determined based on at least one of the following:

i. a character continuity of the occluded content, ii. a text line continuity of the occluded content, iii. a paragraph continuity of the occluded content, iv. a semantic continuity of the occluded content, v. an image continuity of the occluded content, and vi. a correlation between the text and the image of the occluded object.

(c) After optimal adjusting content is determined, the layout of the occluded content is rearranged according to the following manners: i. determining a size of an area available for redisplaying the occluded content; ii. rearranging a layout of the optimal adjusting content determined according to the available area and the occluded content; and iii. rearranging content rearranged around the occluded plane.

Figure 17:
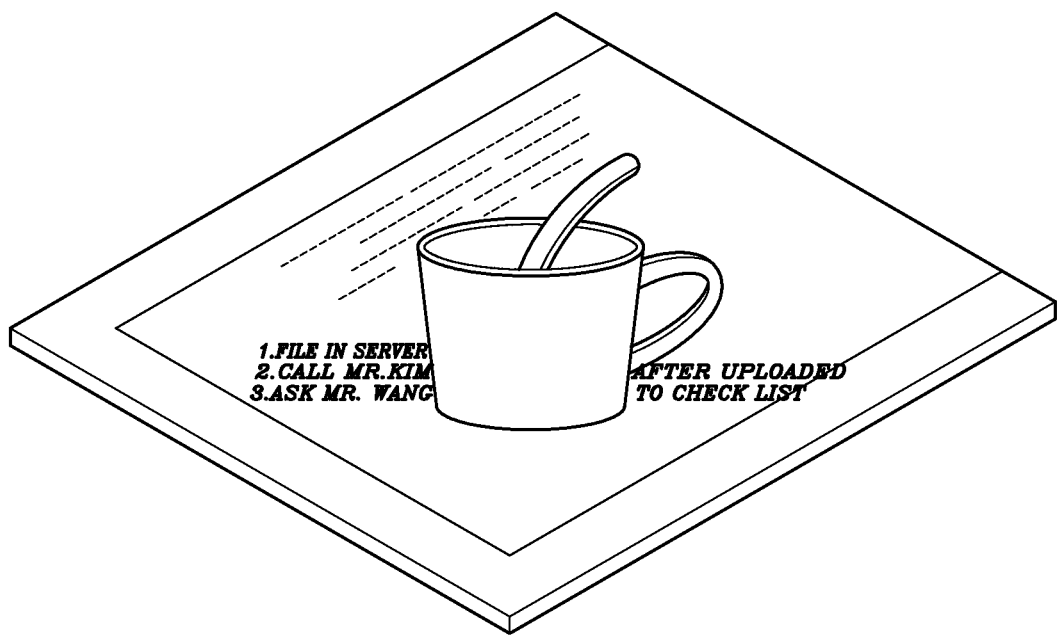
FIG. 17 is a schematic diagram illustrating a first embodiment of a display after occlusion processing, according to Embodiment 8 of the present disclosure.

After entering into the automatic occlusion adjusting mode, the occlusion processing may be adjusted in real time according to a change in the occluding object and the content displayed on the desktop. FIG. 17 is a schematic diagram illustrating a first embodiment of a display after the occlusion processing according to Embodiment 8 of the present disclosure. A result after the automatic occlusion adjustment is as shown in FIG. 17.

According to an embodiment, before the rearrangement of the layout of the occluded content, the smart desktop may firstly detect a focus point of the user. If an occluded position does not overlap the focus point of the user, the rearrangement of the layout of the occluded content may not be performed at this time. If the occluded position overlaps the focus point of the user, the layout of the occluded content may be rearranged. The focus point of the user may be detected via an associated device such as a camera and a visual focus may be taken as the focus point of the user. A position currently edited by the user may also be taken as the focus point of the user.

According to an embodiment, when the rearrangement of the layout of the occluded content is performed, the smart desktop may present text in the form of a summarization, so as to save an available displaying space.

The automatic occlusion adjusting mode may be switched off via at least one of the following: a) a voice operation: the user A emits a voice such as "end the automatic occlusion adjusting mode" to switch off the automatic occlusion adjusting mode; b) a physical button operation: the user may switch off the automatic occlusion adjusting mode by pressing a button on the smart desktop; c) a touch screen operation: the user switches off the automatic occlusion adjusting mode by touching the screen, e.g., clicking the screen four times continuously; d) a gesture operation: the user provides a gesture action, e.g., waving a hand four times. At this time, the camera may capture the gesture action of the user and the automatic occlusion adjusting mode may be switched off; e) an operation using an external controller: the user operates the external controller, e.g., pressing a button on the stylus pen, to end the automatic occlusion adjusting mode; f) a handwriting operation: the user writes a fixed mode instruction, e.g., writing "end the automatic occlusion adjusting mode" to switch off the automatic occlusion adjusting mode; g) close of the smart desktop: the mode is switched off due to the close of the smart desktop, e.g., the meeting is over; and h) change of the current user: if the user A switches on the automatic occlusion adjusting mode on a position a of the smart desktop and moves to a position b. Later, a new user C joins the meeting and moves to the position a. A system detects that the current user on the position a is changed and switches off the automatic occlusion adjusting mode for the user C. At the same time, the system keeps the automatic adjusting mode for the user A on the position b.

2. Manual Occlusion Adjusting Mode

The user may switch on a manual occlusion adjusting mode via the following: a) a voice instruction: the user A may emit a voice, e.g., "switch on the manual occlusion adjusting mode". At this time, the manual occlusion adjusting mode is switched on; b) a physical button operation: the user switches on the manual occlusion adjusting mode by pressing a button on the smart desktop; c) a touch screen operation: the user switches on the manual occlusion adjusting mode by touching the screen, e.g., double clicking the screen three times; d) a gesture operation: the user provides a gesture action, e.g., waving a hand five times, at this time, the camera may capture the gesture action of the user and the manual occlusion adjusting mode is switched on; e) an operation using an external controller: the user operates the external controller, e.g., pressing a button on the stylus pen, to switch on the manual occlusion adjusting mode; and f) a handwriting operation: the user writes a fixed mode instruction, e.g., writing "switch on the manual occlusion adjusting mode" to switch on the manual occlusion adjusting mode.

After entering the manual occlusion adjusting mode, the occlusion processing includes the following.

(a) Layout analysis and content recognition are provided for the content presented on the screen via a sensor, detection and recognition are provided for the occluding object on the desktop, and the occluded plane, the occluded content, and the section (e.g., a paragraph) where the occluded content is located are determined.

A result of the layout analysis includes, but is not limited to: i. a character and a word; ii. a text line; iii. a paragraph; iv. text content with coherent meaning; v. an image; and vi. text and an image with coherent meaning.

The detection and recognition of the occluding object includes, but is not limited to: i. a type and a shape of the occluding object; ii. a degree of transparency of the occluding object; and iii. a shape of the occluded plane.

In some embodiments, a layout of an occluded object is rearranged, including: rearranging a layout of the occluded content based on at least one of: a character continuity of the occluded content, a text line continuity of the occluded content, a paragraph continuity of the occluded content, a semantic continuity of the occluded content, an image continuity of the occluded content, and a correlation between text and an image of the occluded object. In particular, detailed content to be adjusted is determined first, and then a layout of the content to be adjusted is rearranged.

(b) According to the above result, the detailed content to be adjusted is determined based on at least one of the following: i. a character continuity of the occluded content, ii. a text line continuity of the occluded content, iii. a paragraph continuity of the occluded content, iv. a semantic correlation of the occluded content, v. an image continuity of the occluded content, and vi. a correlation between the text and the image of the occluded object.

(c) After optimal adjusting content is determined, the layout of the occluded content is rearranged according to the following manners: i. the user drags content (text or an image) around the occluded content in a certain direction via an operation on the touch screen; ii. The optimal adjusting content determined by a system is moved according to a dragging operation of the user, and a moving speed and distance may be defined according to a dragging strength, speed, and distance on the touch screen; iii. If the optimal adjusting content may not be completely displayed after the movement due to the restriction of a displaying area, non-occluded content in the optimal adjusting content after the movement may be hidden or a font type may be adjusted to ensure that the user is able to see the occluded content preferably.

Figure 18:
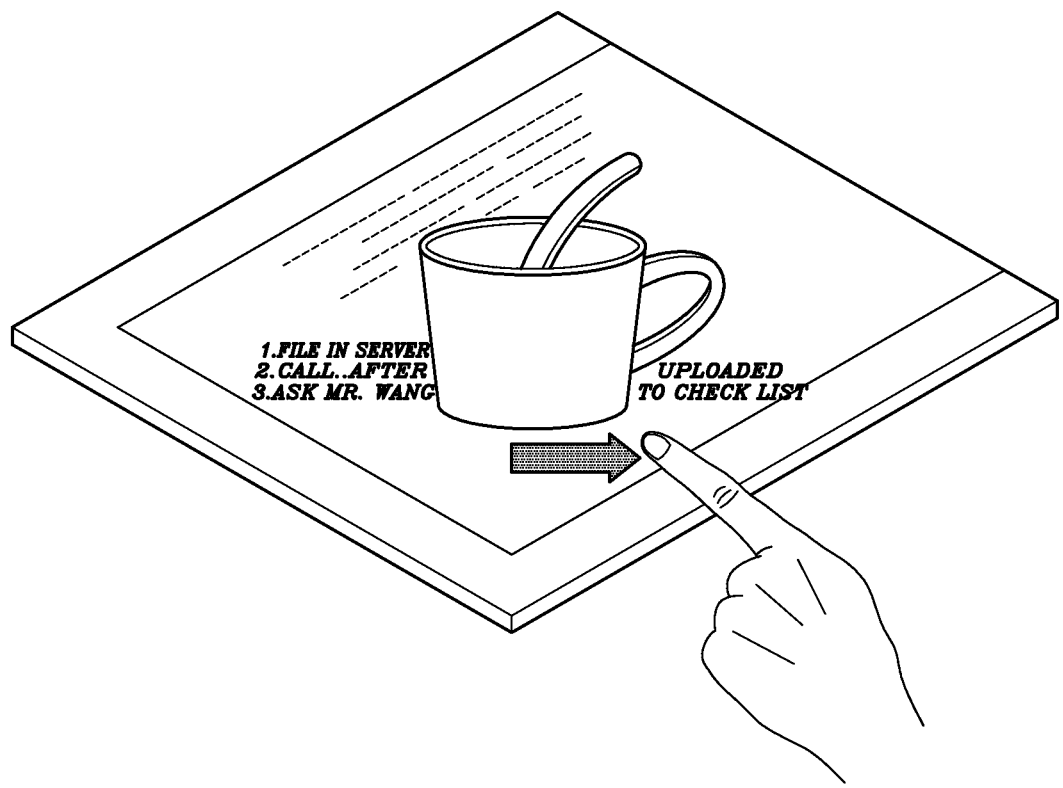
FIG. 18 is a schematic diagram illustrating a second embodiment of a display after occlusion processing, according to Embodiment 8 of the present disclosure.

FIG. 18 is a schematic diagram illustrating a second embodiment of a display after the occlusion processing according to Embodiment 8 of the present disclosure. A result of the manual occlusion adjustment is as shown in FIG. 18.

In addition, when the layout of the occluded content is rearranged, the smart desktop may present text in the form of a summarization, so as to save an available displaying area as much as possible. Subsequently, detailed content corresponding to the summarization may be presented according to the user's operation.

The manual occlusion adjusting mode may be switched off via at least one of the following: a) a voice operation: the user A emits a voice such as "end the manual occlusion adjusting mode" to switch off the manual occlusion adjusting mode; b) a physical button operation: the user may switch off the manual occlusion adjusting mode by pressing a button on the smart desktop; c) a touch screen operation: the user switches off the manual occlusion adjusting mode by touching the screen, e.g., clicking the screen four times continuously; d) a gesture operation: the user provides a gesture action, e.g., waving a hand six times. At this time, the camera may capture the gesture action of the user and the manual occlusion adjusting mode may be switched off; e) an operation using an external controller: the user operates the external controller, e.g., pressing a button on the stylus pen, to end the manual occlusion adjusting mode; f) a handwriting operation: the user writes a fixed mode instruction, e.g., writing "end the manual occlusion adjusting mode" to switch off the manual occlusion adjusting mode; g) close of the smart desktop: the mode is switched off due to the close of the smart desktop, e.g., the meeting is over; and h) change of the current user: if the user A switches on the manual occlusion adjusting mode on the position a of the smart desktop and moves to the position b. Later, a new user C joins the meeting and moves to the position a. The system detects that the current user on the position a is changed and switches off the manual occlusion adjusting mode for the user C. At the same time, the system keeps the manual adjusting mode for the user A on the position b.

In addition, the user may view the occluded content by calling out a thumbnail, wherein the calling of the thumbnail is described with reference to Embodiment 1 and is not repeated herein.

In view of the above, the present disclosure provides a solution for the occluded content, which is able to ensure a normal display of the occluded content.

Embodiment 9

When multiple users use a smart desktop, the multiple users may operate the same control simultaneously. But a control resource may be limited. Therefore, there may be a resource conflict.

1. Take a Recording Resource as an Example

Generally, the smart desktop may have only one microphone. At this time, if the multiple users need to record a voice, there may be a conflict.

The solution of the present disclosure is as follows: assigning a virtual recording button for each user, and the virtual recording button of the user may be called out according to an operation of the user, e.g., a) a voice operation; the user emits a voice, e.g., saying "recording". At this time, the virtual recording button may emerge in a blank area in front of the user. If the area in front of the user is filled up, content in an area with the same size as the virtual recording button in front of the user may be hidden to display the virtual recording button; b) a physical button operation: the user calls out the virtual recording button via a button on the smart desktop; c) a touch screen operation: the user touches a screen, e.g., long pressing the screen. At this time, the virtual recording button will be displayed on a position of the screen where the user touches the screen. If there is content on this position, the content in an area with the same size as the virtual recording button may be temporarily hidden to display the virtual recording button; d) a gesture operation: the user provides a gesture action, e.g., waving a hand. At this time, a camera may capture the user's gesture action and the virtual recording button may emerge in a blank area in front of the user. If the area in front of the user is filled up, content in an area with the same size as the virtual recording button may be temporarily hidden to display the virtual recording button; and e) an operation using an external controller: the user operates an external controller, e.g., pressing a button of a stylus pen. At this time, the virtual recording button is displayed on a position pointed by the stylus pen. If there is content on this position, the content in an area with the same size as the virtual recording button may be temporarily hidden to display the virtual recording button.

Figure 19:
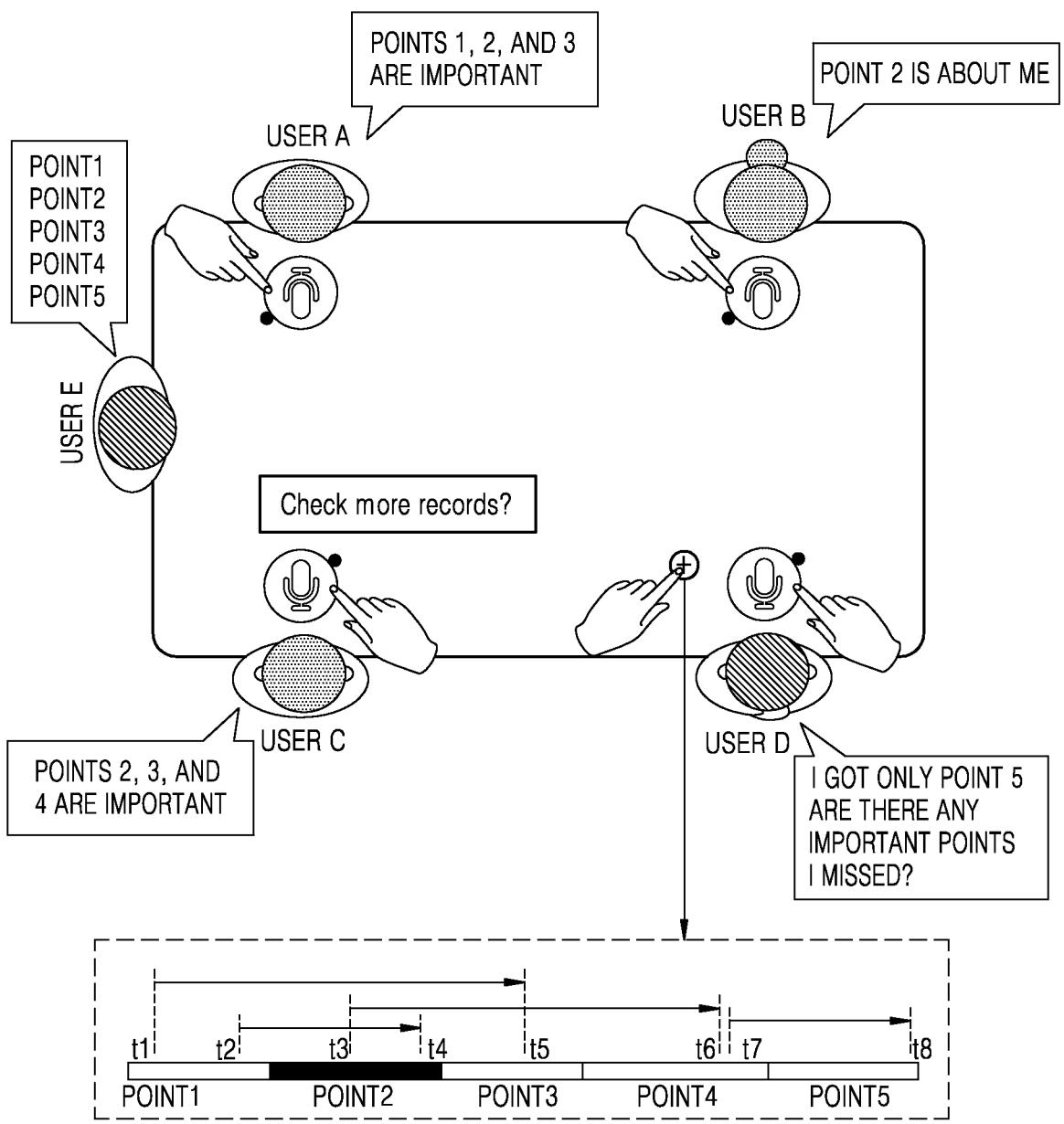
FIG. 19 is a schematic diagram illustrating recording resource conflict processing according to Embodiment 9 of the present disclosure.

FIG. 19 is a schematic diagram illustrating recording resource conflict processing according to Embodiment 9 of the present disclosure.

A user may bring up a virtual recording button to start recording when hearing content that he is interested in, and may stop the recording by pressing the virtual recording button again. First, when detecting a virtual recording button pressing event, the smart desktop receives the user's recording start instruction and starts the recording, i.e., starting a recording apparatus of the user to record a voice. When detecting that all users select to stop recording, the smart desktop receives a recording stop instruction of each user and stops the recording, i.e. stopping a recording apparatus of each user. As shown in FIG. 19, the user A presses a virtual recording button at a time t1. The smart desktop starts a recording apparatus to record a voice. The users B and C respectively press virtual recording buttons at times t2 and t3. At a time t4, the user B presses the virtual recording button again to stop recording. At a time t5, the user A presses the virtual recording button again to stop the recording. At a time t6, the user C presses the virtual recording button again to stop the recording. The user D presses a virtual recording button at a time t7 and presses the virtual recording button again at a time t8 to stop the recording. The times t1 to t8 are in a time order. It is known from the above that an actual recording period of the smart desktop is t1-t6 and t7-t8. If the times t6 and t7 are the same, the actual recording period of the smart desktop is t1-t8.

When saving a recording file, the smart desktop generates the recording file for each user according to a recording start instruction and a recording stop instruction of the user. In particular, according to the recording start instruction and recording stop instruction of each user, the smart desktop may obtain a starting time and a stopping time of each user using a recording function. According to the starting time and the stopping time of each user using the recording function, the smart desktop searches an audio file of actual recording for the recording file corresponding to the user.

When any user wants to play recording, he may bring up a recording content playing interface via a manner such as long pressing the screen. A progress bar on the recording content playing interface starts from an earliest time and ends at a latest time from among all users. Recording content is divided into several key points according to a change in content based on voice recognition and semantic analysis. According to an embodiment, the recording content playing interface includes an identifier of each important period and/or content obtained by voice recognition of each important period. The important period is a period corresponding to a key point determined based on a period where the user performs a recording operation and/or the change in the content. Therefore, in the recording content playing interface, the identifier is provided at a starting time and an ending time of each key point, and is also provided at a starting time and an ending time of each user's recording. The user may select to play at any key point, or may select to play recording of a particular user. The user may also select to save audio content.

For example, as shown in FIG. 19, the user D records merely a key point 5 of the meeting, but the user D wants to view content of other key points. Audio content recorded by the users A, B, and C includes content of key points 1 to 4. Therefore, the user D may bring up a playing interface as shown in FIG. 19, and selects to play content of other key points or content recorded by other users in the playing interface.

According to an embodiment, when recorded content is played, it is possible to select to play a sound. In addition, in a multi-user meeting scenario, the playing of the sound may affect other users. Therefore, it is also possible to convert an audio into text content via techniques such as voice and semantic recognition and display the text content in an interface.

In view of the above, an embodiment realizes parallelized invoking of a recording resource of the smart desktop for different users, and thus a resource utilization rate is increased.

2. Take a Time Reminding Resource as an Example

An alarm clock (time reminder) function may be provided by an audio playing resource of a device. When multiple users use the smart desktop, the multiple users may have set their alarm clocks (time reminders). Therefore, there may be a resource conflict from among the multiple users.

According to an embodiment, a displaying instruction for content of the smart desktop is detected; and the content is displayed on the smart desktop based on a designated displaying manner.

The content includes time reminding information.

The detecting of the displaying instruction for the content of the smart desktop includes the following: detecting a reminding time set by a user, and if the reminding time set by the user arrives, triggering the displaying instruction for the content.

The designated displaying manner includes: if users of the smart desktop set the same reminding time, when the reminding time arrives, playing the time reminding information via at least one of: a voice, an icon, and text; or, if the users using the smart desktop do not set the same reminding time, when the reminding time arrives, playing the time reminding information via at least one of: an icon and text.

Figure 20A:
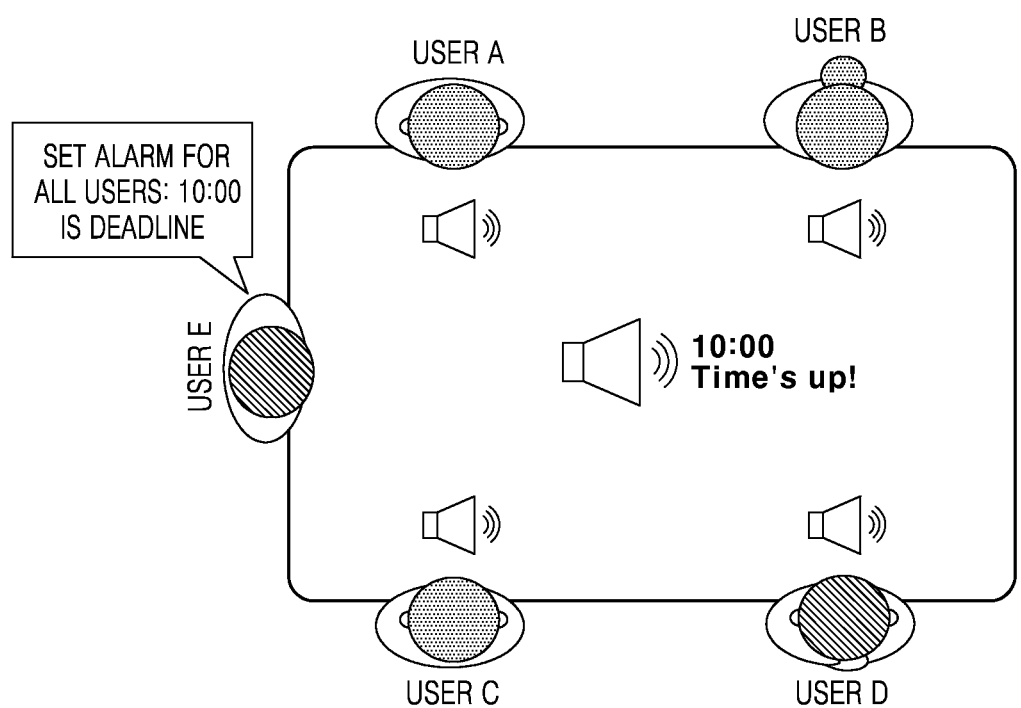
FIG. 20A is a schematic diagram illustrating time reminding resource conflict processing when alarm clocks have the same alarm time, according to Embodiment 9 of the present disclosure.
Figure 20B:
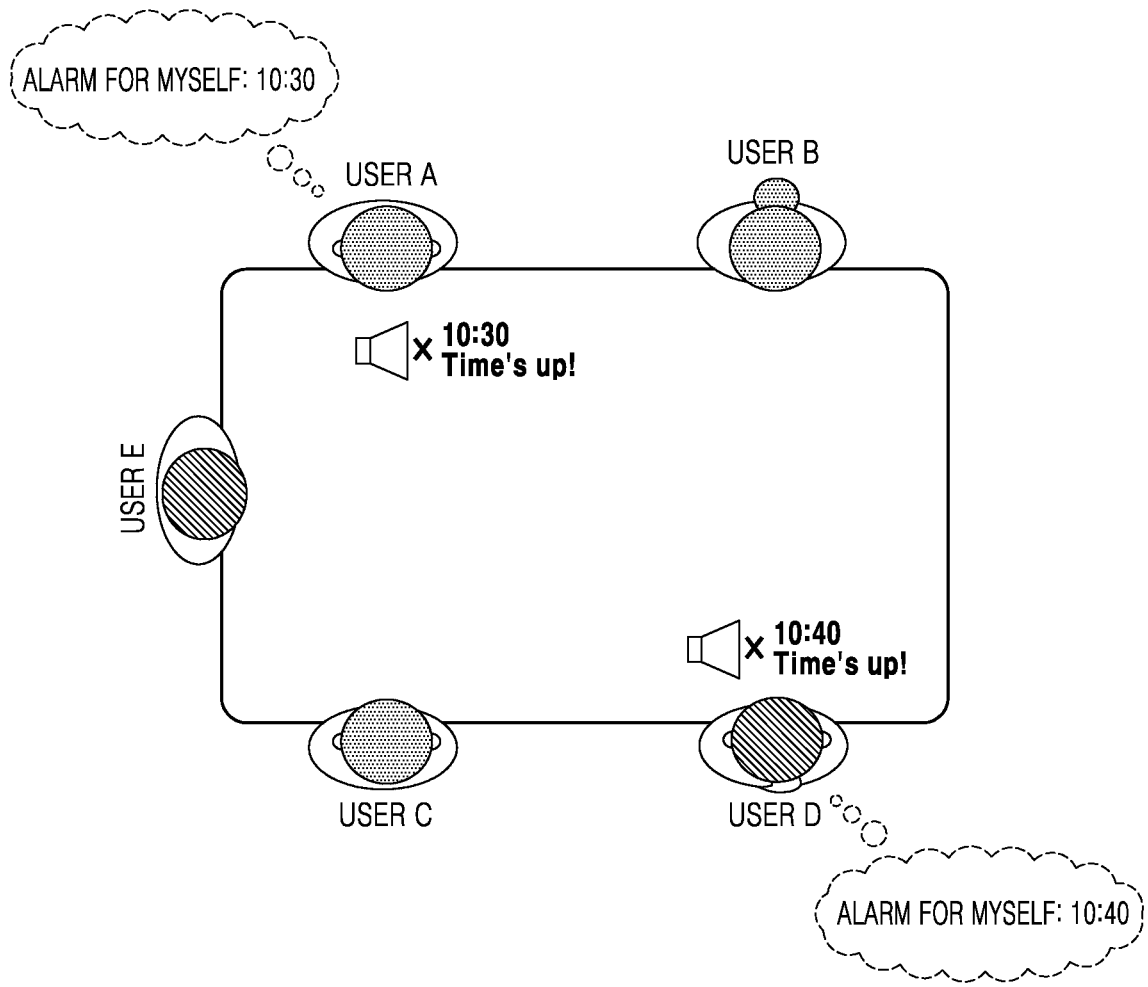
FIG. 20B is a schematic diagram illustrating time reminding resource conflict processing when alarm clocks have different alarm times, according to Embodiment 9 of the present disclosure.

FIGS. 20A and 20B are schematic diagrams illustrating time reminding resource conflict processing according to Embodiment 9 of the present disclosure. FIG. 20A shows time reminding resource conflict processing for the same alarm time according to Embodiment 9. FIG. 20B shows time reminding resource conflict processing for different alarm times according to Embodiment 9.

As shown in FIG. 20A, if multiple users set the same alarm time, it is regarded that all users need to be reminded at this time. Therefore, an alarm sound is played when the alarm time arrives.

In addition, if each user has different content to be reminded or one user has multiple pieces of content to be reminded at one time point, it is possible to display an icon reminder and/or a text reminder in a displaying area of each user when the alarm time arrives. It is also possible to both play the alarm sound and display the icon reminder and/or the text reminder.

In addition, according to an embodiment, content written by a user may be correlated with a recording file. If it is detected that the content written by the user is correlated with content in the recording file, a recording playing button is added following the content written by the user. The user may select to play recording or display corresponding recording content. Thus, the user is able to refer to the recording content when writing.

As shown in FIG. 20B, if multiple users do not set the same alarm time, it is regarded that a particular user needs to be reminded at this time. If an alarm sound is played, other users may be affected. Therefore, when an alarm time of each user arrives, an icon reminder and/or a text reminder may be displayed in a displaying area of the user.

During the above processing, when the icon reminder and/or the text reminder is displayed in the displaying area of the user, a focus point of the user may be determined firstly and then the icon reminder and/or the text reminder may be displayed at the focus point of the user. A visual focus of the user may be detected by a device such as a camera and the visual focus of the user may be taken as the focus point of the user. Or, a position currently edited by the user may be taken as the focus point of the user. During the display of the icon reminder and/or the text reminder, if the focus point of the user moves, a position of the icon reminder and/or the text reminder moves accordingly.

In view of the above, an embodiment realizes parallelized invoking of a time reminding resource of the smart desktop for different users, and thus a resource utilization rate is increased.

In view of the above, according to an embodiment, a solution for multiple user invoking requests for the same resource of the smart desktop is provided, which is able to solve a conflict of the multiple user invoking requests and ensure normal and reasonable invoking of a resource of the smart desktop.

Embodiment 10

When multiple users use a smart desktop, different users may write different content. In addition, the multiple users may write the same content at the same time.

According to an embodiment, the smart desktop may determine prompt information for content currently being written according to existing written content and display the determined prompt information.

In particular, 1) during a writing procedure of a user, the smart desktop provides a writing prompt according to content written by other users. 2) Content written in real time by the user may be an email address, a date, a time, a personal name, a formula, etc. At this time, the user may be prompted about correctness of content to be written or content having been written. 3) The content written in real time by the user may be text. At this time, a summarization for content not having been written by the user may be retrieved from content having been written by other users, and the summarization may be provided to the current user. The current user may check detailed information of the summarization.

Hereinafter, detailed processing manners are provided.

1. Keyword Prompt

Prompt information for content currently being written is determined according to a keyword of the content currently being written.

In Particular:

A keyword is retrieved from the content currently being written, and a context keyword corresponding to the keyword retrieved from the content currently being written is obtained according to the keyword and a context keyword retrieved from existing written content. The prompt information for the content currently being written is determined according to the obtained context keyword.

Alternatively, a context keyword is retrieved from the content currently being written, a keyword corresponding to the context keyword retrieved from the content currently being written is obtained according to the keyword and a context keyword retrieved from the existing written content, and prompt information is determined according to the obtained keyword.

(a) Define a Keyword

Herein, a keyword includes, but is not limited to, a grammatical proper noun. In general, it may be a key noun including detailed and special meaning. For example, 1. Name (e.g., a Personal Name, an Address, a Country Name, an Organization Name, a Chemical Material Name, Etc.)

The following are some examples: "Tom" in "Tom is a smart kid", "tom233@gmail.com" in "his email address tom233@gmail.com", "China" in "China will host the 2022 winter Olympics", and "acetaminophen" in "cold medicines usually contain acetaminophen".

2. Date (e.g., a Year, a Month, a Date, a Festival, a Week, Etc.)

The following are some examples: "December 15" in "the birthday of HAN, Meimei is December 15", "Wednesday" in "we will hold a college meeting on Wednesday", and "national day" in "the firm will be closed for 7 days for the national day".

3. Digit (and a Corresponding Quantifier)

The following are some examples: "3.1415926" in "Pi is 3.1415926", "13527194204" in "the telephone number of ZHANG San is 13527194204", "5324" in "the total travel expense to be paid by LI Si is 5324 dollars", and "7" in "the firm will be closed for 7 days for the national day".

4. General Noun Keyword (May Include an Adherent Adjunct)

The following are some examples: "elevator card" in "statistics of elevator cards of all employees are to be collected today", and "fresh fruit, mineral water, notebook" in "items need to be bought for the meeting: fresh fruit, mineral water, notebook".

5. Key Verb or Phrase

The following is an example: "call the leader" in "tell ZHANG San tomorrow to call the leader".

(b) Establish a Correspondence Table Between a Keyword and a Context Keyword

For content written by a user, a system finds a keyword of the content written by the user via manners such as semantic analysis and a predefined keyword table, detects a keyword in context, establishes a correspondence with a noun, and saves the correspondence in a correspondence table. For content written by all users, a correspondence table is adjusted. The adjustment of the correspondence table is performed in real time during a writing procedure of all users.

For Example:

His email address is tom233@gmail.com; we will hold a college meeting on Wednesday; the total travel expense to be paid by LI Si is 5324 dollars; items to be bought for the meeting: fruits, mineral water, notebook.

Thus, a correspondence table may be as shown in Table 1:

TABLE 1

| Correspondence | Keyword 1 | Keyword 2 (context keyword) |
|---|---|---|
| 1 | His email address | tom233@gmail.com |
| 2 | Wednesday | College meeting |
| 3 | Travel expense to be paid by LI Si | 5324 dollars |
| 4 | Items need to be bought for the meeting | fruits, mineral water, notebook |

(c) Determine a Similarity and Calculate Reliability

For content written by other users, if a detected proper noun already exists in a correspondence table or has a high similarity to a word in the correspondence table, processing may be performed according to the following cases:

i. The detected proper noun is in the correspondence table, and a corresponding context keyword corresponds to that in the correspondence table.

In this case, it indicates that a new user has written the same content. At this time, the reliability of the correspondence may be increased according to an algorithm.

ii. The detected proper noun has a high similarity to a proper noun in the correspondence table but they are not the same.

For example, content written by the user A includes a sentence "ZHANG San will meet LI Si". At this time, "ZHANG San" and "meet LI Si" will be added to a correspondence table. Then, the user B writes a sentence "ZHANG Er will meet LI Si". At this time, "ZHANG Er" has a high similarity to the "ZHANG San" in the correspondence table but the system may not determine whether one user has a clerical error (one of the two words is wrong), or both of them are right. Therefore, "ZHANG Er" and "meet LI Si" are added in the correspondence table as a new item, and it is indicated that it is similar to "ZHANG San" and "meet LI Si". If one of several similar correspondences has a similarity higher than a threshold (i.e. multiple users have written the same content), the system may regard that this correspondence is correct and others may be incorrect.

iii. The detected proper noun is in the correspondence table but a corresponding context keyword does not correspond to that in the correspondence table.

One proper noun may correspond to multiple keywords. For example, content written by the user A includes a sentence: ZHANG San will meet LI Si on Sunday. At this time, the correspondence of keywords may be saved in a table as shown in Table 2. Then, the user B writes a sentence: ZHANG San will meet LI Si. After detecting the keyword "ZHANG San", the system inquires the correspondence table and finds that keywords corresponding to "ZHANG San" include not only "meet LI Si" but also "Sunday". At this time, the system may increase the reliability of the correspondence between "ZHANG San" and "meet LI Si" according to an algorithm.

If the system detects that a context keyword is not completely consistent with a corresponding keyword in a correspondence table, the system may add a new keyword item to the correspondence table.

If the system detects that a context keyword is more than or partially similar to a corresponding keyword in a correspondence table, the system may add an extra keyword to the correspondence table, and increase the reliability of the correspondence of an existing keyword according to an algorithm.

TABLE 2

| correspondence | keyword 1 | keyword 2 | keyword 3 |
|---|---|---|---|
| 1 | ZHANG San | Sunday | meet LI Si |

(d) Detect a Keyword Currently Written by a User and Inquire a Correspondence Table When a user is writing a keyword (may be a keyword or a context keyword in a correspondence table), the system finds the keyword or a keyword having a high similarity to this keyword from the correspondence table.

(e) Provide a Prompt for a User, Including:

i. Correction

A keyword is retrieved from content currently being written, and if a similarity between this keyword and a keyword retrieved from existing written content is higher than a threshold, prompt information for the content currently being written is determined according to the keyword retrieved from the existing written content.

In particular, when a keyword written by a user has a high similarity but is not completely the same as a keyword in a correspondence table, the system may prompt the user of the keyword with the high reliability except the keyword written by the user in the form of, e.g., characters in a light color. If there are several different similar keywords, a prompt may be provided in the form of a list. If the user selects a keyword by, e.g., clicking a touch screen, the originally written keyword is automatically corrected to be the prompted keyword and is displayed with the same font and size.

Figure 21:
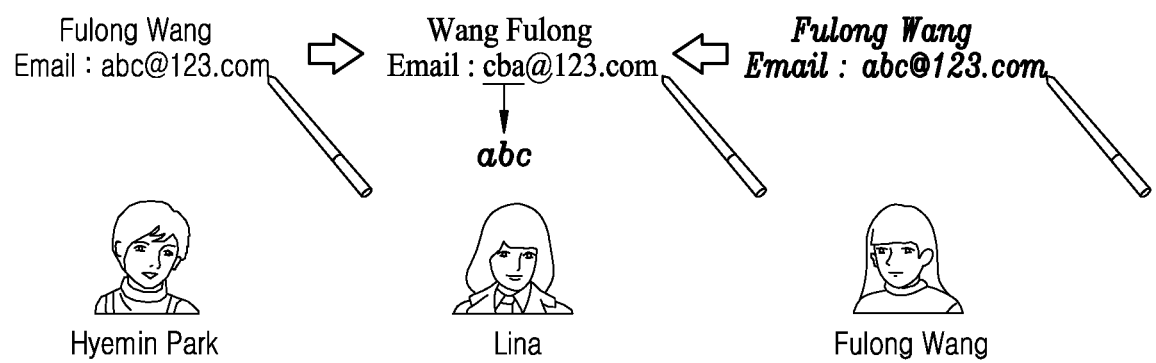
FIG. 21 is a schematic diagram illustrating a first embodiment of providing a prompt, according to Embodiment 10 of the present disclosure.

FIG. 21 is a schematic diagram illustrating a first embodiment of providing a prompt according to Embodiment 10 of the present disclosure. In FIG. 21, users Hyemin Park and Fulong Wang have written an email address of the user Fulong Wang. When the smart desktop detects that an email address currently written by the user Lina is incorrect, in order to prompt the user Lina that she may have a clerical error, the smart desktop provides a prompt for the user Lina, wherein the prompt may include the correct email address. The user Lina clicks on the touch screen to acknowledge the clerical error. The smart desktop corrects the email address originally written by Lina to the correct email address.

ii. Prompt

A keyword is retrieved from content currently being written, a context keyword corresponding to the keyword retrieved from the content currently being written is determined according to the keyword and a context keyword retrieved from existing written content, and prompt information for the content currently being written is determined based on the determined context keyword.

In particular, a keyword written by a user is the same as a keyword in a correspondence table. If the keyword has only one corresponding context keyword, the corresponding context keyword is displayed in a light color following content written by the user to provide a prompt. If the keyword has multiple corresponding context keywords, writing of the user is continuously detected. If it is detected that the user writes content relevant to the corresponding context keywords, the context keywords are displayed in a light color following content written by the user to provide a prompt.

Alternatively, a keyword written by a user is the same as a context keyword in a correspondence table. If the context keyword has only one corresponding keyword, the corresponding context keyword is displayed in a light color following content written by the user to provide a prompt. If the context keyword has multiple corresponding keywords, writing of the user is continuously detected. If it is detected that the user writes content relevant to the corresponding keywords, the context keyword is displayed in a light color following content written by the user to provide a prompt.

Figure 22:
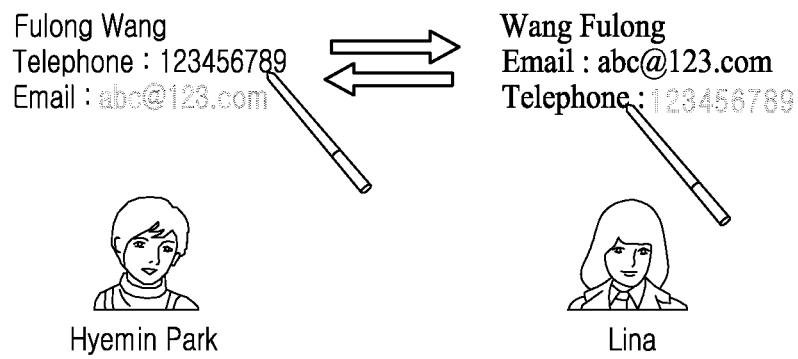
FIG. 22 is a schematic diagram illustrating a second embodiment of providing a prompt, according to Embodiment 10 of the present disclosure.

FIG. 22 is a schematic diagram illustrating a second embodiment of providing a prompt according to Embodiment 10 of the present disclosure. In FIG. 22, the smart desktop detects that the user Fulong Wang has written his email address. The smart desktop saves the email address and a user identifier of the user Fulong Wang correspondingly. When the smart desktop detects that the user Hyemin Park is writing "Fulong Wang" and writing "Email", the smart desktop predicts that the user Hyemin Park will write the email address of Fulong Wang. Therefore, the smart desktop provides a prompt for the user Hyemin Park using a light color. The prompt may include the saved email address of Fulong Wang, so as to prompt the user Hyemin Park to omit writing the detailed email address. The user Hyemin Park clicks the touch screen to acknowledge the prompt. The smart desktop automatically adds the saved email address of Fulong Wang behind the previously written keyword "Email".

According to an embodiment, when providing an intelligent prompt, it is possible to determine whether the intelligent prompt is required and what prompt is to be provided according to a correspondence table. For example, content currently written by a user may be compared with content having been written by other users in real time. It may be determined whether to provide a prompt and what prompt is to be provided according to a compared result.

2. Summarization Prompt

A summarization for existing written content is retrieved from the existing written content. A summarization for content currently being written is retrieved from the content currently being written. The summarization for the existing written content and the summarization for the content currently being written are compared, and prompt information for the content currently being written is provided based on a compared result.

In particular:

(a) Retrieval of a summarization: instant summarization retrieval is performed on content having been written by all users. Multiple summarizations may be retrieved.

(b) Summarization prompt, including:

i. Automatic Prompt

When a user writes content, the user may trigger a summarization prompt if he has no idea. For example, the user leaves a blank area on a position where the summarization prompt needs to be displayed. The system retrieves the content currently written by the user and retrieves a summarization according to a trigger operation of the user. The system compares the retrieved summarization with a summarization of content having been written by all users and determines the summarization prompt for the content currently written by the user. When detecting the blank area left by the user, the system may automatically display the summarization of content which is not written by the user but has been written by other users in the blank area left by the user in a light color. If the user has written something before leaving the blank area, the system may select to display a summarization relevant to that written by the user.

In addition, the user may write a special symbol to trigger the summarization prompt when having no idea, e.g., ellipsis points. After detecting the special symbol, the system may automatically provide a prompt. If there are several prompts to be provided, they may be displayed via a drop-down menu to save a space.

When the user selects a prompted summarization via a manner such as clicking on the touch screen, detailed content corresponding to the summarization may be expanded. The user may see the detailed content and select required content through selection or dragging. At this time, the selected content may be inserted into the blank area left by the user in an appropriate font size and the user's font type.

ii. Manual Prompt

The user may trigger to display the summarization by a voice, a button, a gesture, etc. For example, the user may trigger to display the summarization by his palm's sliding on the screen. At this time, the summarization of the content which is not written by the user but has been written by other users may be presented in the blank area of the user in a light color. FIG. 23 is a schematic diagram illustrating a third embodiment of providing a prompt according to Embodiment 10 of the present disclosure.

In FIG. 23, the user Hyemin Park has written detailed content of three paragraphs. The smart desktop generates a summarization for each of the three paragraphs. The user Lina writes only content of two paragraphs, wherein the second paragraph is blank. The smart desktop presents the summarization of the second paragraph written by Hyemin Park to Lina as a prompt. The user Fulong Wang does not write any content. The smart desktop presents the summarizations of the three paragraphs written by Hyemin Park to Fulong Wang as a prompt.

In view of the above, according to an embodiment, prompt information may be displayed when a user is writing. Thus, a prompt for content which is not written by the user but has been written by other users or a summarization of such content may be provided intelligently. Through analyzing the content written by all users, the writing experience of the user is improved, the efficiency of cooperation of multiple users is improved, and repeated writing by the multiple users is avoided.

Embodiment 11

Content Exchanged with Multiple Associated Devices:

An embodiment may be also applied to a scenario using multiple associated devices. A smart desktop establishes a connection relationship with the associated devices, and exchanges content of the smart desktop and/or content of the associated devices with the associated devices based on the connection relationship. For example, the smart desktop may be implemented as a smart whiteboard in teaching. Hereinafter, the smart whiteboard is taken as an example for describing an embodiment.

Figure 24:
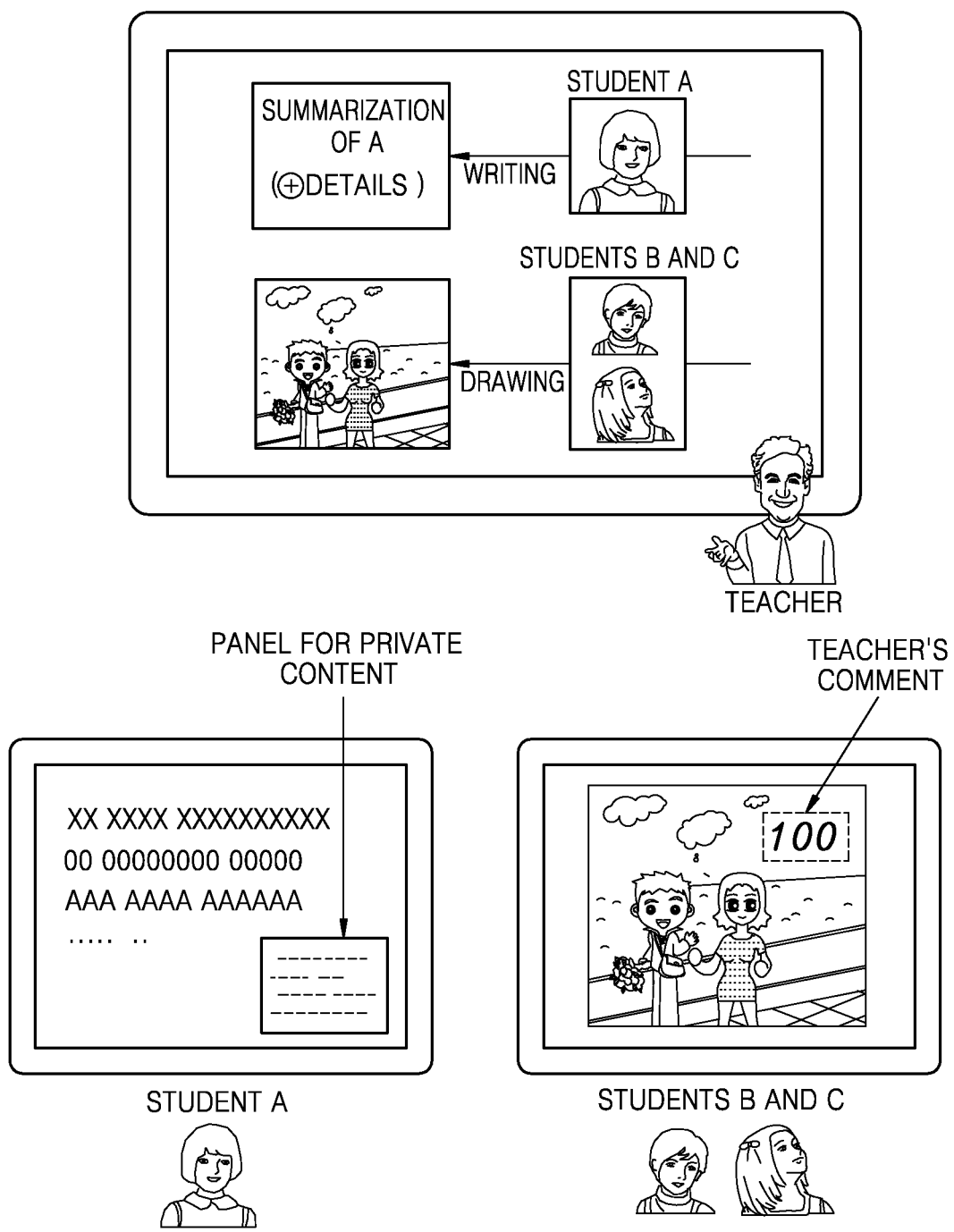
FIG. 24 is a schematic diagram illustrating a smart whiteboard according to Embodiment 11 of the present disclosure.

FIG. 24 is a schematic diagram illustrating a smart whiteboard according to Embodiment 11 of the present disclosure.

Application scenario 1: a teacher uses a smart whiteboard and students use terminals (e.g., pads). The smart desktop is the whiteboard and the terminals used by the students are associated devices or referred to as associated terminals.

1. Starting Up and Connection.

After the smart whiteboard and the associated terminals are started up, a connection between them may be established via the following manners:

(1) Bluetooth: the smart whiteboard or/and the associated terminals switch on a Bluetooth function and may find a surrounding whiteboard or/and associated terminals which have switched on the Bluetooth function. A data connection between them may be implemented via a connection request or an automatic connection. (2) Infrared: the smart whiteboard or/and the associated terminals switch on an infrared function and may find a surrounding whiteboard or/and associated terminals which have switched on the infrared function. A data connection between them may be implemented via a connection request or an automatic connection. (3) Wireless network: the smart whiteboard or/and the associated terminals may implement a data connection by being connected to the same local network.

The above communication manners including Bluetooth, infrared, and wireless network are examples for establishing the connection between the smart whiteboard and the associated terminals. One of ordinary skill in the art would know that the description is merely some examples and is not used for restricting the protection scope of the present disclosure.

2. Identity Authentication

After the connection between the smart whiteboard and the associated terminals is established, identity authentication and privilege setting are performed. An identity characteristic of each user and a set privilege may be shared between the smart whiteboard and the associated terminals via the communication manners such as Bluetooth, infrared, and wireless network. It should be noted that: since the identity authentication is not directly related to the number of the smart whiteboard or the associated terminals, the number of users may be larger than the number of actual hardware smart whiteboard and associated terminals.

In particular, the identity authentication may include the following:

(1) Identity Registration

A user may register an identity characteristic as follows, and a system associates and binds the identity characteristic registered by the user and a user identifier (a name, etc.). The registration of the identity characteristic includes: <1> registration of a handwriting characteristic: the user writes some content (such as some characters), and the system analyzes a handwriting characteristic and associates the handwriting characteristic with other identity characteristics and the user identifier; <2> registration of a head image characteristic: a camera of the smart whiteboard or/and the associated terminals captures a head image of the current user one or more times, and the system analyzes the head image and associates the head image with other identity characteristics and the user identifier; <3> registration of a signature: the user signs on the whiteboard or/and the associated terminals to recognize the association among the signature, the other identity characteristics, and the user identifier; <4> registration of a fingerprint: the user may input a fingerprint to recognize the association among the fingerprint, the other identity characteristics, and the user identifier; and <5> registration of an iris characteristic: the user may collect an iris characteristic through the camera of the smart whiteboard or/and the associated terminals to recognize the association among the iris characteristic, the other identity characteristics, and the user identifier.

(2) Identity Authentication

The smart whiteboard or/and the associated terminals accomplishes the authentication of the current user by collecting and analyzing the identity characteristic of the user and comparing it with an identity characteristic library saved in the system. The collected information includes: <1> handwriting: the user writes some content (e.g., some characters), and the system analyzes a handwriting characteristic and compares it with an identity library to recognize the current user; <2> head image: the camera of the smart whiteboard or/and the associated terminals captures a head image of the current user, and the system analyzes a head image characteristic and compares it with the identity library to recognize the current user; <3> signature: the user signs on the smart whiteboard or/and the associated terminals, and the system compares it with the identity library to recognize the current user; <4> fingerprint: the user inputs a fingerprint, and the system compares it with the identity library to recognize the user; and <5> iris: the camera of the smart whiteboard or/and the associated terminals obtains iris information, and the system compares it with the identity library to recognize the current user.

3. Privilege Setting

After the identity authentication is finished, the smart whiteboard or/and associated terminals may set privileges for other users. Take a teaching scenario as an example. The teacher may set, on the smart whiteboard, an operation privilege between the smart whiteboard and the associated devices and an operation privilege between the associated devices, i.e., set an operation privilege between the teacher and the students and an operation privilege between the students. The students may set, on the associated devices, an operation privilege with other associated terminals, i.e., set an operation privilege between the students. The operation privilege includes, but is not limited to: (1) information input privilege: an input privilege for information such as text, an image, and a voice may be set for the smart whiteboard or/and associated terminals; (2) displaying and browsing privilege: a privilege for displaying and browsing particular content by a particular user; (3) uploading and sharing privilege: a privilege for uploading or sharing content written by a particular user to a sharing region; and (4) editing privilege: a privilege for editing (commenting and modifying, etc.) content of other users, etc.

Hereinafter, a detailed usage scenario is described, wherein the teacher uses the smart whiteboard and the students use the associated terminals for teaching.

Usage Scenario 1: The Teacher Distributes Tasks to the Students

Content to be distributed is determined in content of the smart whiteboard, and an associated terminal receiving the content to be distributed is determined from among the associated terminals; and in response to a content distribution instruction, the content to be distributed is sent to the associated terminal receiving the content to be distributed.

Content may be sent to one associated terminal or to multiple associated terminals simultaneously. Or, multiple parts of content may be sent to one associated terminal or to multiple associated terminals simultaneously.

Further, content of the smart whiteboard may be classified to generate at least one content group, and the associated terminals are classified to generate at least one associated terminal group. A content group is selected from the at least one content group, and an associated terminal group is selected from the at least one associated terminal group; and a content distribution instruction is received, and in response to the content distribution instruction, content in the selected content group is sent to each associated terminal in the selected associated terminal group.

In particular, as shown in FIG. 24, the teacher may list tasks for multiple users at one side of the smart whiteboard. If description of the tasks is relatively long, it may be displayed in the form of a summarization. Subsequently, details of the summarization may be seen via an operation such as a gesture. For example, the teacher assigns a writing task to one student and assigns a drawing task to two students. Through operations such as a voice, a screen touch, and a gesture, the teacher may bring up information of students in the class. The information such as a head image or a name may be displayed at one side of the smart whiteboard. The teacher may select one or more students and classify the students into groups, i.e. classify associated terminals into groups. Similarly, the teacher may select tasks and may classify the tasks into groups, i.e., classify content of the smart whiteboard. The assignment of the task group on the left side to the student group on the right side may be accomplished. At this time, the associated devices used by the students display the assigned task.

Usage Scenario 2: The Teacher Checks and Grades a Completion Situation

The smart whiteboard obtains editing information for content provided by a designated associated terminal and sends the editing information to the designated associated terminal.

In particular, as shown in FIG. 24, while the students respectively finish their tasks, the teacher may select an image or a name of a student on the smart whiteboard, and may display a homework completion situation of the student (or may regard as editing information for distributed content) in a designated area of the smart whiteboard. The teacher may also set a time, so as to automatically update the completion situation of the student at the set time. When doing homework, the teacher may forbid sharing between multiple associated terminals. After the students finish their homework, the homework may be uploaded to the smart whiteboard. At this time, a prompt may be provided to the teacher, e.g., a voice, a shining head image, etc. If the homework has much content, a thumbnail display may be provided. The teacher may edit the homework, e.g., comment, correct, grade, etc. The editing information may be synchronized with and displayed on the associated terminal of the completer of the homework.

Usage Scenario 3: The Teacher Shares Teaching Content

Content to be shared on the smart whiteboard is determined, and the content to be shared is sent to a designated associated terminal.

In particular, the teacher may share a multimedia image, a video, or notes to an associated terminal of a particular student via a gesture or a voice instruction when teaching in the class. Other students may share, compare, and compensate via their terminals.

Usage Scenario 4: Multiple Students Use the Same Terminal.

If the number of students is larger than that of associated terminals, multiple students may share one associated terminal. Screen space allocation and usage solution may be same as that when multiple users share the smart desktop. The teacher may designate a student via user identity instead of an associated terminal.

Usage Scenario 5: Setting Private Information

As shown in FIG. 24, when using the smart whiteboard or/and associated terminals, the user may perform private setting for content in a designated area, content designated by designating an area, or designating content (including designating according to a summarization, selecting all, etc.). The content set as private may be hidden during uploading and sharing, e.g., not displayed, blurred, etc.

Usage Scenario 6: Saving and Accessing of Class Notes:

After class or teaching of content is over, a student may save content that he has a privilege to operate. The teacher may save content of whole class teaching. The saved content may be accessed subsequently. The student may edit the content to generate his class notes.

Application scenario 2: multiple users use the smart desktop for a meeting, and a user saves and/or retrieves content via an associated mobile device The embodiments of the present disclosure may be applicable for content saving and retrieving. For example, after the meeting, the user may need to save the content by using the associated mobile device.

The solution may include the following:

(1) Determining an area of the smart desktop covered by the associated device, and transmitting content in this area of the smart desktop to the associated device. In particular, the user may open a corresponding application program in the associated mobile device and put the associated mobile device on the area of the content he wants to save. At this time, the smart desktop senses that the area is covered by the associated mobile device. The content in this area may be transmitted to an application via manners such as NFC or Wi-Fi and saved in the mobile associated terminal. Optionally, if the user wants to save all content on the smart desktop, all content may be saved via some operations (e.g., rotating the associated mobile device on the smart desktop).

In addition, the smart desktop may receive the content transmitted by the associated device, determine the area covered by the associated device, and display the received content in the determined area. In particular, in a meeting, the user may want to call out a record saved previously. The user may place the associated mobile device on a blank area of the smart desktop where the content is to be displayed. At this time, the record saved in the associated mobile device may be transmitted to the smart desktop via NFC, Wi-Fi, etc. and displayed in the blank area. The user may also select the content he wants to call out and to be displayed on the smart desktop in advance.

(2) Transmitting designated content on the smart desktop to a designated associated device or application. In particular, after the meeting, the user may perform a particular operation (e.g., clicking a content transmitting button). After detecting the user's operation, the smart desktop transmits recording content to a designated associated device or application. The transmission may be implemented via a preset manner (e.g., the preset transmitting manner may include transmitting via email), an email address for receiving the content may be set, and the smart desktop may transmit the recording content to the designated email address. All content on the smart desktop may be transmitted to the designated associated device. Or, the user may designate some content on the smart desktop and the smart desktop transmits the designated content to the associated device. The designated associated device may be set when the smart desktop is initially used. Or, the associated device from among the associated devices may be designated to receive the content when the content is transmitted.

According to an embodiment, the content may be saved in its original format, e.g., saving the handwritten content, or converted into a preset format (e.g., a printed format) before saving.

Embodiment 12

User identity authentication: a user identity authentication method provided by the present disclosure may be applicable for the any scenario which needs to authenticate the identity of a user of a smart desktop in Embodiments 1 to 11, and also applicable for any identity authentication scenario other than the smart desktop.

In the present disclosure, a user does not need to register signature content in advance and does not need to write the signature content in advance. The user is allowed to write freely to implement identity authentication. The user authentication may be performed during a free writing procedure of the user.

A Detailed Authentication Procedure Includes:

when a user starts to write, the smart desktop allows the user to write freely. At this time, a system does not know identity information of the user. The smart desktop receives written content input by the user in real time. At this time, the smart desktop records a handwriting characteristic of the written content, such as a pressure, a speed, an acceleration, a stroke characteristic, etc. The smart desktop also records a writing assistant characteristic, such as writing position coordinates, writing time information, a writing direction, a text line direction, etc. Then, according to the handwriting characteristic of the written content and the writing assistant characteristic, a user characteristic of the current user is generated based on a characteristic retrieving algorithm and is automatically saved in the smart desktop. During continuous writing of the user, the smart desktop receives content written by a user to be authenticated, and generates a user characteristic to be authenticated based on a handwriting characteristic of the content written by the user to be authenticated and a writing assistant characteristic. The user characteristic is updated in real time. At this time, the smart desktop compares the user characteristic to be authenticated with the saved user characteristic, and recognizes user identity from various aspects including a handwriting characteristic, writing position coordinates, a time continuity, a writing direction, a text line direction, a writing area, and semantic information of the written content. If the user characteristic to be authenticated matches the saved user characteristic, the authentication of the user identity succeeds. Otherwise, a new account (user identifier) is created for the current user, and the writing position coordinates, time information, writing direction, text line direction, and semantic information of the written content are also recorded.

After the user identity authentication succeeds, the content written by the user may be saved in association with the user identifier of the user. Subsequently, it is possible to recognize which content on the smart desktop is written by the user based on the saved user identifier and the corresponding written content.

Figure 25:
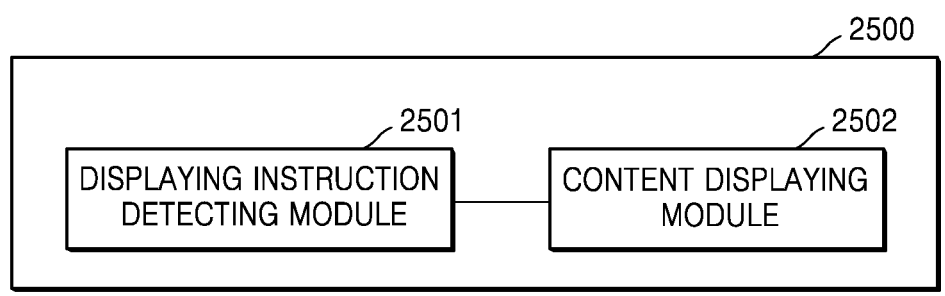
FIG. 25 is a schematic diagram illustrating an exemplary structure of a content displaying apparatus for a smart desktop, according to some embodiments of the present disclosure.

According to an embodiment, a content displaying apparatus for a smart desktop, applicable for a smart desktop terminal is further provided. FIG. 25 shows an exemplary structure of a content displaying apparatus 2500 for a smart desktop according to some embodiments of the present disclosure.

As shown in FIG. 25, the content displaying apparatus 2500 includes: a displaying instruction detecting module 2501 and a content displaying module 2502.

Figure 26:
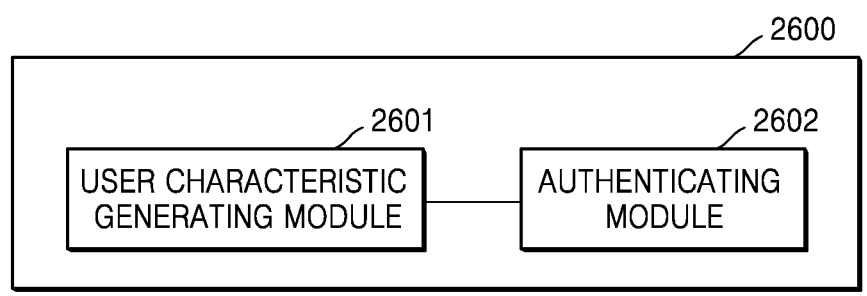
FIG. 26 is a schematic diagram illustrating an exemplary structure of a user authentication apparatus according to some embodiments of the present disclosure.

According to an embodiment, a user authentication apparatus is further provided. FIG. 26 shows an exemplary structure of a user authentication apparatus 2600 according to some embodiments of the present disclosure. The user authentication apparatus 2600 includes: a user characteristic generating module 2601, and an authenticating module 2602.

Figure 27:
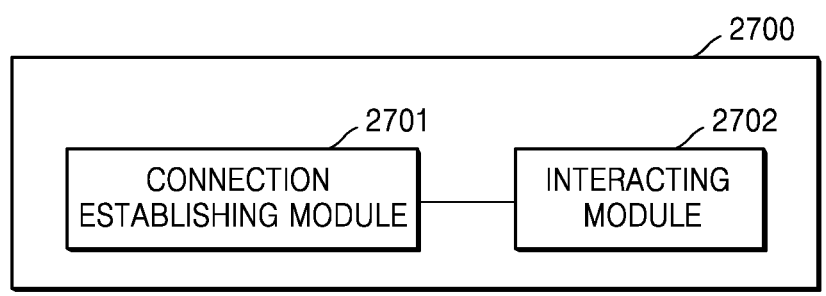
FIG. 27 is a schematic diagram illustrating an exemplary structure of a smart desktop terminal according to some embodiments of the present disclosure.

According to an embodiment, a smart desktop terminal is further provided. FIG. 27 shows an exemplary structure of a smart desktop terminal 2700 according to some embodiments of the present disclosure. As shown in FIG. 27, the smart desktop terminal 2700 includes:

a connection establishing module 2701, adapted to establish a connection relationship with an associated device; and an interacting module 2702, adapted to exchange content of a smart desktop and/or content of the associated device with the associated device based on the connection relationship.

In view of the above, according to an embodiment, content may be displayed on the smart desktop based on a designated displaying manner, so as to meet various displaying requirements for the content of the smart desktop.

In addition, according to an embodiment, viewing requirements of users in different directions may be met. For example, via a thumbnail, a user is able to see content of other users which is adjusted to his viewing direction; and via the rotation of a sharing region, each user is able to check content in the sharing region in his suitable viewing direction.

Further, according to an embodiment, a public sharing region is provided, and a position and a direction of content of each user are not restricted. Each user may write freely on the smart desktop and view different content, which meet personalized requirements of each user.

In addition, according to an embodiment, simultaneous writing requirements of multiple users may be met, content written by each user may be recognized simultaneously, various personalized functions such as real time thumbnail update, summarization retrieval and update, occlusion processing, and intelligent prompt may be provided, and convenient sharing of content written by multiple users may be realized.

According to an embodiment, the problem of "invisible" in the prior art is solved. Through a thumbnail, a subject summarization, and a user summarization, no matter how far users and whether their viewing directions are the same, a user is able to conveniently see content of other users that he is interested in on a position and with an angle suitable for him. The user may also edit the content of other users, such that multiple users may view the content more conveniently and effectively when using the smart desktop.

Also, according to an embodiment, the problem of "unreachable" in the prior art is solved. Through content sharing manners such as sharing with a designated user or sharing on a designated position and a sharing region, no matter how far users and whether a writing angle is suitable, a user is able to share his content with other single or multiple users conveniently. The shared content is automatically adjusted to a position and angle suitable to be viewed by other users. As such, multiple users may share content more conveniently and effectively by using the smart desktop.

According to an embodiment, the problem of "insufficient space for writing" in the prior art is solved. Through partially hiding and rearranging existing content and separating new and old content, the difficulty that a user has no writing space during a writing procedure is solved, which greatly improves the writing experience of the user on the smart desktop.

Also, according to an embodiment, the problem of "may not move" in the prior art is solved. Through detecting a focus point of a user and rearranging a layout of occluded content and a scroll view manner for saving screen space resources, the occlusion problem when the user views the content is intelligently solved. The user is able to see the whole content that he is interested in conveniently without moving an occluding object, which greatly improves the viewing experience of the user on the smart desktop.

According to an embodiment, the problem of "may not share" in the prior art is further solved. Through controlling of recording switch and recognition and segmentation of recording content, each user is able to record content he is interested in freely and may conveniently and clearly check content recorded by other users and a key point of the content, which not only realizes recording by multiple users via a microphone of the smart desktop but also makes usage very convenient. Through controlling to play an alarm clock sound and display a reminder in different cases, the user may be reminded based on alarm clock reminding subscribed by the user without affecting other users, which greatly improves the experience for using an alarm clock on the smart desktop.

Also, according to an embodiment, the problem of "have no idea" in the prior art is solved. Through recognizing content written by each user, it is possible to intelligently provide a prompt for the user about content or a summarization he has not written but has been written by other users. Through analyzing the content written by all users, it is also possible to correct the content written by the user intelligently, which improves the writing experience of the user, increases the efficiency for accomplishing the same task by multiple users, and avoids repeated conceiving and writing of the same content by multiple users.

The foregoing descriptions are only preferred embodiments of this disclosure and are not used for limiting the protection scope thereof. Any changes and modifications may be made by one of ordinary skill in the art without departing from the spirit of this disclosure and therefore should be covered within the protection scope as set by the appended claims.

Figure 28:
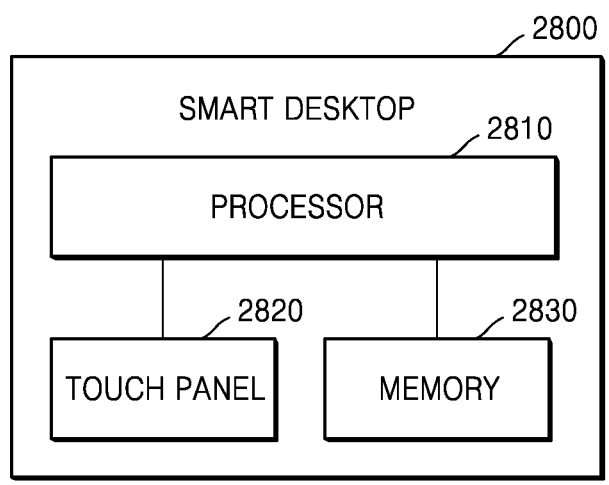
FIG. 28 is a schematic diagram for explaining a smart desktop according to an embodiment.

FIG. 28 is a diagram illustrating a configuration for explaining a smart desktop 2800 according to an embodiment. The smart desktop 2800 includes a processor 2810, a touch panel 2820, and a memory 2830.

The processor 2810 may control the touch panel 2820 and the memory 2830. The processor 2810 may determine content and a window displayed on the touch panel 2820. The processor 2810 may store the content input through the touch panel 2820 in the memory 2830, and may read the content stored in the memory 2830.

The touch panel 2820 displays the content or the window under the control of the processor 2810. The touch panel 2820 may receive a user's input and may transmit the user's input to the processor 2810.

The memory 2830 may store the content or user information.

Figure 29:
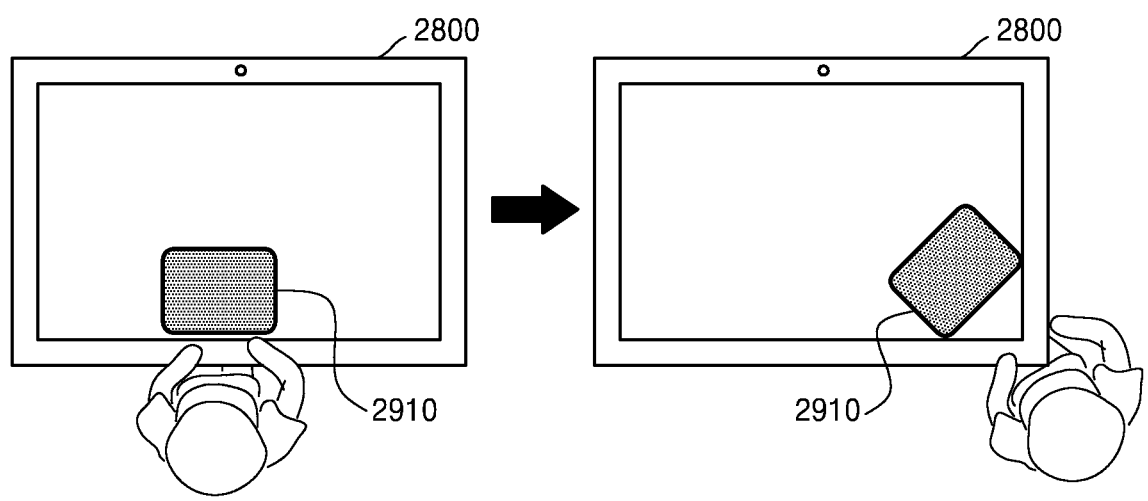
FIG. 29 is a diagram for explaining changing of a position and an angle of a window, according to an embodiment.

FIG. 29 is a diagram for explaining changing of a position and an angle of a window according to an embodiment. The smart desktop 2800 may change a position and an angle of the window 2910 according to a user's position.

The user is located at the center of the smart desktop 2800, and the smart desktop 2800 detects the user's position and displays the window 2910 in front of the user. The window 2910 displays an area allocated to the user. The user may input content to the window 2910.

As shown in FIG. 29, the user moves to a corner of the smart desktop 2800, and the smart desktop 2800 detects the user's motion, and determines a position and an angle of the window 2910 so that the window 2910 is located in front of the user. The smart desktop 2800 displays the window 2910 according to the determined position and the determined angle. Accordingly, the smart desktop 2800 may display the window 2910 allocated to the user on the touch panel 2820 even when the user moves.

Figure 30:
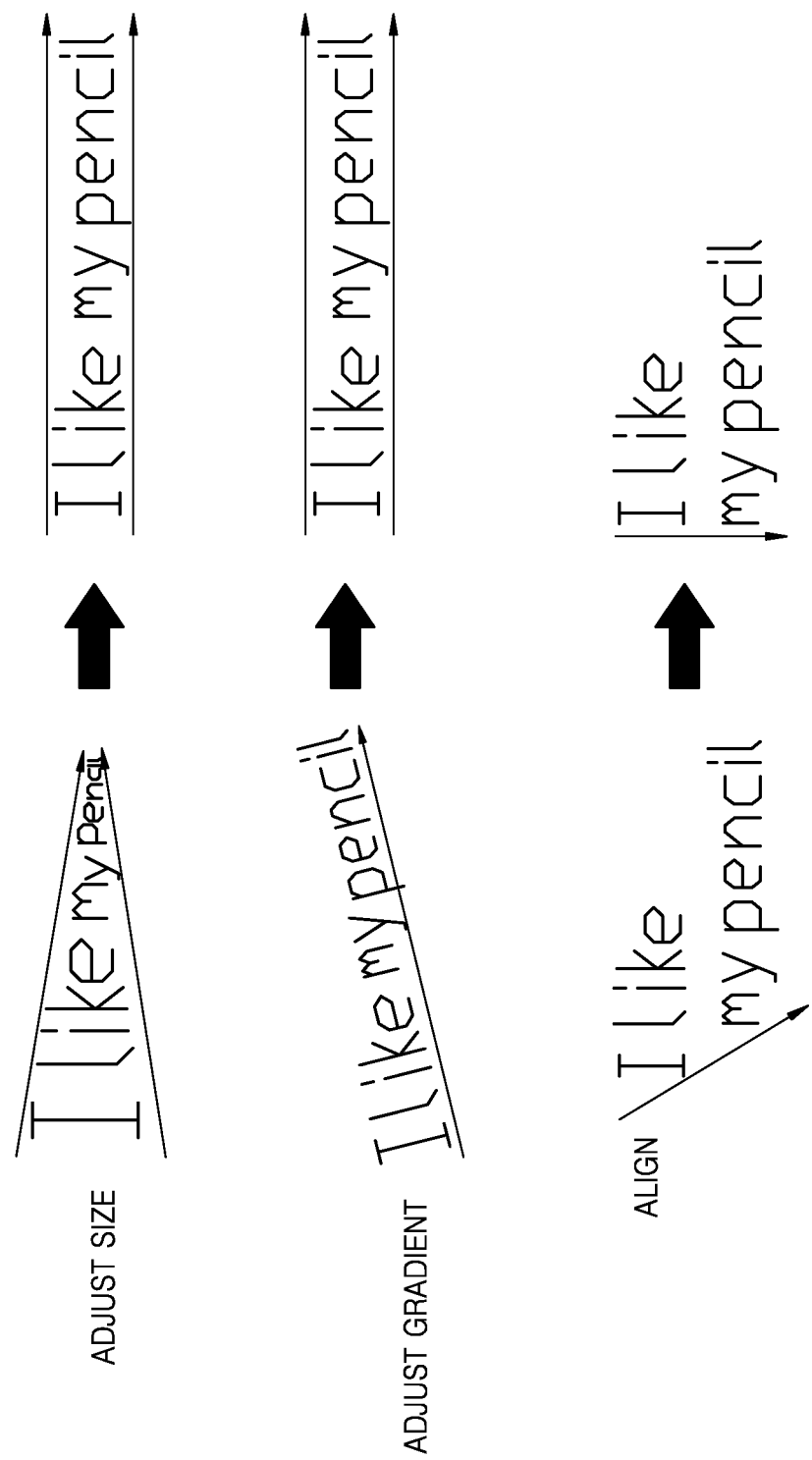
FIG. 30 is a diagram for explaining a method of adjusting content according to an embodiment.

FIG. 30 is a diagram for explaining a method of adjusting content according to an embodiment. The smart desktop 2800 may analyze content input by a user and may adjust a size, a gradient, and a position of the content.

The smart desktop 2800 may adjust characters recognized as one sentence to the same size. As shown in FIG. 30, when sizes of characters input by the user are gradually reduced, the smart desktop 2800 may adjust sizes of the characters to the same. The smart desktop 2800 may adjust sizes of characters included in one sentence or one paragraph to the same.

Alternatively, the smart desktop 2800 may adjust a gradient of a sentence. When a sentence is inclined, the smart desktop 2800 may adjust the gradient of the sentence in parallel to a direction of a window allocated to the user. As shown in FIG. 30, when a gradient of a sentence input by the user is gradually increased, the smart desktop 2800 may adjust the gradient of the sentence to be the same as the direction of the window.

Alternatively, the smart desktop 2800 detects a gradient of a sentence and, when the gradient of the sentence is equal to or greater than a threshold, may adjust an angle of a window into which the sentence is input to be the same as the gradient of the sentence. In other words, the smart desktop 2800 may adjust the angle of the window, without adjusting the gradient of the sentence. For example, when the gradient of the sentence is 20°, the smart desktop 2800 may adjust the angle of the window to 20° and may display the adjusted window on the touch panel 2820.

Alternatively, the smart desktop 2800 may align a sentence. As shown in FIG. 30, when positions of first words of the sentence written at different rows are different, the smart desktop 2800 may align the positions of the first words.

Figure 31:
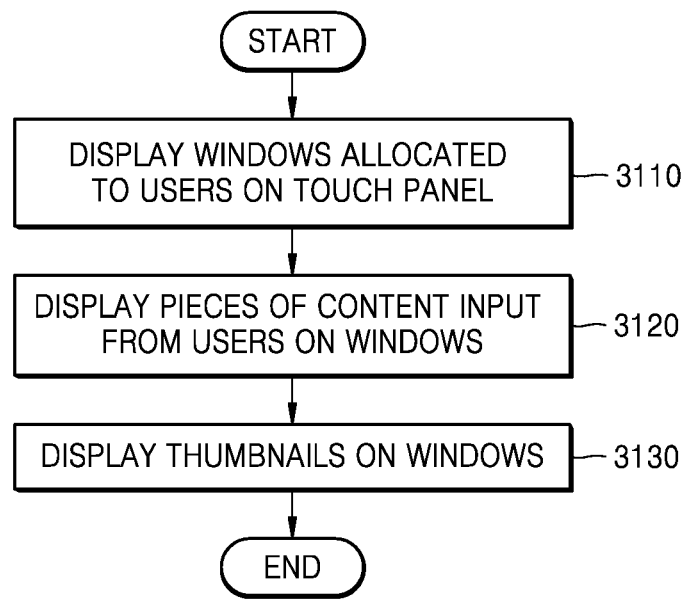
FIG. 31 is a flowchart for explaining a method of displaying a thumbnail according to an embodiment.

FIG. 31 is a flowchart for explaining a method of displaying a thumbnail according to an embodiment. The smart desktop 2800 displays pieces of content input by a plurality of users on thumbnails. The smart desktop 2800 displays the thumbnails on windows of the users. For example, when first through third users input pieces of content to the smart desktop 2800, the smart desktop 2800 displays a first thumbnail on a window (a first window) of the first user, displays a second thumbnail on a window (a second window) of the second user, and displays a third thumbnail on a window (a third window) of the third user. The first thumbnail may be displayed on a portion of the first window and may be enlarged and displayed according to the user's operation.

The smart desktop 2800 may differently display the thumbnails for the users. For example, the first thumbnail and the second thumbnail may be different from each other. When the content input by the first user to the first window includes private information, the content input to the first window may not be displayed on the second thumbnail. Alternatively, the smart desktop 2800 may summarize the content input to the first window and may display the summarized content on the second thumbnail. Alternatively, the smart desktop 2800 may display a part of the content input to the first window on the second thumbnail.

In operation 3110, the processor 2810 displays windows allocated to users on the touch panel 2820. The windows are respectively allocated to the users. The windows indicate areas where the users may input content.

In operation 3120, the processor 2810 display pieces of content input from the users on the windows.

In operation 3130, the processor 2810 displays thumbnails on the windows. The processor 2810 displays content displayed on all windows within the thumbnails.

The processor 2810 designates positions of the pieces of content according to positions of the users and displays the pieces of content in the thumbnails. In other words, the processor 2810 determines relative positions of the users about the smart desktop 2800, and displays the pieces of content input by the users at positions in the thumbnails corresponding to the relative positions of the users.

The processor 2810 adjusts directions of the pieces of content displayed in the thumbnails according to directions of the windows, and displays the pieces of content in the thumbnails in the adjusted directions. In other words, directions of the pieces of content input by the plurality of users may be different from one another. The processor 2810 may align the pieces of content in one direction and may display the pieces of content in the thumbnails so that the pieces of content input by different users may be easily viewed. For example, when a first user is located in a direction of 6 o'clock, a second user is located in a direction of 9 o'clock, a third user is located in a direction of 12 o'clock, and a fourth user is located in a direction of 3 o'clock, all content displayed in a thumbnail of the first user may be aligned in the direction of 6 o'clock. For example, aligning of content may be changing of an angle at which the content is displayed, changing of a size of the content, and changing a position where the content is displayed.

The processor 2810 omits a redundant area when the pieces of content are displayed in the thumbnails, and adjusts positions and sizes of the pieces of content and displays the adjusted pieces of content in the thumbnails. For example, windows may be allocated to edges of the touch panel 2820, and the pieces of content may not be input to the center of the touch panel 2820. Accordingly, the processor 2810 may omit the redundant area, and may reduce a space between the pieces of content and may arrange the pieces of content.

The processor 2810 enlarges the thumbnails into areas adjacent to the thumbnails according to inputs of the users. The thumbnails may be displayed in the windows, and may be enlarged and displayed in areas outside the windows. When the users touch the thumbnails, the processor 2810 may display the enlarged thumbnails. Before the thumbnails are enlarged, the pieces of content may be displayed in the form of summarizations in the thumbnails.

When the pieces of content are updated, the processor 2810 displays the updated pieces of content in the thumbnails. The pieces of content input by the users to the windows and the pieces of content displayed in the thumbnails may be synchronized.

The smart desktop 2800 may further include a sensor (not shown) for detecting an object on the touch panel 2820. For example, the sensor may be an infrared sensor. Alternatively, the smart desktop 2800 may detect an object by using a camera (not shown).

When the pieces of content are covered by the object, the processor 2810 may rearrange and display the pieces of content on areas other than an area occupied by the object. When the pieces of content are covered by the object, it means that the object is located on the touch panel 2820 and the user may not be able to see the pieces of content.

Figure 32:
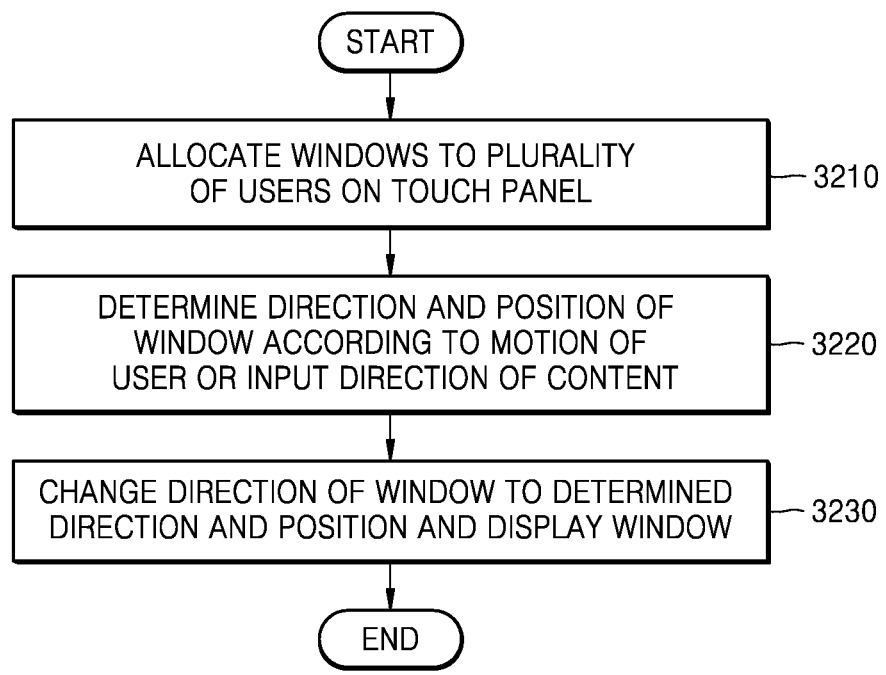
FIG. 32 is a flowchart for explaining a method of displaying a window according to an embodiment.

FIG. 32 is a flowchart for explaining a method of displaying a window according to an embodiment. The smart desktop 2800 may display a window according to content or a user.

In operation 3210, the processor 2810 allocates windows to a plurality of users. The processor 2810 allocates the windows in front of the users according to positions of the users. The allocating of the windows may indicate displaying areas where the users may input content. The windows indicate areas where the users input content and indicate portions of the touch panel 2820. The processor 2810 allocates the windows so that the windows do not overlap one another. The processor 2810 may allocate the windows so that sizes of the windows are different from one another according to the positions of the users.

In operation 3220, the processor 2810 determines a direction and a position of a window according to an input direction of content and a motion of a user. When the user moves to a position, the processor 2810 moves the window to the position to which the user moves. For example, when the user moves rightward by 50 cm, the processor 2810 moves the window rightward by 50 cm.

The processor 2810 rotates the window according to a direction of the user's body or a viewing direction. For example, when the user's body is inclined by 30° or the viewing direction is 30°, the processor 2810 inclines the window by 30° and displays the inclined window. The direction of the body or the viewing direction may be calculated based on edges of the smart desktop 2800.

The processor 2810 rotates the window according to the input direction of the content. The user may incline the content and input the inclined content. The processor 2810 calculates a gradient of the content and rotates the window by an angle corresponding to the gradient of the content.

In operation 3230, the processor 2810 changes the direction and the position of the window to the determined direction and position and displays the window on the touch panel 2820.

When there is no input from the user for a predetermined period of time, the processor 2810 hides the window allocated to the user. Also, when the user is away by a predetermined distance or more from the smart desktop 2800, the processor 2810 may hide the window.

The processor 2810 displays a sharing region at the center of the touch panel 2820. The sharing region indicates an area where all users may input. After the user inputs the content to the window, the user may copy the content and may input the content to the sharing region. In other words, the processor 2810 displays, on the sharing region, the content touched by the user and dragged and dropped to the sharing region. The sharing region is rotatable. The user may rotate the sharing region in a desired direction by using a touch and drag operation.

The smart desktop 2800 according to an embodiment may display content input by all users in thumbnails.

The smart desktop 2800 according to an embodiment may change a direction, a size, and a position of a window according to an input direction of content or a motion of the user.

The invention claimed is:

1. A content displaying method comprising:
    displaying a plurality of windows allocated to each of a plurality of users on a touch panel;
    obtaining pieces of content based on user inputs of each of the plurality of users;
    displaying the pieces of content input from each of the plurality of users on each of the plurality of windows allocated to the plurality of users; and
    displaying at least one thumbnail corresponding to each of the plurality of users on each of the plurality of windows,
    wherein the displaying of the at least one thumbnail comprises displaying all of the pieces of content displayed on all of the plurality of windows in each of the at least one thumbnail,
    wherein the displaying of the at least one thumbnail corresponding to each of the plurality of users comprises displaying all of the pieces of content excluding a private information which is obtained from another user,
    wherein the displaying of the at least one thumbnail comprises summarizing a piece of text content, of the pieces of content, based on a font size of the piece of text content in a window, of the plurality of windows, being less than a threshold such that a length of the piece of text content in summarized form does not exceed a length threshold, and displaying the piece of text content in the summarized form in each of the at least one thumbnail,
    wherein the plurality of users have different writing positions and directions with respect to the touch panel,
    wherein the displaying of the at least one thumbnail comprises displaying the at least one thumbnail on a position where a user calls out the at least one thumbnail and corresponding to the user, and
    wherein the method further comprises, when an external object is detected on the touch panel and the pieces of content are occluded by the external object, rearranging a layout of the occluded pieces of content based on at least one of a character continuity, a text line continuity, a paragraph continuity, a semantic continuity, and an image continuity of the occluded pieces of content, and displaying the pieces of content on areas other than an area occluded by the external object based on the rearranged layout.

2. The content displaying method of claim 1, wherein the displaying of the at least one thumbnail comprises displaying the pieces of content in the at least one thumbnail by designating positions of the pieces of content according to positions of the plurality of users.

3. The content displaying method of claim 1, wherein the displaying of the at least one thumbnail comprises displaying the pieces of content in the at least one thumbnail by adjusting directions of the pieces of content displayed in the at least one thumbnail according to respective directions of the plurality of windows.

4. The content displaying method of claim 1, wherein the displaying of the at least one thumbnail comprises omitting a redundant area when the pieces of content are displayed in the at least one thumbnail and displaying the pieces of content in the at least one thumbnail by adjusting positions and sizes of the pieces of content.

5. The content displaying method of claim 1, further comprising enlarging the at least one thumbnail into areas adjacent to the at least one thumbnail according to inputs of the users.

6. The content displaying method of claim 1, wherein the displaying of the at least one thumbnail further comprises, when the pieces of content are updated, displaying the updated pieces of content in the at least one thumbnail.

7. A smart desktop comprising:
    a memory;
    a touch panel; and
    a processor configured to control the touch panel,
    wherein the processor is further configured to:
    control the touch panel to display a plurality of windows allocated to each of a plurality of users on the touch panel,
    obtain pieces of content based on user inputs of each of the plurality of users;
    display the pieces of content input from each of the plurality of users on each of the plurality of windows allocated to the plurality of users,
    display at least one thumbnail corresponding to each of the plurality of users on each of the plurality of windows, and
    display all of the pieces of content displayed on all of the plurality of windows in each of the at least one thumbnail,
    wherein the processor is further configured to display all of the pieces of content excluding a private information which is obtained from another user, and
    wherein the processor is further configured to summarize a piece of text content, of the pieces of content, based on a font size of the piece of text content in a window, of the plurality of windows, being less than a threshold such that a length of the piece of text content in summarized form does not exceed a length threshold, and display the piece of text content in the summarized form in each of the at least one thumbnail,
    wherein the plurality of users have different writing positions and directions with respect to the touch panel,
    wherein the processor is further configured to display the at least one thumbnail on a position where a user calls out the at least one thumbnail and corresponding to the user, and
    wherein the processor is further configured to, when the pieces of content are occluded by an external object, rearrange a layout of the occluded pieces of content based on at least one of a character continuity, a text line continuity, a paragraph continuity, a semantic continuity, and an image continuity of the occluded pieces of content, and display the pieces of content on areas other than an area occluded by the external object based on the rearranged layout.

8. The smart desktop of claim 7, wherein the processor is further configured to display the pieces of content in the at least one thumbnail by designating positions of the pieces of content according to positions of the plurality of users.

9. The smart desktop of claim 7, wherein the processor is further configured to display the pieces of content in the at least one thumbnail by adjusting directions of the pieces of content displayed in the at least one thumbnail according to respective directions of the plurality of windows.

10. The smart desktop of claim 7, wherein the processor is further configured to omit a redundant area when the pieces of content are displayed in the at least one thumbnail and display the pieces of content in the at least one thumbnail by adjusting positions and sizes of the pieces of content.

11. The smart desktop of claim 7, wherein the processor is further configured to enlarge the at least one thumbnail into areas adjacent to the at least one thumbnail according to inputs of the users.

12. The smart desktop of claim 7, wherein the processor is further configured to, when the pieces of content are updated, display the updated pieces of content in the at least one thumbnail.

13. The smart desktop of claim 7, further comprising a sensor configured to detect the external object on the touch panel.

* * * * *